(12) United States Patent
Naito et al.

(10) Patent No.: US 6,980,668 B1
(45) Date of Patent: Dec. 27, 2005

(54) INFORMATION PROCESSING APPARATUS ENABLING ELECTRONIC WATERMARKING, AND COMMUNICATION NETWORK CONNECTABLE TO SUCH INFORMATION PROCESSING APPARATUS

(75) Inventors: Kikuo Naito, Kawasaki (JP); Toshiyuki Noguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/409,347

(22) Filed: Sep. 30, 1999

(30) Foreign Application Priority Data

Oct. 6, 1998 (JP) ................................. 10-284118

(51) Int. Cl.$^7$ ............................................. G06K 9/00
(52) U.S. Cl. ...................... 382/100; 380/54; 713/176
(58) Field of Search ................................. 382/100, 294

(56) References Cited

U.S. PATENT DOCUMENTS

| | | | | |
|---|---|---|---|---|
| 6,131,162 A * | 10/2000 | Yoshiura et al. | ............. | 380/28 |
| 6,148,333 A * | 11/2000 | Guedalia et al. | ............. | 709/219 |
| 6,182,218 B1 * | 1/2001 | Saito | ............. | 713/176 |
| 6,233,684 B1 * | 5/2001 | Stefik et al. | ............. | 380/54 |
| 6,266,419 B1 * | 7/2001 | Lacy et al. | ............. | 380/269 |
| 6,330,672 B1 * | 12/2001 | Shur | ............. | 713/176 |
| 6,389,421 B1 * | 5/2002 | Hawkins et al. | ............. | 707/10 |

OTHER PUBLICATIONS

U.S. Appl. No. 09/318,630.*
U.S. Appl. No. 09/318,630, filed May 26, 1999, pending.

* cited by examiner

*Primary Examiner*—Samir Ahmed
*Assistant Examiner*—Charles Kim
(74) *Attorney, Agent, or Firm*—Fitzpatrick, Cella, Harper & Scinto

(57) ABSTRACT

In order to protect the copyright of data in accordance with the intent of a copyright holder, an arbitrary timing can be set for the application of an electronic watermark to data. For example, a data registration timing, a data communication timing or a data output timing can be arbitrarily selected.

17 Claims, 31 Drawing Sheets

| IMAGE ID 3701 | INTENDED PURPOSE 3702 | APPLYING TIMING 3703 | APPLIED WATERMARK TYPE 3704 | APPLIED DATA 3705 | |
|---|---|---|---|---|---|
| CANON/IS03/1998ABC002 | ORIGINAL IMAGE | AT REGISTRATION | INVISUAL | "COPYRIGHT 1998 abcd" | 3711 |
| CANON/IS03/1998ABC002 | FOR DISPLAY/ EDIT | AT TRANSMITTING | NOT REMOVABLE, VISUAL | "SAMPLE" | 3712 |
| CANON/IS03/1998ABC002 | FOR EDIT | AT TRANSMITTING | REMOVABLE, VISUAL | # ORDER ID | 3713 |
| CANON/IS03/1998ABC004 | ORIGINAL IMAGE | AT REGISTRATION | INVISUAL | "COPYRIGHT 1998 abcd" | 3714 |
| CANON/IS03/1998ABC004 | FOR DISPLAY/ EDIT | AT REGISTRATION | INVISUAL | "COPYRIGHT 1998 abcd" | 3715 |
| CANON/IS03/1998ABC004 | FOR DISPLAY/ EDIT | AT TRANSMITTING | NOT REMOVABLE, VISUAL | "SAMPLE" | 3716 |
| CANON/IS03/1998ABC004 | FOR EDIT | AT TRANSMITTING | REMOVABLE, VISUAL | "CRIBBING INHIBITED" | 3717 |

FIG. 8
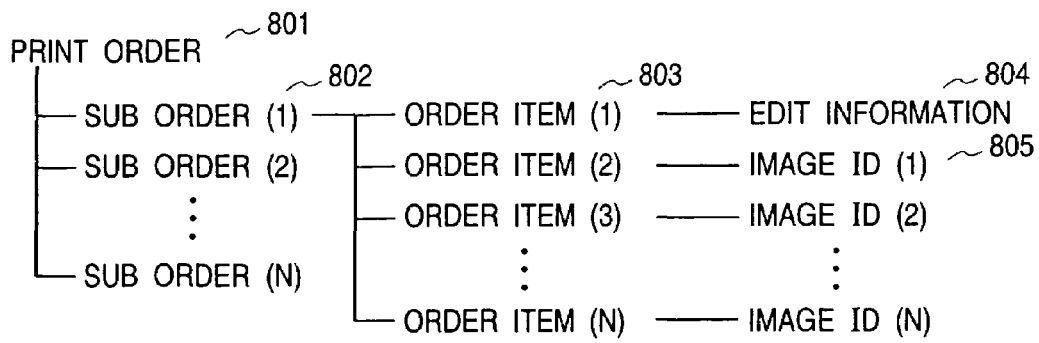
FIG. 9
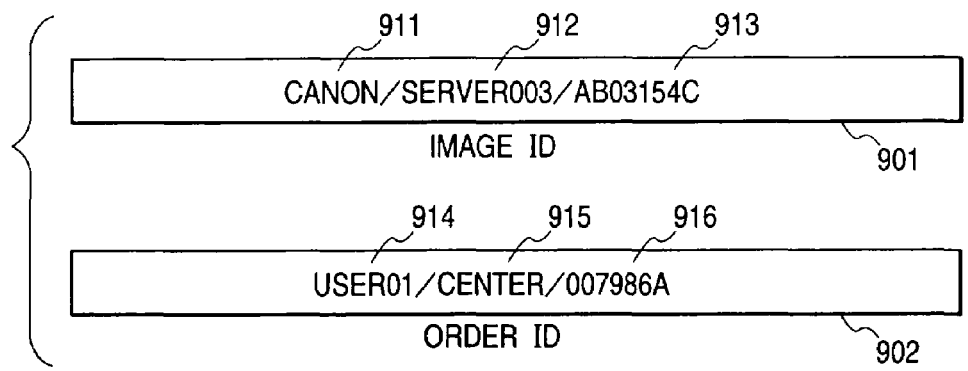
FIG. 10
| ORDER ID | SUB ORDER ID | IMAGE ID | STATUS | |
|---|---|---|---|---|
| USR1/PC1/0002 | — | — | ON IMAGE COLLECTION | ~211 |
| USR1/PC1/0002 | 0001 | — | ON IMAGE COLLECTION | ~212 |
| USR1/PC1/0002 | 0001 | CANON/PS5/199801010758 | ON IMAGE COLLECTION | ~213 |
| USR1/PC1/0002 | 0001 | CANON/PS5/199801050027 | IMAGE COLLECTION END | ~214 |

FIG. 11

| SERVER ID | IMAGE OBTAINING PRIORITY ORDER |
|---|---|
| PS001 | 100 |
| PS002 | 200 |
| IS001 | 300 |

| IMAGE ID | OWNER | STORAGE LOCATION | ADDITIONAL INFORMATION |
|---|---|---|---|
| CANON/PS01/1998ABC001 | USR123 | PS01 | — |
| CANON/IS03/1998ABC002 | — | E:¥spool¥image1.jpg | USR13345/CENTER/0001 |
| CANON/IS03/1998ABC003 | — | IS02 | — |
| CANON/IS03/1998ABC003 | — | PS07 | — |

Figure 13:
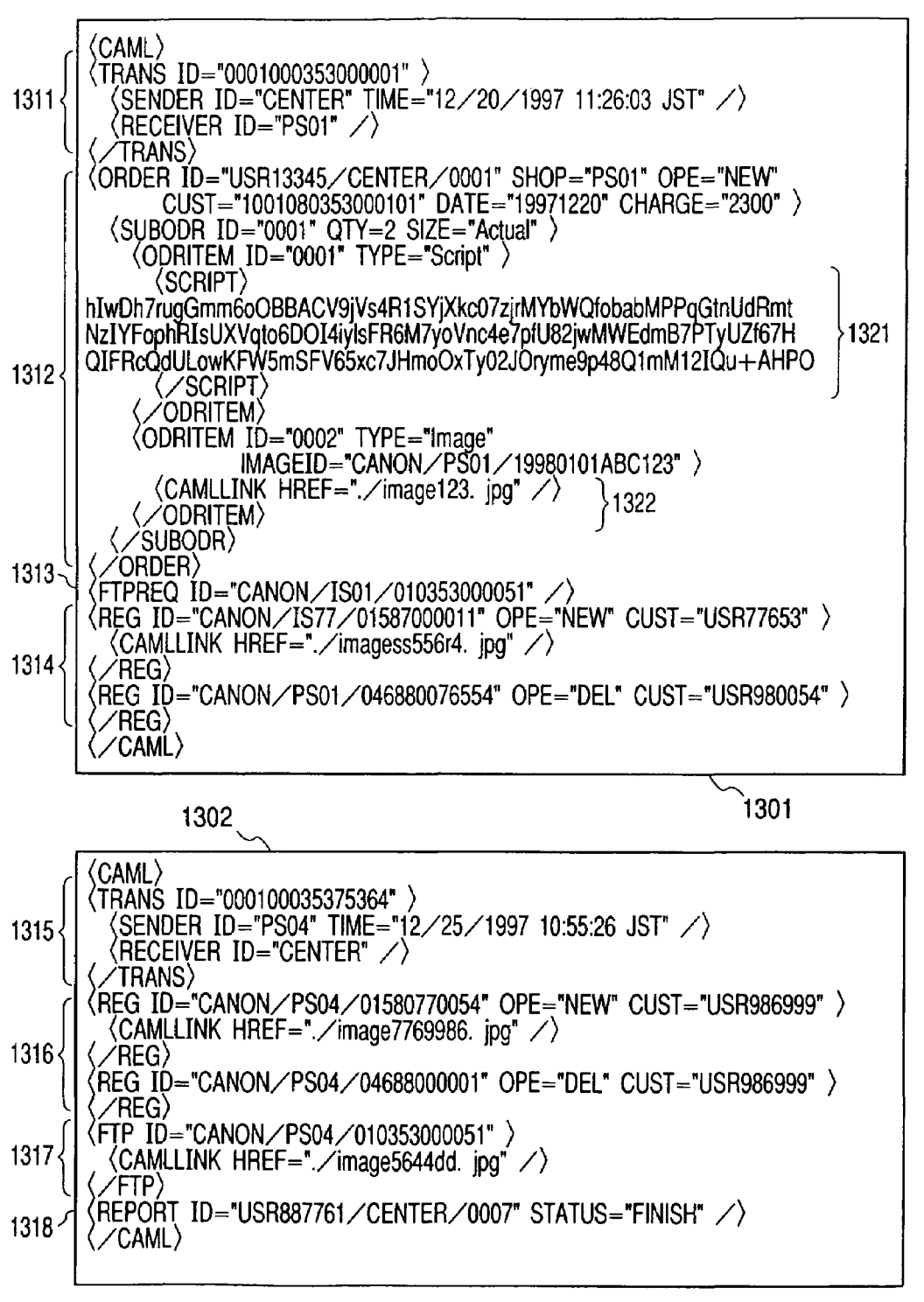

```
⟨CAML⟩
⟨TRANS ID="0001000353000001" ⟩
  ⟨SENDER ID="CENTER" TIME="12/20/1997 11:26:03 JST" /⟩
  ⟨RECEIVER ID="PS01" /⟩
⟨/TRANS⟩
⟨ORDER ID="USR13345/CENTER/0001" SHOP="PS01" OPE="NEW"
       CUST="1001080353000101" DATE="19971220" CHARGE="2300" ⟩
  ⟨SUBODR ID="0001" QTY=2 SIZE="Actual" ⟩
    ⟨ODRITEM ID="0001" TYPE="Script" ⟩
      ⟨SCRIPT⟩
hIwDh7rugGmm6oOBBACV9jVs4R1SYjXkc07zjrMYbWQfobabMPPqGtnUdRmt
NzIYFophRIsUXVqto6DOI4iyIsFR6M7yoVnc4e7pfU82jwMWEdmB7PTyUZf67H
QIFRcQdULowKFW5mSFV65xc7JHmoOxTy02JOryme9p48Q1mM12IQu+AHPO
      ⟨/SCRIPT⟩
    ⟨/ODRITEM⟩
    ⟨ODRITEM ID="0002" TYPE="Image"
             IMAGEID="CANON/PS01/19980101ABC123" ⟩
      ⟨CAMLLINK HREF="./image123. jpg" /⟩
    ⟨/ODRITEM⟩
  ⟨/SUBODR⟩
⟨/ORDER⟩
⟨FTPREQ ID="CANON/IS01/010353000051" /⟩
⟨REG ID="CANON/IS77/01587000011" OPE="NEW" CUST="USR77653" ⟩
  ⟨CAMLLINK HREF="./imagess556r4. jpg" /⟩
⟨/REG⟩
⟨REG ID="CANON/PS01/046880076554" OPE="DEL" CUST="USR980054" ⟩
⟨/REG⟩
⟨/CAML⟩
```

1311: TRANS block
1312: ORDER block
1321: SCRIPT content
1322: ODRITEM Image
1313: /ORDER
1314: REG blocks
1301, 1302

```
⟨CAML⟩
⟨TRANS ID="000100035375364" ⟩
  ⟨SENDER ID="PS04" TIME="12/25/1997 10:55:26 JST" /⟩
  ⟨RECEIVER ID="CENTER" /⟩
⟨/TRANS⟩
⟨REG ID="CANON/PS04/01580770054" OPE="NEW" CUST="USR986999" ⟩
  ⟨CAMLLINK HREF="./image7769986. jpg" /⟩
⟨/REG⟩
⟨REG ID="CANON/PS04/04688000001" OPE="DEL" CUST="USR986999" ⟩
⟨/REG⟩
⟨FTP ID="CANON/PS04/010353000051" ⟩
  ⟨CAMLLINK HREF="./image5644dd. jpg" /⟩
⟨/FTP⟩
⟨REPORT ID="USR887761/CENTER/0007" STATUS="FINISH" /⟩
⟨/CAML⟩
```

1315: TRANS block
1316: REG blocks
1317: FTP block
1318: REPORT

```
<REG ID="CANON/IS01/010353000051"
     OPE="NEW"
     CUST="1001080353000101"
     SHOP="1001">
   <CAMLLINK HREF="./im012345.jpg"/>
</REG>
```

FIG. 23

```
<CAML>
<TRANS ID="00010003530000001" >
    <SENDER ID="IS04" TIME="12/20/1997 11:26:03 JST" />
    <RECEIVER ID="CENTER" />
</TRANS>
<ORDER ID="USR13345/CENTER/0001" SHOP="PS01" OPE="NEW"
    CUST="100108035300000101" DATE="19971220" CHARGE="2300" >
</ORDER>
<FTP ID="/CANON/IS01/01035300000051" >
    <CAMLLINK HREF="./image123.jpg" />
</FTP>
</CAML>
```

FIG. 32

| 3201 | 3202 | 3203 | 3204 | 3205 |
|---|---|---|---|---|
| TRANSMITTING FILE NAME | TRANSMITTING DATA FILE NAME | FILE SIZE | BOX STORED TIME | TRANSMITTING END TIME |

FIG. 33

| 3301 | 3302 | 3303 |
|---|---|---|
| TRANSMITTING DATA TAG NAME | PROCESS MEANS STARTING METHOD | TRANSFERRING DATA INFORMATION |

FIG. 37

| IMAGE ID | INTENDED PURPOSE | APPLYING TIMING | APPLIED WATERMARK TYPE | APPLIED DATA |
|---|---|---|---|---|
| CANON/IS03/1998ABC002 | ORIGINAL IMAGE | AT REGISTRATION | INVISUAL | "COPYRIGHT 1998 abcd" |
| CANON/IS03/1998ABC002 | FOR DISPLAY/EDIT | AT TRANSMITTING | NOT REMOVABLE, VISUAL | "SAMPLE" |
| CANON/IS03/1998ABC002 | FOR EDIT | AT TRANSMITTING | REMOVABLE, VISUAL | # ORDER ID |
| CANON/IS03/1998ABC004 | ORIGINAL IMAGE | AT REGISTRATION | INVISUAL | "COPYRIGHT 1998 abcd" |
| CANON/IS03/1998ABC004 | FOR DISPLAY/EDIT | AT TRANSMITTING | INVISUAL | "COPYRIGHT 1998 abcd" |
| CANON/IS03/1998ABC004 | FOR DISPLAY/EDIT | AT TRANSMITTING | NOT REMOVABLE, VISUAL | "SAMPLE" |
| CANON/IS03/1998ABC004 | FOR EDIT | AT TRANSMITTING | REMOVABLE, VISUAL | "CRIBBING INHIBITED" |

INFORMATION PROCESSING APPARATUS ENABLING ELECTRONIC WATERMARKING, AND COMMUNICATION NETWORK CONNECTABLE TO SUCH INFORMATION PROCESSING APPARATUS

BACKGROUND OF THE INVENTION

1. Field of the Invention

The present invention relates to an information processing apparatus that enables electronic watermarking, and a communication network that can be connected to such an information processing apparatus.

2. Related Background Art

To date, the functional performance of personal computers has been enormously improved, and the editing, referencing and printing processing required for image data have become comparatively simple tasks. In addition, since the use of networks, such as the Internet, is now widespread, and image data can thus be distributed and acquired easily and quickly, there has been a corresponding increase in the illegal use of image data, its editing and printing and its citing, done without the permission of the copyright holders.

To protect copyrighted image data and to prevent the illegal use of such material, a method has been proposed that involves the use of so-called electronic watermarks. According to one conventional copyright protection method for which electronic watermarks are used, to prevent the illegal use of low-resolution images, which are employed for displays or as editing samples, visible electronic watermarks are uniformly applied so that the value of the original images is not impaired. For high-resolution images that are employed for printing or for download sales, invisible electronic watermarks consisting of copyright holders' names or copyright display examples that can not be detected by human beings are also uniformly applied. Thereafter, the illegal use of the copyright material is prevented by notifying the provision of an electronic watermark. If an instance of illegal use is discovered, a detection means can be used to detect the electronic watermark, and the distribution route for an illegal image can be traced and unauthorized users identified.

That is, with one conventional copyright protection method, when an image is registered in an image processing system, an electronic watermark is uniformly applied in accordance with the purpose of employment and regardless of the will of the copyright holder.

However, when a number of images are handled for a plurality of copyright holders, the copyright protection measures that the individual copyright holders prefer will probably differ. For example, a first copyright holder may decide to abandon his or her copyright for a sample image and to permit the image to be distributed free, but may request that a high-resolution image receive strict copyright protection; whereas a second copyright holder may request strict copyright protection not only for a high-resolution image but also for a sample image. In this case, the desires of individual copyright holders can not be precisely satisfied by the conventional method, whereby at the time images are registered the same system is used to uniformly provide electronic watermarks.

Since conventionally an electronic watermark is applied only when an image if registered in an image supply system, which is responsible for the transmission of the data for the image to a plurality of users or print servers, if in some system illegal use is made of certain of this data, it is extremely difficult to trace the affected data because all copies of the image carry the same electronic watermark.

SUMMARY OF THE INVENTION

It is one objective of the present invention to provide an arbitrary electronic watermark prepared in accordance with a combination of various protection preferences and the purpose for which the data is to be employed.

It is another objective of the present invention to provide for a copyright protective measures that precisely reflect the preferences of the copyright holder.

It is an additional objective of the present invention, when image data are to be transmitted to a plurality of destinations, to provide protection for a copyright that facilitates the tracing of a route used for the illegal distribution of data.

BRIEF DESCRIPTION OF THE DRAWINGS

FIG. 8 is a diagram showing the data structure of a printing order for data used for the embodiment of the present invention;

FIG. 9 is a diagram for explaining an example image ID according to the embodiment of the present invention;

FIG. 10 is an order status table according to the embodiment of the present invention;

FIG. 11 is a server management table according to the embodiment of the present invention;

FIG. 12 is an original image position management table;

FIG. 13 is a diagram for explaining an example transmission data format used for the embodiment of the present invention;

FIG. 23 is a diagram for explaining example contents for an original image transmission data file according to the embodiment of the present invention;

FIG. 32 is a diagram for explaining a transmission control information table in the transmitting box, and a reception control information table in the receiving box according to the embodiment of the present invention;

FIG. 33 is a diagram for explaining a processing means information table in the receiving box according to the embodiment of the present invention;

FIG. 37 is a diagram for explaining a watermark information management table according to the embodiment of the present invention.

DETAILED DESCRIPTION OF THE PREFERRED EMBODIMENT

<System Configuration>

Figure 1:
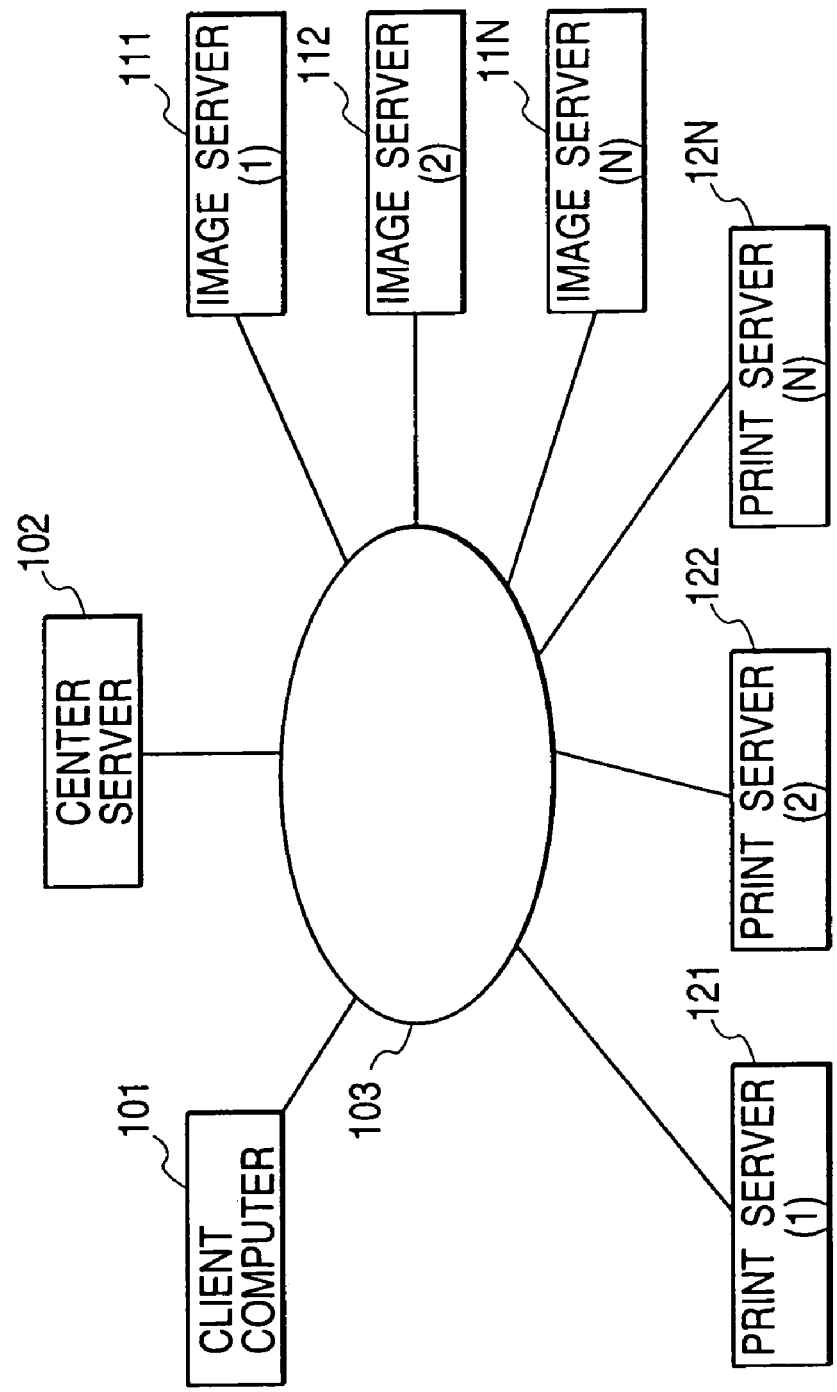
FIG. 1 is a diagram illustrating the arrangement of a system according to one embodiment of the present invention.

FIG. 1 is a diagram illustrating the overall arrangement of a system according to the preferred embodiment of the present invention.

In FIG. 1, an information processing apparatus 101 (a computer system in FIG. 2, constituting a CPU, a ROM, a RAM and an HDD) is directly manipulated by a client, a user of the system of this embodiment, while he or she is at home, for example. The information processing apparatus 101 is hereinafter referred to as a client computer.

The client computer 101 has a browser function for locating and displaying information, such as image data, stored by a network center server 102, which will be described later; an acquisition function for acquiring information for the client computer 101; and a forwarding function for dispatching to the center server 102 an image printing order for a print server 121, which will be described later.

The image printing order is hereinafter referred to as a print order or simply as an order.

The information processing apparatus 102, which upon receiving a processing request, usually from the client computer 101, performs the requested processing, is hereinafter referred to as a center server.

The center server 102 has a function for, upon receipt of a request from the client computer 101, holding an image to be transmitted to the client computer 101; and a function for receiving a print order from the client computer 101, collecting images based on image storage location information, and transmitting a printing instruction to print servers 121 to 12N, which will be described later.

Information processing apparatuses 111 to 11N each have a function for storing images, and, upon receiving a request from the center server 102, transmit stored images to the center server 102. These apparatuses 111 to 11N are hereinafter referred to as image servers.

Information processing apparatuses 121 to 12N each has a function for printing images upon receiving a printing instruction from the center server, and a function for storing images that are to be printed and for, upon receiving a request from the center server 102, transmitting stored images to the center server 102. These apparatuses 121 to 12N are hereinafter referred to as print servers.

It should be noted, however, that in some cases the print servers 121 to 12N may not include a function for storing images.

A connection apparatus 103 connects the client computer 101, the center server 102, the image servers 111 to 11N, and the print servers 121 to 12N. The connection apparatus 103 is a network system, for example, a local area network (LAN) or the Internet, and is hereinafter referred to simply as a network. In this embodiment, the Internet is employed as the network 103, but for this invention another network system may be used.

Physically, the same computer can be used as of the client computer 101, the center server 102, and some of the image servers 111 to 11N and the print servers 121 to 12N.

<Block Diagram for Client Computer, Center Server and Image Servers>

Figure 2:
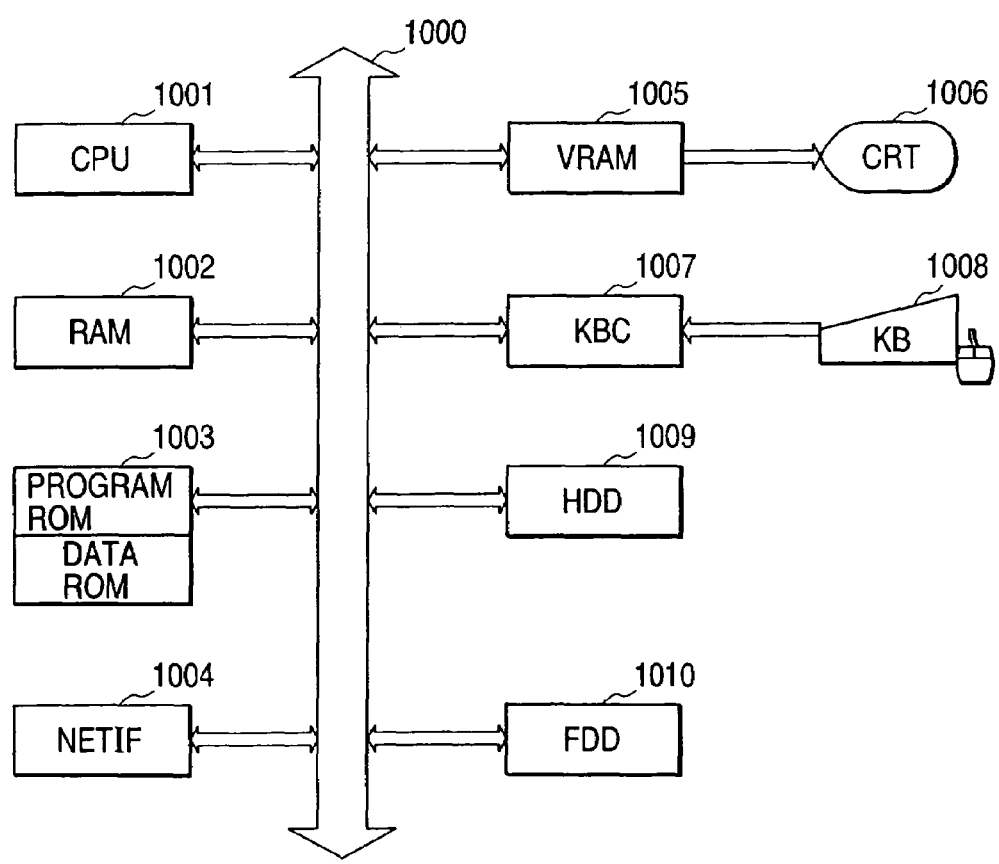
FIG. 2 is a block diagram illustrating a system configuration for a center server, an image server or a client computer according to the embodiment of the present invention.

FIG. 2 is a block diagram illustrating a system configuration for the individual information processing apparatuses in the embodiment of the present invention. In this embodiment, since the internal arrangements of the center server 102, the image servers 111 to 11N and the client computer 101 do not differ, their common hardware arrangement will now be explained while referring to FIG. 2.

In FIG. 2, a central processing unit (hereinafter referred to as a CPU) 1001 controls the information processing apparatus.

A random access memory (hereinafter referred to as a RAM) 1002 is the main memory for the CPU 1001 and is an area wherein applications, executable programs, are stored and executed, and wherein data is stored.

A read only memory (hereinafter referred to as a ROM) 1003 is used to store the operational procedures for the CPU 1001. The ROM 1003 includes a program ROM, for storing a basic operating system program (OS) that controls the individual sections of the information processing apparatus, and a data ROM, for storing information that is required to activate the system. An HDD 1009, which will be described later, may be employed instead of the ROM 1003.

A network interface (NETIF) 1004 controls the transmission of data performed by the information processing apparatuses via the network, and distinguishes between the connections effected by the information processing apparatuses.

A video RAM (VRAM) 1005 is used to load an image that is to be displayed on the screen, on which the operating state of the information processing apparatus is shown, of a CRT 1006, which will be described later, and to control the image display.

The display device 1006 is, for example, a display panel, and is hereinafter referred to as a CRT.

A controller (KBC) 1007 controls signals received from an external input device 1008, which will be described later.

The external input device 1008, which can be a keyboard or a pointing device such as a mouse, accepts instructions entered by a user for the information processing apparatus. The external input device 1008 is hereinafter referred to as a KB.

A hard disk drive (HDD) 1009 is used to store application programs and information such as image data. The application program for this embodiment is a software program that is executed to control the operation of the various individual processing means constituting the present invention.

An external input/output device 1010 is, for example, a floppy disk drive or a CD-ROM drive that is used to read the above described application program from a recording medium, a removable disk that can be loaded and unloaded. The external input/output device 1010 is hereinafter referred to simply as an FDD.

The application program and data that are stored on the HDD 1009 can also be stored on the FDD 1010.

An input/output bus 1000 (an address bus, a data bus and a control bus) is used to connect the individual units described above.

<Block Diagram of Print Server>

Figure 3:
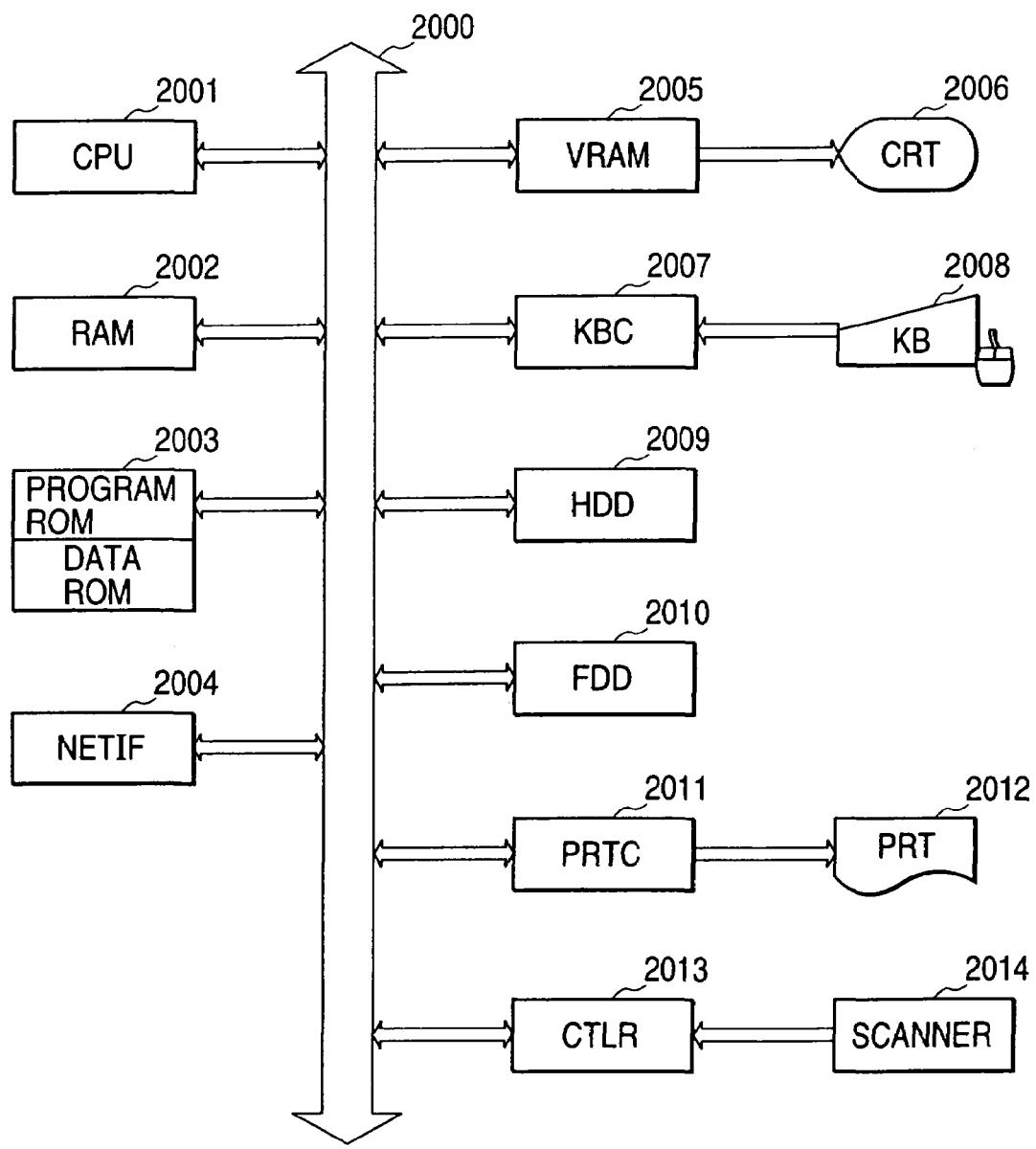
FIG. 3 is a block diagram illustrating a system configuration for a print server according to the embodiment of the present invention.

FIG. 3 is a block diagram illustrating the arrangement of the print server system according to the embodiment of the present invention. In FIG. 3, a CPU 2001 controls an information processing apparatus that constitutes the print server. A RAM 2002 is the main memory for the CPU 2001 and is an area wherein applications, executable programs, are stored and executed, and wherein data is stored.

A ROM 2003 is used to store the operating procedures for the CPU 2001. The ROM 2003 includes a program ROM for storing a basic operating system program (OS) for controlling the individual sections in the print servers, and a data ROM for storing information that is required to activate the system. An HDD 2009, which will be described later, may be employed instead of the ROM 2003.

A network interface (NETIF) 2004 controls the transmission of data, via the network, to another information processing apparatus, such as the center server 101, and verifies the connection between the apparatuses.

A VRAM 2005 is used to load an image that is to be displayed on the screen, on which the operating state of the print server is shown, of a CRT 2006, which will be described later, and to control the image display.

The display device 2006 is, for example, a display panel, and is hereinafter referred to as a CRT.

A controller (KBC) 2007 controls signals received from an external input device 2008, which will be described later.

The external input device 2008, which can be a keyboard or a pointing device such as a mouse, accepts instructions entered by a user for the information processing apparatus. The external input device 1008 is hereinafter referred to as a KB.

A hard disk drive (HDD) 2009 is used to store an application program for controlling printing, and for the storage of information, such as image data.

An external input/output device 2010 is, for example, a floppy disk drive or a CD-ROM drive that is used to read the above described application program from a recording medium, a removable disk that can be loaded into and unloaded from the device. The external input/output device 1010 is hereinafter referred to simply as an FDD.

The application program and data to be stored on the HDD 2009 can also be stored on the FDD 2010.

A printer controller 2011 controls an external output device 2012, which will be described later, and manages images that are to be output. The printer controller 2011 is hereinafter referred to as a PRTC.

The external output device 2012 is, for example, a printer, and is hereinafter referred to as a PRT.

An extended external input/output device controller 2013 controls an extended input/output device 2014 that will be described later, and is hereinafter referred to as a CTLR.

The extended input/output device 2014 is a device, like a scanner that reads printed material, that performs an external image data input function. The extended input/output device 2014 is hereinafter referred to simply as a scanner.

An input/output bus (an address bus, a data bus and a control bus) 2000 is used to connect the individual units described above.

<Center Server>

Figure 4:
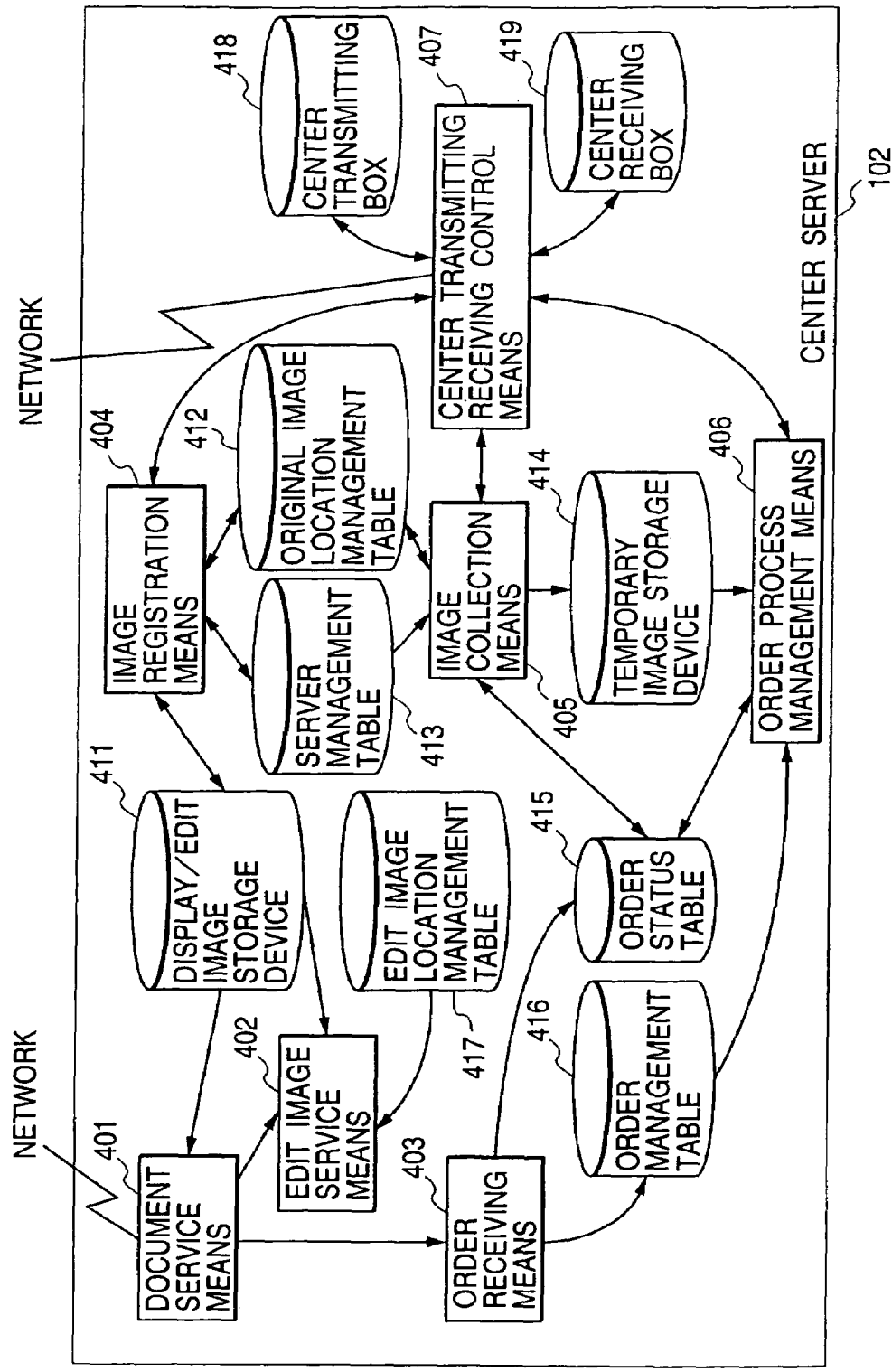
FIG. 4 is a diagram showing a modular arrangement for a center server according to the embodiment of the present invention.

FIG. 4 is a diagram illustrating the arrangement of the individual processing means in the center server 102, and the data that are to be managed. In FIG. 4, processing means application programs 401, 402, 403, 404, 405, 406 and 407 are read from the HDD 1009 or the FDD 1010 and are written in the RAM 1002 for employment. Data 411, 412, 413, 414, 415, 416, 417, 418 and 419 are to be stored on the HDD 1009.

Document service means 401 is an application program for performing a search of the HDD 1009 for a document (text, an image or a combination of the two) requested by the client computer 101 via a network, such as the Internet, and for facilitating the transmission of the document. The document service means 401 is generally called an Internet server program or a WWW server program, which is an application program whereby, in addition to transmitting a document, an application program stored in the HDD 1009 can be written to the RAM 1002 for use when a request is received from the client computer 101, and whereby, when an external request is received, the ID of a user can be authenticated as needed to limit the data that is transmitted.

Edit image service means 402 is an application program whereby, when a request for an image for display or for editing is received from the client computer 101, a search of a display/edit image storage device 411, which will be described later, is performed for the requested image, and whereby the image, if found, is transmitted via the document service means 401 to the client computer 101.

Order receiving means 403 is an application program whereby a print order received from the client computer 101 is analyzed and the analyzation results are stored in an order management table 416, which will be described later, whereby the results obtained for the received order are transmitted via the document service means 401 to the client computer 101, and whereby image collection means 405 is read from the HDD 1009 and written to the RAM 1002 in order to collect images to be used for the print order.

The edit image service means 402 and the order receiving means 403 are application programs that are read from the HDD 1009 and written to the RAM 1002 by the document service means 401 in consonance with a request received from the client computer 101. Generally, these means 402 and 403 are called CGI programs.

Image registration means 404 is an application program read from the HDD 1009 and written to the RAM 1002 for execution by center transmitting/receiving control means 407, which will be described later. One function of the image registration means 404 is the receiving, from the image server 111 or the print server 121, of position change data (new registration, deletion, copying or movement) for an image to be printed and an image to be edited, and for updating and managing an original image location management table 412, and a function whereby an image to be edited is stored in a display/edit image storage device 411, which will be described later. Also, the image registration means 404 has a function whereby, when position change data representing the moving of an image are to be printed, an image that has been received from the source image server 111, or the print server 121, is transmitted to the destination image server 111 or the print server via the center transmitting/receiving control means 407.

Image collection means 405 is an application program that, in response to the receipt of an instruction from the order receiving means 403 or the center transmitting/receiving control means 407, is activated by being read from the HDD 1009 and written to the RAM 1002 for execution. The image collection means 405 includes a function for the determination of the storage location in an order management table 416, which will be described later, of an original image that is required for printing; a function for the transmission, via the center transmitting/receiving control means 407 to the image server 111 or the print server 121 that is specified as a storage destination by the preceding function, of a request to obtain an image to be printed; a function for the storage and management, in a temporary image storage device 414 that will be described later, of a print image that is received from the image server 111 or the print server 121, and information for the removal from the print image of an electronic watermark, if the watermark was removably applied by the image server 111 or the print server 121; and a function, performed when the collection state is monitored and all the images to be printed are assembled for the print order, for the reading of the HDD 1009 order process management means 406, which will be described later, and its writing of to the RAM 1002 for execution.

The order process management means 406 is an application program that is read from the HDD 1009 and written to the RAM 1002 for execution either by the image collection means 405 or by the center transmitting/receiving control means 407. The order process management means 406 includes a function for employing print order data stored in the order management table 416 and print image data stored in the temporarily image storage device 414 to prepare print instruction data for the print server 121, and for transmitting the print instruction data, via the center transmitting/receiving control means 407, to the print server 121; and a function for receiving, from the print server 121, via the center transmitting/receiving control means 407, print end report data for updating the contents of the order management table 416.

The center transmitting/receiving control means 407 includes: a function for managing data that are prepared by an application program, such as the image collection means 405 in the center server, and that are stored in a center transmitting box 418, which will be described later, and for, upon receiving a data transmission/reception start request from the image server 111 or the print server 121 via the NETIF 1004, extracting and transmitting data, which is stored in the center transmitting box 418, that is to be transmitted to the image server 111 or to the print server 121; and a function for storing in a center receiving box 419, which will be described later, data received from the image server 111 or the print server 121, and for reading an application program, for analyzing and processing the received data, from the HDD 1009 and writing the program to the RAM 1002 for execution.

Since the exchange of data with the image server 111 or the print server 121 is performed following the receipt of a transmission/reception start request from the image server 111 or the print server 121, an optimal transmission/reception cycle an be provided by the network connection (a continuous dedicated line connection, a temporary dial-up connection, etc.).

The display/edit image storage device 411 is used for the storage of low-resolution images that a user can employ. Data are so stored that upon receiving, via the document service means 401 and network browsing means 502, which will be described later, an image acquisition request from a user, a display image having the lowest resolution that can be displayed on the network browsing means 502 or an edit image for employment by data process means 501, which will be described later, can be provided. In accordance with data transmission limitations, based on user ID information stored in the document service means 401, an image file is stored in a directory for each user ID in the display/edit image storage device 411. Further, a table is stored to search for an image file that corresponds to an image ID, which will be described later while referring to FIG. 9.

The original image location management table 412 is a table for managing the storage location of an image to be printed, as will be described later while referring to FIG. 12.

A server management table 413 is a table for managing information in the image server 111 and the print server 121, as will be described later while referring to FIG. 11.

The temporary image storage device 414 is a spool for storing an image to be printed until the printing is completed.

An order status table 415 is used to store an order status to manage the process status of the print order, which will be described later while referring to FIG. 10.

The order management table 416 is used to store print order data, which will be described later while referring to FIG. 8.

The edit image location management table 417 has the same layout as the original image location management table 412, which will be described later while referring to FIG. 12, and is used to manage the names of paths for image files, which are stored in the display/edit image location device 411, and corresponding image IDs.

The center transmitting box 418 and the center receiving box 419 store, on the HDD 1009, the data that are to be transmitted to and are received from the image server 111 and the print server 121.

<Client Computer>

Figure 5:
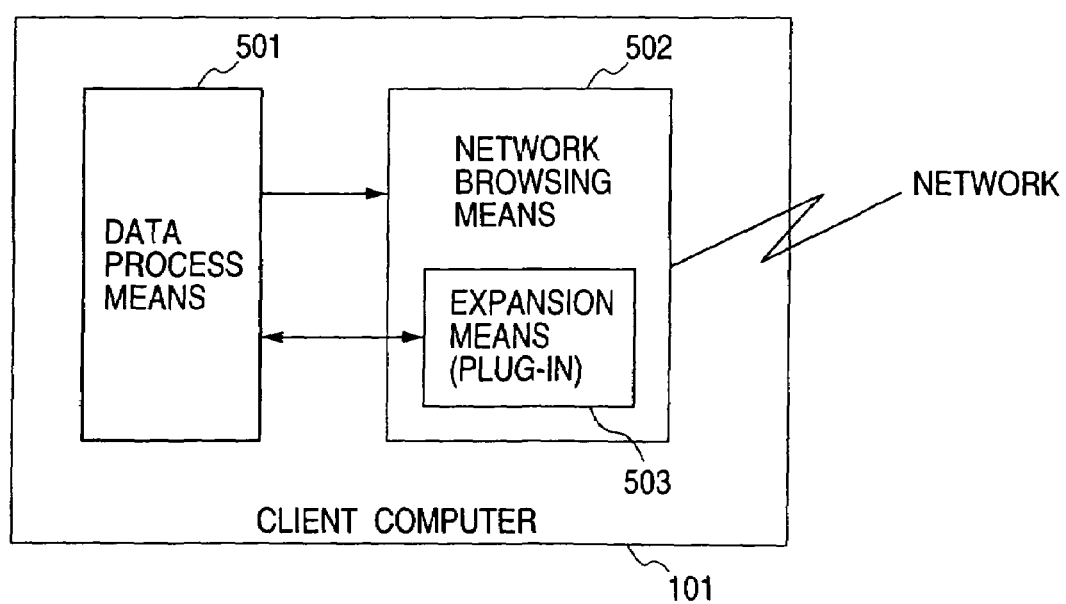
FIG. 5 is a diagram showing a modular arrangement for a client server according to the embodiment of the present invention.

FIG. 5 is a diagram for explaining the arrangement of a client computer, an information processing apparatus that is actually used by a user. The data process means 501, the network browsing means 502 and the expansion means 503 are provided as application programs that are to be read from the ROM 1003, the HDD 1009 or the FDD 1010, and are to be written to the RAM 1002 for execution.

Provided for the data process means 501 are a function for preparing or editing a document, to include data for characters, graphics and images; a function for translating document data written using a page description language; and a function for obtaining from the center server 102, via the expansion means 503 that is operated in the network browsing means 502, an image to be edited for preparing a print order, to include the edited page description language data, and for dispatching, via the explanation means 503, a print order to the center server 102.

The network browsing means 502 is an application program (a general application program, such as a so-called Internet browser) whereby an external service can be obtained across the network from, for example, the Internet.

The network browsing means 502 can expand its function by incorporating the expansion means 503 (a plug-in module), which is an application program added to the network browsing means 502. Since the network browsing means 502 is so provided that priority is given to the browsing of a document, such as an image, across the network, and to the transmission of the document to the client computer 101, the expansion means 503 is employed to interact with an external application program, such as the data process means 501.

The expansion means 503, an application program stored on the HDD 1009, can be employed by writing it to the RAM 1002 together with the network browsing means 502. The expansion means 503 includes a function for interacting with the network browsing means 502 and obtaining, from the network, data to be processed by the data process means 501; a function for displaying the received data on the CRT 1006; a function for transmitting the received data to the data process means 501; and a function for transmitting, to the network, print order data that are prepared by the data process means 501.

The print order dispatching function of the data process means 501 may be performed by the order receiving means in the center server 102, and the data display function and the print order data transmission means of the expansion means 502 may be performed by the network browsing means 502. In this case, the data process means 501 and the expansion means 503 are not required for the present invention.

<Image server>

Figure 6:
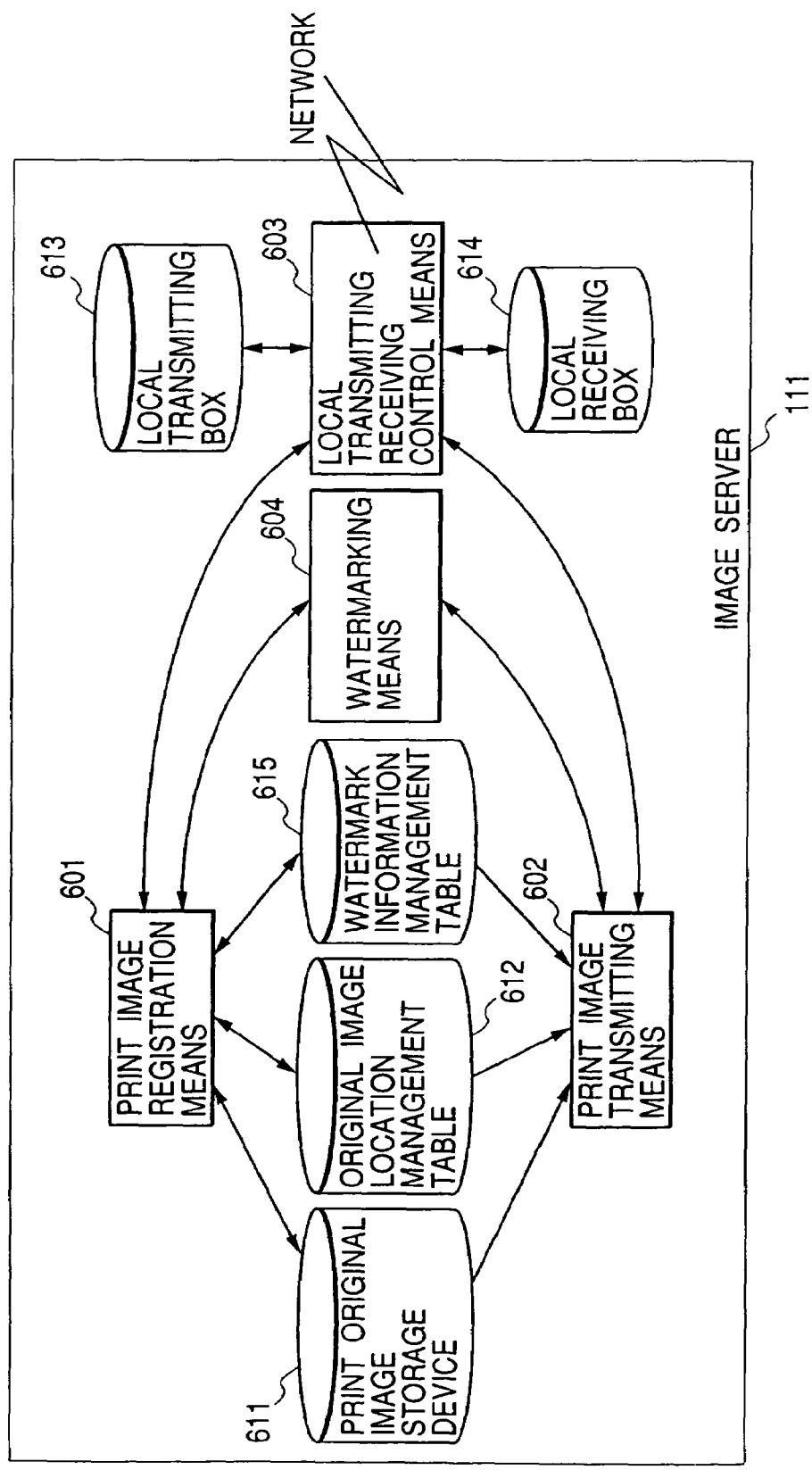
FIG. 6 is a diagram showing a modular arrangement for an image server according to the embodiment of the present invention.

FIG. 6 is a diagram illustrating the arrangement of the process means and data to be managed in one of the image servers 111 to 11N. In FIG. 6, process means 601, 602, 603 and 604 are application programs that are read from the ROM 1003, the HDD 1009 or the FDD 1010 and are written to the RAM 1002.

A print image registration means 601 is an application for, relative to a watermark information management table 615, registering, moving, copying and deleting an image and various information concerning an electronic watermark that is to be applied to the image. The print image registration means 601 includes: a function for, in accordance with an instruction entered by an administrator at the KB 1008, reading the original image from an external storage device, such as a CD-ROM, and storing it in a print original image storage device 611, which will be described later; and a function for deleting an image in the print original image storage device 611.

The print image registration means 601 also includes a function for updating an original image location management table 612, which will be described later, a function for generating a display/edit image, and a function for transmitting the display/edit image to the center server 102 via a local transmitting/receiving control means 603, which will be described later. In the process for storing the print original image and the process for generating an edit/display image, the watermark information management table 615 is searched. When the application of an electronic watermark to an image is designated, watermarking means 604, which will be described later, is activated and is requested to apply an electronic watermark.

Print image transmitting means 602 is an application program that includes a function for analyzing a print image transmission request that is received by the local transmitting/receiving control means 603, for employing the original image location management table 612 to obtain a required print image from the print original image storage device 611, and for transmitting the image via the local transmitting/receiving control means 603 to the request transmission source. This means 602, as well as the print image registration means 601, searches the watermark information management table 615 before transmitting the print image. When the application of an electronic watermark to the print image that is to be transmitted is designated, the watermarking means 604 is activated and is requested to apply an electronic watermark.

The local transmitting/receiving control means 603 includes: a function for managing data that are prepared by an application program, such as the print image registration means 601 in the image server, and are stored in a local transmitting box 613, which will be described later, for transmitting, via the NETIF 1004, a transmission/reception start request to the center server 102, and for extracting and transmitting requested data held by the local transmitting box 613; and a function for storing the data received from the center server 102 in a local receiving box 614, which will be described later, and for reading from the HDD 1009 and writing to the RAM 1002, for execution, an application program for analyzing and processing the received data.

The watermarking means 604 is an application program that is activated by the print image registration means 601 and the print image transmitting means 602. This means 604 includes a function for, upon receiving a request from the print image registration means 601 and the print image transmission means 602, applying an electronic watermark to a requested image and transmitting the resultant image to the requesting means; and a function for, when an applied electronic watermark is removable, transmitting to the requesting sources information required for the removal of the electronic watermark. While the watermarking means 604 has a function for removing a visible watermark from an image, the image server does not need to remove such a visible watermark, so that this function can be separated and may not be mounted.

The print original image storage device 611 is a device for storing an original image file having a high resolution that is used for a print image, and that is written on the HDD 1009 or on a removable disk for which data reading and writing is possible using the FDD 1010.

The original image location management table 612 is a table for managing the path name of a print image, which will be described later while referring to FIG. 12, and is stored as a database or a searchable file on the HDD 1009.

The local transmitting box 613 and the local receiving box 614 store data to be transmitted to and received from the center server 102.

The watermark information management table 615 is a table in which is stored a variety of information concerning an electronic watermark, which will be described later while referring to FIG. 37. The watermark information management table 615 is stored as a database or a searchable file on the HDD 1009.

<Print server>

Figure 7:
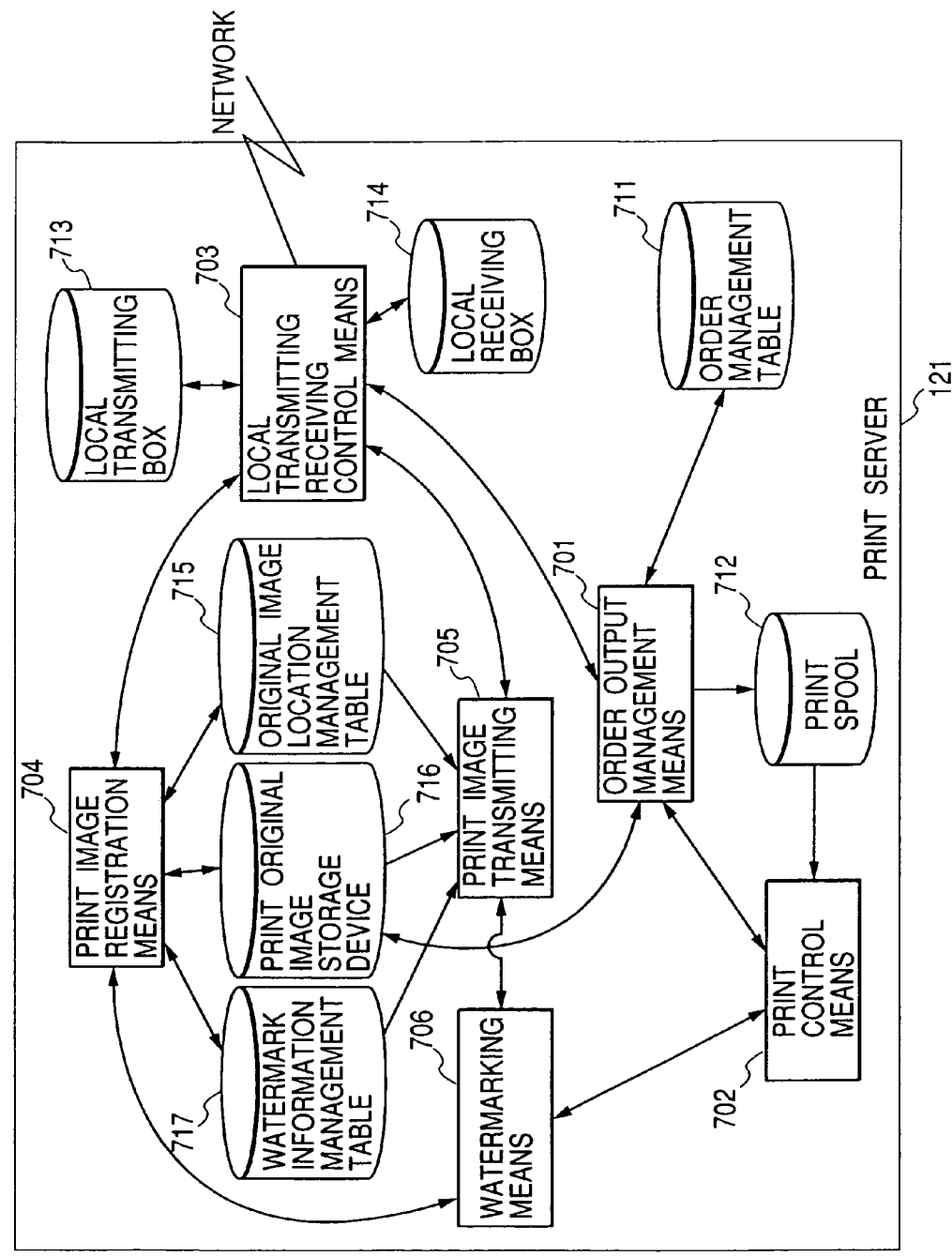
FIG. 7 is a diagram showing a modular arrangement for a print server according to the embodiment of the present invention.

FIG. 7 is a diagram illustrating the arrangement of process means and managed data in one of the print servers 121 to 12N. In FIG. 7, process means 701, 702, 703, 704, 705 and 706 are application programs that are to be read from the ROM 2003, the HDD 2009 or the FDD 2010 and written in the RAM 2002.

Order output management means 701 is an application program that manages the processing status of a print order transmitted by the center server 102. The order output management means 701 includes: a function for receiving a print order from the center server 102 via local transmitting/ receiving control means 703, which will be described later, and for analyzing the print order and storing the results in an order management table 711, which will be described later; a function for, upon receiving a print instruction entered by an operator at the KB 1008, preparing a print spool 712 for print data that will be described later, and for transmitting a print start instruction to print control means 702, which will be described later; and a function for receiving from the print control means 702 a print end notification, and for preparing print end notification data and transmitting it, via the local transmitting/receiving control means 703, to the center server 102.

The print control means 702 is an application program that prepares a final print image and transmits it to the PRTC 2011 for printing. The print control means 702 includes: a function for editing the final print image by employing editing information and a print original image that are stored in the print spool 712; a function for, when a removable, visible watermark is applied to the print original image, activating watermarking means 706, which will be described later, and requesting that it remove the visible watermark by using visible watermark removal information that is stored with the image in the print spool 712; and a function for, when the printing process is completed, transmitting a print end notification to the order output management means 701.

The local transmitting/receiving control means 703 corresponds to the local transmitting/receiving means 603 of the image server 111. The local transmitting/receiving control means 703 includes: a function for managing data that are prepared by an application, such as the order output management means 701 in the print server, for transmitting a transmission/reception start request to the center server 102 via the NETIF 2004, and for extracting transmission data from a center transmitting box 713; and a function for storing in a local receiving box 714, which will be described later, data that are received from the center server 102, and for reading, from the HDD 2009, an application program for analyzing and processing the received data and for writing the program in the RAM 2002 for execution.

The print image registration means 704 is an application program that corresponds to the print image registration means 601 in the image server 111, and performs, relative to a watermark information management table 717, the new registration, moving, copying and deletion of various information concerning a print image and an electronic watermark that is applied to the image. This print image registration means 704 includes: a function for, upon receiving an instruction entered by an administrator at the KB 2008, reading a print original image from an external storage device, such as a CD-ROM, by using the FDD 2010, and for storing the print original image in a print original image storage device 716, which will be described later; and a function for deleting an image from the print original image storage device 716. In addition, the registration means 704 includes a function for updating an original image location management table 715, which will be described later, a function for generating a display/edit image, and a function for transmitting to the center server 102, via the local transmitting/receiving control means 703, the original image location information and the display/edit image.

In the process of storing a print original image and the process of generating an edit/display image, a search of the watermark information management table 717 is performed by the print image registration means 704. When the application of an electronic watermark to an image is designated, watermarking means 706, which will be described later, is activated and is requested to apply an electronic watermark.

The print image transmitting means 705 is an application program that corresponds to the print image transmitting means 602 in the image server 111. The print image transmitting means 705 analyzes a print image transmission request received by the local transmitting/receiving control means 703, employs the original image location management table 715 to obtain a required print image from the print original image storage device 716, and transmits the print image to the requesting transmission source via the local transmitting/receiving control means 703. This means 705, as well as the print image registration means 704, searches the watermark information management table 717 before the print image is transmitted. When the application of an electronic watermark to the print image that is to be transmitted is designated, the watermarking means 706 is activated and is requested to apply an electronic watermark.

The watermarking means 706 is an application program that substantially corresponds to the watermarking means 604 in the image server 111, and is activated by the print control means 702, print image registration means 704 and the print image transmitting means 705. This means 706 includes: a function for, upon receiving a request from the print image registration means 704 and the print image transmitting means 705, applying an electronic watermark to an image and transmitting the resultant image to the requesting sources; a function for, when the applied electronic watermark is removable, transmitting to the requesting sources removal information for removing the watermark;

and a function for, upon receiving a request from the print control means 702, employing the visible watermark removing information to remove the removable visible watermark from the image.

Since in the print server 121 a print image to which a removable, visible electronic watermark has been applied may be stored in the print spool 712, a function for removing a visible watermark is required.

In this embodiment, the watermarking means has both a watermark application function and a watermark removal function; however, the application function and the removal function may be performed by separate means. In this case, the combined watermarking application means and watermarking removal means is simply called watermarking means in order to correspond to the explanation given for the above embodiment.

The order management table 711 is a database, or a searchable file, that is be stored on the HDD 2009. Print order data, which will be described later while referring to FIG. 8, and an order status table related to the processing state of a print order, which will be described later while referring to FIG. 10, are stored in the order management table 711.

The print spool 712 is used to temporarily store editing information and all the print original images that are required by the print control means 702 for printing, as well as visible watermark removal information, if a removable, visible watermark is applied to the print original images.

The local transmitting box 713 and the local receiving box 714 correspond respectively to the local transmitting box 613 and the local receiving box 614 in the image server 111, and store, on the HDD 2009, the data to be transmitted to and the data received from the center server 102.

The original image location management table 715 corresponds to the original image location management table 612 in the image server 111, and is used to manage the path name of a print image, which will be described later while referring to FIG. 12. The original image location management table 715 is stored on the HDD 2009 as a database or a searchable file.

The print original image storage device 716 corresponds to the print original image storage device 611 in the image server 111, and is a high-resolution, original image file used for printing. This file is stored on a removable disk for which reading and writing is possible using the HDD 2009 or the FDD 2010.

The watermark information management table 717 corresponds to the watermark information management table 615 in the image server 111, and is used to store a variety of information concerning an electronic watermark, which will be described later while referring to FIG. 37. The watermark information management table 717 is stored on the HDD 2009 as a data base or a searchable file.

In this embodiment, since the print original image and its management function are provided for the print server 121, additionally included in the print server 12, in order to further reduce the transmission load, are the functions of the image server 111. It should be noted, however, that this embodiment can be implemented even if the print server 121 does not include the functions 704, 705, 715, 716 and 717, which correspond to the functions of the image server.

When the NETIF 2004 of the print server 121, or the NETIF 1004 of the image server 111, and the network 130 are replaced by a mobile communication system, a digital communication system, for example, one such as the Personal Handyphone System (PHS) in Japan or the DECT in Europe, this embodiment can be employed in the environment provided by the mobile communication system.

<Watermark Information Management Table>

FIG. 37 is a diagram showing the data structure of the watermark information management table used for this embodiment. The watermark information management table is used to store information for the application of an electronic watermark to an image that is processed using this embodiment. When a print original image is to be registered in the print original image storage devices of the image servers 111 to 11N and the print servers 121 to 12N, data corresponding to instructions issued by a copyright holder are registered by the print image registration means 601 and 704. At this time, the copyright holder can register data conforming to his or her intended purpose. During the registration of a print original image, the transmission of a print original image, and the transmission of a display/edit image, the registered data are searched for by the print image registration means 601 and 704 and the print image transmission means 602 and 705. When the pertinent data are obtained, the registered data are transmitted with the image to the watermarking means 604 and 706, which then apply an electronic watermark to the data. The data structure of the watermark information management table and the terms used in the table will now be described while referring to FIG. 37.

In FIG. 37, an image ID 3701 is used to identify an image, and in this embodiment unique numbers are used, which will be described later while referring to FIG. 9. The same image ID is assigned to a plurality of image files located at a remote area if the same image is stored in these image files.

Further, if there are two different intended purposes for the same image, such as display/edit and print, for both purposes the same image ID is assigned.

The intended purpose for an image in this embodiment is entered in column 3702. Since images having the same image ID 3701 are further sorted in accordance with their intended purpose, an electronic watermark corresponding to the intended purpose can be applied. For this embodiment, there are three types of intended purposes for images: as a "print original image", which is to be stored in the print original image storage devices 611 and 716; as a "display/edit image", which is to be transmitted by the image servers 111 to 11N or the print servers 121 to 12N and is to be stored in the display/edit image storage device of the center server 102; and as a "print image", which is to be transmitted by the image servers 111 to 11N and the print servers 121 to 12N and is to be used by the print servers 121 to 12N for printing.

The timing for an electronic watermark application is entered in a column 3703. In this embodiment, two types of timings are used: an "AT REGISTRATION" timing, which represents the time at which the print image registration means 601 and 704 registered a print original image; and an "AT TRANSMISSION" timing, which represents the time at which the print image transmission means 602 and 705 generated an image. In this embodiment, both the "AT REGISTRATION" and the "AT TRANSMISSION" timings can be registered for one image ID which has a single intended purpose. Since at the time at which the print image registration means 601 and 704 register an image, a display/edit image is generated in order for it to be transmitted to the center server 102, the timing for the performance of the registration and the transmission correspond. At this time, the application of an electronic watermark is performed using the same timing and following the order established for the "AT REGISTRATION" and the "AT TRANSMISSION" timings.

The type of electronic watermark application method is stored in a column 3704. In this embodiment, headings for three types of electronic watermarks are used: "INVISIBLE", which represents an invisible electronic watermark comprising data that is not visible; "UNREMOVABLE, VISIBLE", which represents a visible watermark comprising data that can not be removed; and "REMOVABLE, VISIBLE", which represents a visible watermark that can be removed from data by the watermarking means 604 and 706.

In this embodiment, a system is employed that can provide the three electronic watermark types; however, other types of electronic watermarks may be employed.

Data to which an electronic watermark has been applied are listed in a column 3705. In this embodiment, a character string is designated. In this data area, external reference data can be stored sequentially following an extension symbol. In this case, the watermarking means 604 and 706 do not obtain the data stored in the data area, but instead obtain external data for application to an electronic watermark. In FIG. 37, a character string is specifically represented by " ", and the extension symbol is represented by #. While the applied data 3705 in this embodiment is a character string, the form used for the applied data is determined in accordance with the electronic watermark that is employed. Therefore, if the data used for electronic watermarking are image data, the substance of the image data to be applied, or the path to an image data file is entered in the applied data column 3705.

If the applied data form differs in accordance with the electronic watermarking method, as in the embodiment, data are represented by using a character string, and the data are changed to a form corresponding to the electronic watermarking method before an electronic watermark is applied to the data. Furthermore, the applied data column 3705 can be so designed that it is possible to enter a plurality of data forms, such as a character string and image data.

When the above described data are entered in a single line in the watermark information management table, together they constitute a single record. An explanation will now be given for data strings 3711, 3712, 3713, 3714, 3715, 3716 and 3717 in FIG. 37.

The data string 3711 represents watermark information for an image having "CANON/IS03/1998ABC002" for the image ID 3701 and "ORIGINAL IMAGE" for the intended purpose 3702, i.e., a print original image to be stored in the print original image storage devices 611 and 716. That is, it means that the applied data 3705 entry "COPYRIGHT 1998 abcd" refers to an image for which the watermark type 3704 entry "INVISIBLE" had already been assigned at the time, as indicated by the applied timing 3703 entry, the image was registered by the print image registration means 601 and 704. Similarly, in the data string 3712 the entry "SAMPLE" refers to an unremovable, visible watermark that was applied to a display/edit image, for which the image ID 3701 is "CANON/IS03/1998ABC002", before the image was transmitted by the image servers 111 to 11N or the print servers 121 to 12N. The data string 3713 is composed of data for external reference, and a print order that will be described while referring to FIG. 8 is employed as the applied data. The data strings 3715 and 3716 are composed of data for watermarks for a display/edit image having "CANON/IS03/1998ABC004" for the image ID 3701 and both "AT REGISTRATION" and "AT TRANSMISSION" timings. In the actual processing, as explained for the application timing 3703, the watermarks are applied at the same time following the order established for the applied timings 3703, "AT REGISTRATION" and "AT TRANSMISSION".

In this embodiment, the time at which data are transmitted by the server for the registration of data is defined as the "transmission time". However, the timing for the application of an electronic watermark may be further sorted to a timing at which data are transmitted by the image server or the print server to the center server, and a timing at which data are transmitted by the center server to the print server.

<Print Order Data>

FIG. 8 is a diagram showing the data structure of the print order data processed for this embodiment. The print order data constitute a data assembly whereby a user dispatches order information for this embodiment. The print order data are stored in the order management table 416 by the order receiving means 403 of the center server 102, and are employed by the order output management means 406. The print order data are also stored in the order management table 711 and employed by the order output management means 701 of the print server 121. The structure used for the print order data and various terms used in this embodiment will now be described while referring to FIG. 8.

A print order 801 in FIG. 8 is a unit with which a user dispatches a request for printing, and is identified by an order ID that is unique to this embodiment. The print order 801 is constituted by one or more sub-orders 802, and includes, as print order information, the identifier of the print server the user desires to use.

The order ID is a combination of the user ID of the user who dispatched the print order, the identifier (the IP address when connected to a network) of the client computer that received the order from the user, and the order submission time.

Each sub-order 802 is a unit to be printed by the print server, and is identified by a sub-order ID, a unique sequential number (001, 002, . . . ) selected from a series and assigned in order, beginning at the top. A sub-order 802 is constituted by one or more order items 803, and includes, as sub-order information, the paper size and the number of output copies.

An order item 803 is, for example, edit information 804 or an image ID 805, each of which is a constituent of the sub-order 802.

The edit information 804 is a script wherein the printing locations of the individual images are written using a page description language.

The image ID 805 is used to identify an image to be printed, and serves as one of the order items 803 that constitutes a sub-order 802. As will be described later while referring to FIG. 9, in the embodiment a unique number is assigned as the image ID 805. It should be noted that the image ID is used to identify an image, and if the same image is stored in a plurality of image files at a remote area, the same ID is also assigned to those image files.

Actually, a print order 801, a sub-order 802 and an order item 803 include user information and charge information; however, as these data are not especially required for the description of this embodiment, no explanation for them will be given.

<ID System>

FIG. 9 is a diagram for explaining the image ID and the order ID for this embodiment.

In FIG. 9, a delimiter (/) is used to separate into three portions an image ID 901, which is an identifier that is assigned to a print original image when it is registered.

A center server name 911 is used to identify the center server 102.

A server ID 912 is used to identify a server that has registered a print original image corresponding to the image ID. In this embodiment, the server ID 912 indicates either the image server 111 or the print server 121. An identifier, which is uniquely assigned to the image server 111 or the print server 121 that is connected to the center server 102, is employed as the server ID 912. The center server 102 also has a server ID.

It should be noted that the server ID 912 is used to maintain the uniqueness of the image ID, and it does not always need to match the server ID of the server at which the original image is stored.

A number 913 is assigned by the server that is in charge of registration, so that the original image that is registered can be uniquely identified. This number 913 is prepared by using the time at which, for example, the registration process was started.

As is described above, the data 911, 912 and 913 are employed to maintain the uniqueness of a print original image for this embodiment.

In addition, a delimiter (/) is used to separate into three portions an order ID 902 in FIG. 9. The order ID 902 is an identifier that is assigned by the center server 102 when a print order is received from a user.

A user ID 914 is identifies the user who dispatched the print order.

A server ID 915 is the server ID of the center server 102 that received the print order.

A number 916 is assigned by the center server 102 that performs the order receiving process in order to uniquely identify the received print order. The number 916 is prepared by using, for example, the time at which the order receiving process was started.

As is described above, the data 914, 915 and 916 are employed to maintain the uniqueness of the print original image.

<Order Status Table>

FIG. 10 is a diagram for explaining the order status table 415 used for this embodiment. The order status table 415 is stored as a database or a searchable file on the HDD 1009 at the center server 102, and is used primarily by the image collection means 405 to manage the print image collection condition for each print order and to control the individual processes represented by flowcharts that will be described later. The order status table 415 can be stored in the RAM 1002 of the center server 102.

An order ID is entered in a column 201 in FIG. 10 to identify a print order received by the center server 102 that is currently being processed, or has already been processed.

A component of an order identified by the order ID 201 is entered in a column 202. In this embodiment, a sub-order ID for identifying a sub-order is entered.

An image ID for a print original image is entered in a column 203, and is used by a component of a sub-order that is identified by the sub-order ID 202.

An entry in a status column 204 represents a condition during which print original images, and images for a corresponding order and a corresponding sub-order, are collected. A value is entered that indicates an "IMAGE COLLECTION ON" or an "IMAGE COLLECTION END" status.

The sets of data 211, 212 213 and 214 are examples of the data that are entered in the order status table 415.

In FIG. 10, while a hyphen (-) is placed in a column for which no entry available, entries that represent the status of the preparations for the individual print images and the condition of each order or each sub-order are made in other columns. For example, entered in the fourth set of data 214 in FIG. 10, are the order ID "USR1/PC1/0002", the sub-order ID "0001", the image ID "CANON/PS5/199801050027", and the status "IMAGE COLLECTION END", which indicates that the print image data are already present at the center server 102 and are ready to be transmitted to the print server 121.

Above, entered in the third set of data 213 is the sub-order "0001", the image ID "CANON/PS5/199801010758" and the status "IMAGE COLLECTION ON", which indicates that the print image has not yet been prepared. Then, entered in the second set of data 212 is the sub-order "0001" and a second entry that indicates the print image has not yet been prepared, and entered in the first set of data 211 is the order ID "USR1/PC1/0002" and a second entry that again indicates that the print image has not yet been prepared.

Although one print order can be maintained as a single data structure, in this embodiment, the data for one print order is stored by sorting it to the order management table and the order status table, so that the individual processes need not be drastically changed when the print order is subjected to an alteration such as the addition of information.

<Server Management Table>

FIG. 11 is a diagram for explaining a server management table used for this embodiment. The server management table is stored on the HDD 1009 of the center server 102 as a database or a searchable file for managing information for all of the image servers and print servers that are connected to the center server 102. In this embodiment, the server management table is used in the original image location determination process, which will be described later while referring to the flowchart in FIG. 15. The server management table can also be stored in the RAM 1002 of the center server 102.

In FIG. 11, a server ID 1001 is an identifier for uniquely identifying each of the image servers and print servers that are connected to the center server 102.

An image obtaining priority order 1102 is a numerical value that is used as a determination reference when original images having the same image ID are stored in a plurality of image servers or print servers. The image obtaining priority order 1102 is set in advance as a value that is relative to the cost of transmitting image data to the center server during the collection of the original images, which will be described later. It should be noted that the transmission cost here is not just the immediate costs associated with the transmission of an image, but is the total cost, including ancillary expenditures such as for time expended, beginning with the reception of a request for an image from the center server 102 and continuing until the image is transmitted. The image obtaining priority order 1102 is a value ranging from 1 to 999, and the lower the value the lower is the transmission costs associated with image acquisition.

For example, a value of 100 is set for a server that is present on in the same LAN (Local Area Network) as the center server 102; a value of 200 is set for a server that is not present on the same LAN but is constantly connected to the network; and a value 300 is set for a server that is not present on the same LAN and is connected to the network not constantly but by dial-up. Further, a value obtained by adding 20 to these values is set for a server that has a high access frequency and low processing efficiency, though it is on the same LAN.

<Original Image Location Management Table>

FIG. 12 is a diagram for explaining an original image location management table used for this embodiment. The original image location management table is stored as a database or a searchable file on the HDD 1009 of the center server 102, the HDD 1009 of the image server 111 and the HDD 2009 of the print server 121, and is used to specify the storage location of an original image required for printing using the individual flowcharts, which will be described later. It should be noted that data for available print images that are stored in all the image servers and the print servers connected to the center server 102 are entered in the original image location management table in the center server 102. Further, data for original images for printing that are stored on the HDD 1009 or the HDD 2009, or on the FDD 1010 or the FDD 2010, are entered in the original image location management table of the image server or the print server. The original image location management table can be stored in the RAM 1002 or the RAM 2002 of each server.

In FIG. 12, an image ID 1201 is entered for an image that is available for printing.

A user ID 1202 is entered for the owner of each print image, and is uniquely determined for each image ID. For an image that is available to users besides the owner for counter value or for free, no user ID is entered for this column.

A storage location 1203 entry represents the location at which the print image data for the pertinent image ID is stored. In the storage location management table in the center server 102, this storage location is represented by the server ID of the image server 111 or the print server 121 whereat the pertinent image is stored, or by the path name for the print image that is stored on the HDD 1009 of the center server 102. A plurality of values can be stored for one image ID.

Additional information, such as the ID of a print order for a temporary file for printing, or original image file deletion control information, is stored in a column 1204.

For the management table of the image server 111 or the print server 121, entered in the additional information 1204 is the path name for a print image that is stored on the HDD 1009 or the HDD 2009 of the pertinent server.

It should be noted that a registration date or an image size can be stored as another entry.

The original image location management data 1211, 1212, 1213 and 1214 sets are examples of the data that is to be entered in the original image location management table. The example in FIG. 12 is the original image location management table for the center server 102.

For example, the entries shown for the original image management data 1211 indicate that a user identified by the user ID "USR123" owns the print image data that is identified by the image ID "CANON/PS01/1998ABC001", and that the pertinent print image data are stored on the HDD 2009 or the FDD 2010 of a print server that is identified by the server ID "PS01".

The entries shown for the original image location management data 1212 indicate that the print image data identified by the image ID "CANON/IS01/1998ABC002" are stored as an image file, identified by the path name "E:¥spop1¥image1.jpg", on the HDD 1009 or the FDD 1010 of the center server 102. As will be described later, it should be noted that when, as in the original image location management data 1212, a path name is entered as a storage location in the original image location management table in the center server 102, the pertinent print image file is temporarily stored for transmission to the print server. The image that is temporarily stored is owned by each print order that is identified in the additional information, and in this example, an image that such as this is indicated by the data entry "USR13345/CENTER/0001".

The entries in the original image location management data 1213 and 1214 indicate that print image data identified by the image ID "CANON/IS03/1998ABC003" are stored in both the image server "IS02" and the print server "PS07".

It should be noted that only the path name in the image server 111 or the print server 121, as in the original image location management data 1212, or the volume name for a removable disk, such as a CD that can be loaded into the FDD 1010 or into the FDD 2010 for reading, and the original image location management data that includes the path name in the pertinent volume are entered in the storage location 1203 in the original image location management table of the image server 111 or the print server 121.

<Transmission Data Format>

FIG. 13 is a diagram for explaining a transmission data format used for this embodiment. The format shown in FIG. 13 is employed as a data file that is to be exchanged by the center server 102 and the image server 111 or the print server 121.

The "standard generalized markup language (SGML)", which conforms to the ISO08879 standards, is employed as the transmission data format for this embodiment.

In FIG. 13, a transmission file 1301 is to be transmitted by the print server 121 to the center server 102, and a transmission file 1302 is to be transmitted by the center server 102 to the print server 121.

As is shown in the transmission file 1301, tags that represent the contents of various transmission data are provided between a start tag <CAML> and an end tag </CAML>. Portions 1311, 1312, 1313, 1314, 1315, 1316, 1317 and 1318 are the transmitted data. When the data has a hierarchial structure like lower transmission data, the tag for lower transmission data is included between the start tag and the end tag for the pertinent data, as is shown by the tag <SUBODR> for the data 1312. The first character string of each tag is the tag name is an identifier that represents the tag contents.

One transmission file can include a plurality of transmission data sets of an arbitrary type.

Transmitting/receiving header data 1311 identifies the transmission source server and the destination server for the data file, and is the first data provided in each transmission data file. One transmitting/receiving header 1311 is provided for each transmission data file.

Order transmission data 1312 is used to transmit to the print server 121 a print order dispatched by a user. Since the order transmission data 1312 is used to transmit a print order 801 that has been described while referring to FIG. 8, the data 1312 includes <SUBODR> and <ODRITEM> as lower tags in order to store the data structure of the print order 801.

Original image transmission request data 1313 is used to transmit a request from the center server 102 to the image server 111 or the print server 121 to transmit a print original image file.

Image registration information transmission data 1314 is used to transmit a request from the center server 102 to the image server 111 or the print server 121 to newly register or delete a print original image.

Transmitting/receiving header data 1315 correspond to the transmitting/receiving header data 1311.

Original image registration process transmission data 1316 is used to transmit a request from the print server 121 to the center server 102 to newly register a print original image, to transmit a print original image to another print server or the image server 111, or to delete a print original image.

Original image transmission data 1317 are used by the print server 121 to transmit a print original image to the center server 102, following the reception of the original image transmission request data 1313 from the center server 102.

Print result notification data 1318 are used by the print server 121 to transmit the results of printing requested by print order to the center server 102, following the reception of the order transmission data 1312 from the center server 102.

Data 1321 represents an example where various data are stored in a transmission data file.

If a character, such as "<", is included in the data to be entered, the center transmitting/receiving control means 407, etc., may mistakenly identify it as the start of the transmission data tag during the analyzation of transmission data. Therefore, to store data other than the transmission data tag, the data are internally encoded as is shown in the data 1312.

Data 1322 is an example where image data for a transmission data file are transmitted as a separate file. The file name of the pertinent file is stored as a parameter in the tag for the data 1322.

<Script>

Figure 14:
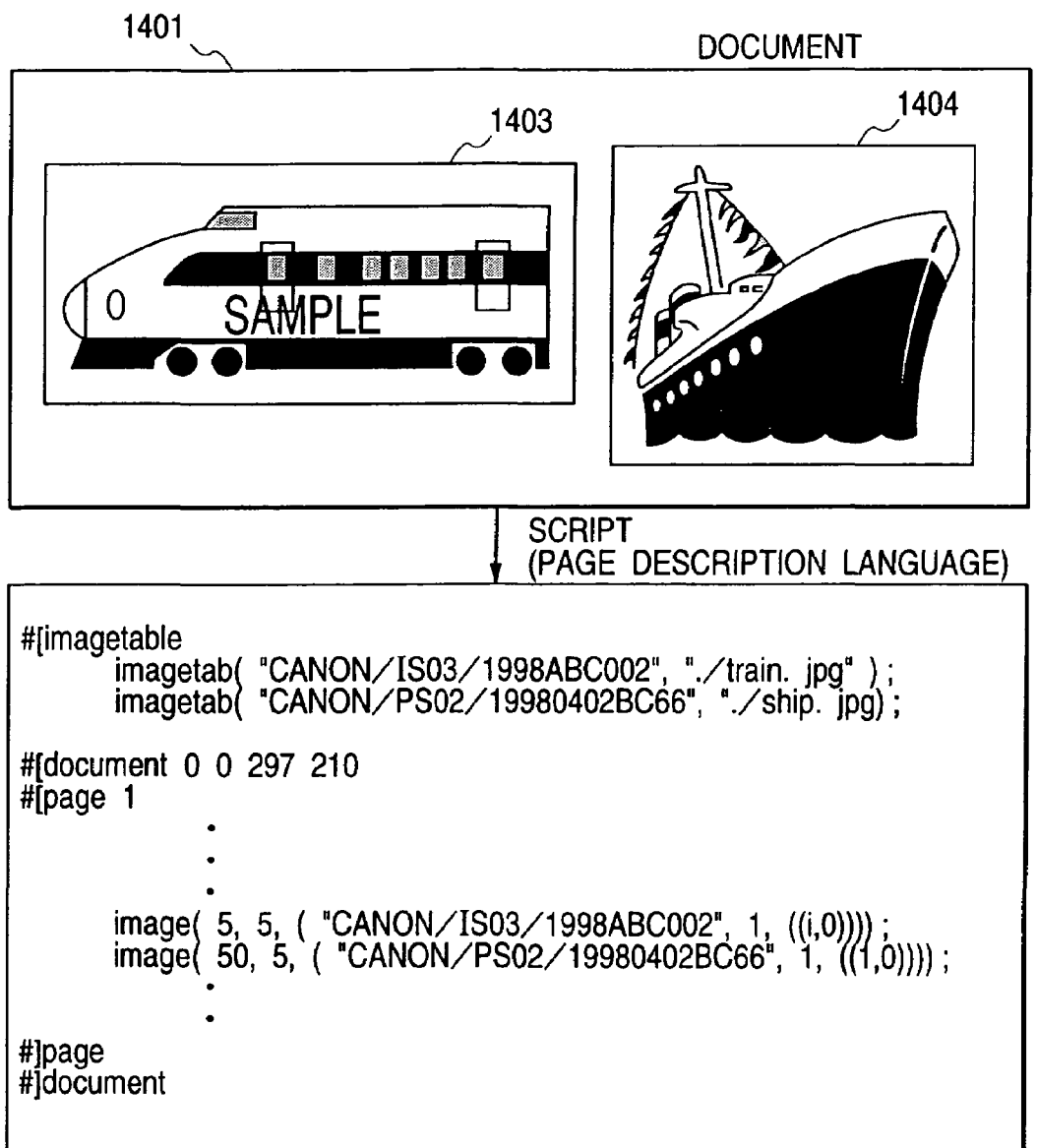
FIG. 14 is a diagram for explaining an example script written in a page description language used for the embodiment of the present invention.

FIG. 14 is a diagram for explaining an example script written in a page description language used for this embodiment.

In FIG. 14, a document 1401 is prepared by the data process means 501 at the client computer 101 and is to be finally printed by the print server 102. Image data 1403 and 1402 are included in the document 1401. In particular, the image data 1403 represents a removable, invisible watermark for which the watermark management information 3712 in FIG. 37 was used.

A script 1402 is obtained when the data process means 501 converts the document 1401 into a page description language. The script 1402 is prepared by the data process means 501 of the client computer 101, is transmitted via the center server 102 to the print server 102, and is analyzed by the print control means 702.

Since the data process means 501 edits a document by obtaining a low-resolution edit image from the center server 102, the amount of data transmitted across the network and the amount of memory required for editing can be reduced.

The data process means 501 stores the image IDs of the image data 1403 and 1404 in the image description portion (the portion "image( )") in the script 1402. It should be noted, however, that, since the data process means 501 employs a low-resolution edit image and the print control means 702 employs a print original image, the path name of an image file used by the data process means 501 or the print control means 702 is written in a table corresponding to "imagetab( )" at the head of the script 1402.

<Transmitting Box>

Figure 30:
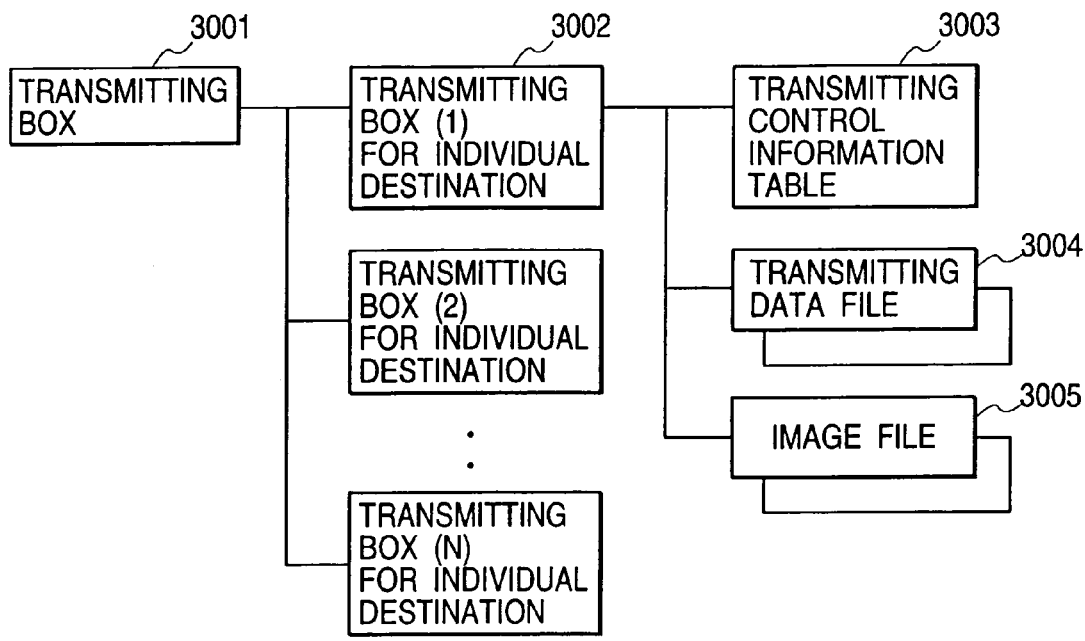
FIG. 30 is a block diagram for explaining the data structure of a transmitting box according to the embodiment of the present invention.

FIG. 30 is a block diagram for explaining the internal data storage structure in the center transmitting box 418 for the center server 102, the local transmitting box 613 for the image server 111, and the local transmitting box 713 for the print server 121. Since the functions of the transmitting boxes 418, 613 and 713 are the same, an explanation for a transmitting box 3001 in FIG. 30 will now be given.

The transmitting box 3001 is a data group that is to be stored on the HDD 1009 or the HDD 2009, and is stored by using, for example, a relational database that is available on the market. In this embodiment, however, a popular hierarchial file system (file storage method) is employed. This file system can store a file in a storage unit called a hierarchial directory.

The transmitting box 3001 corresponds to the center transmitting box 418 of the center server 102, the local transmitting box 613 of the image server 111, and the local transmitting box 713 of the print server 121. The transmitting box 3001 is a directory.

A transmitting box 3002 for an individual destination is a lower directory (subdirectory) of the transmitting box 3001. The transmission data can be sorted and stored in accordance with each destination by providing as a directory name the server ID of a transmission destination.

A transmitting control information table 3003 is a file that is to be stored in each transmitting box 3002. Information, such as the file name of a data file 3004 that is to be transmitted, is stored in the transmitting control information table 3003.

The transmitting data file 3004 has the data format shown in FIG. 13. A plurality of transmitting data files 3004 are stored in each of the transmitting boxes 3002.

A file 3005 has a format other than that shown in FIG. 13, and is referred to by using the tag <CAMLLINK> in the transmitting data file 3004. The file 3005 is hereinafter referred to as an image file. A plurality of image files 3005 are stored in each of the transmitting boxes 3002.

<Receiving Box>

Figure 31:
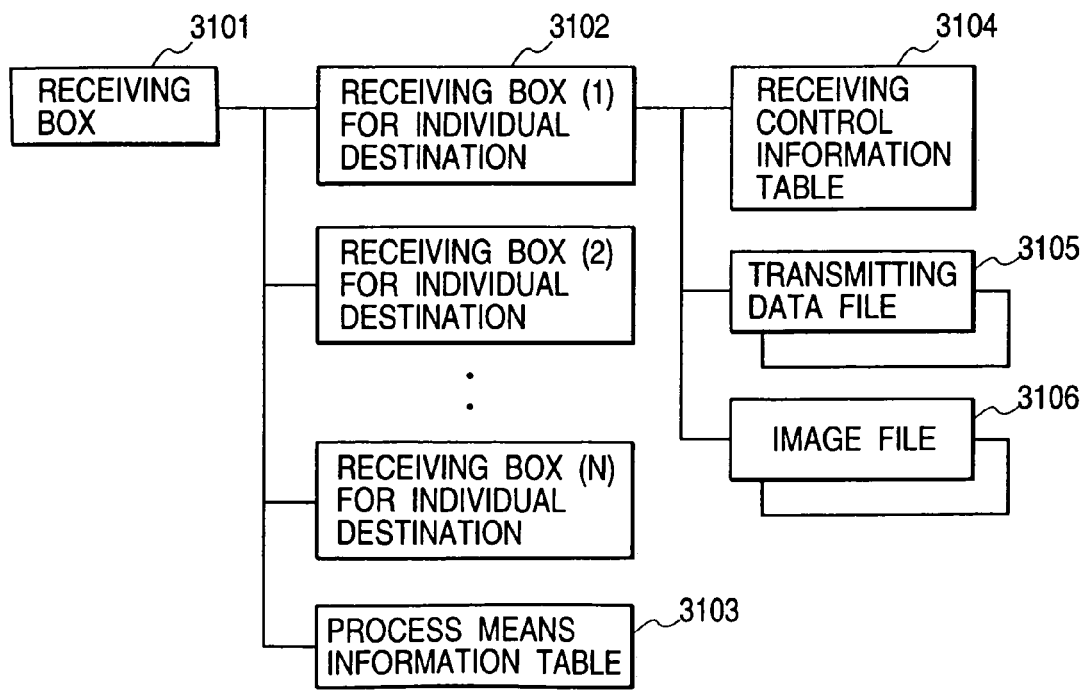
FIG. 31 is a block diagram for explaining the data structure of a receiving box according to the embodiment of the present invention.

FIG. 31 is a block diagram for explaining the internal data storage structure of the center receiving box 419 for the center server 102, the local receiving box 614 for the image server 111, and the local receiving box 714 for the print server 121. Since the functions of the receiving boxes 419, 614 and 714 are the same, an explanation for a receiving box 3101 in FIG. 31 will now be given.

The receiving box 3101 is a data group that is to be stored on the HDD 1009 or the HDD 2009, and is stored by using, for example, a relational database that is available on the market. In this embodiment, however, a popular hierarchial file system (file storage method) is employed. This file system can store a file in a storage unit called a hierarchial directory.

The receiving box 3101 corresponds to the center receiving box 419 for the center server 102, the local receiving box 614 for the image server 111, and the local receiving box 714 for the print server 121. The receiving box 3101 is a directory.

A receiving box 3102 for an individual transmission source is a lower directory (subdirectory) of the receiving box 3101. The received data can be sorted and stored in accordance with each transmission source by using the server ID of the transmission source as a directory name.

A process means information table 3103 is used to store the name of the process means that is to be activated, and an activation method that is in accordance with the tag, used for transmitting data in a transmitting data file 3105, when the file 3105 is received by the center transmitting/receiving control means 407, the local transmitting/receiving control means 503, or the local transmitting/receiving control means 703.

A receiving control information table 3104 is a file to be stored in each receiving box 3102. Information, such as the file name of the received data file 3105, is stored in the receiving control information table 3104.

The transmitting data file 3105 has the data format shown in FIG. 13. A plurality of transmitting data files 3105 are stored in each of the receiving boxes 3102.

A file 3106 has a format other than that shown in FIG. 13, and is referred to by using the tag <CAMLLINK> in the transmitting data file 3105. The file 3106 is hereinafter referred to as an image file. A plurality of image files 3106 are stored in each of the receiving boxes 3102.

<Transmitting/Receiving Control Information Table>

FIG. 32 is a diagram for explaining the data entries that are to be stored in the transmitting control information table 3003 and the receiving control information table 3104. Since data entries having the same values are stored in the transmitting control information table 3003 and the receiving control information table 3104, in the following explanation, these tables are collectively called a transmitting/receiving control information table.

The transmitting/receiving control information table is used to store a plurality of data records, each of which is constituted by the data group shown in FIG. 32. Each data record is uniquely identified by the value of a transmitting file name 3201.

The transmitting file name 3201 is the name of the transmitting data file 3004, the transmitting data file 3105, the image file 3005, or the image file 3106.

When the transmitting file name 3201 represents the image file 3005 or 3106, the name of the transmitting data file 3004 or 3105, including the tag <CAMLLINK> that indicates the pertinent image file, is stored as a transmitting data file name 3202. When the transmitting file name 3201 represents the transmitting data file 3004 or 3105, no value is entered for the transmitting data file name 3202.

In file size 3203 the number of bytes in a file represented by the transmitting file name 3201 is entered.

A box stored time 3204 represents a date and time at which a file represented by the transmitting file name 3201 was stored in the transmitting box 3001 or the receiving box 3101.

A transmitting end time 3205 represents a date and the time at which the transmission or the reception of a file represented by the transmitting file name 3201 was completed.

As is described above, the attributes of the transmitting data file 3004 or 3105, or the image file 3005 or 3106, are stored in the transmitting/receiving control information table.

<Process Means Information Table>

FIG. 33 is a diagram for explaining data entries that are to be stored in the process means information table 3103 in the receiving box 3101.

A plurality of data records, each of which is constituted by the data group shown in FIG. 33, are stored in the process means information table 3103. Each data record is uniquely identified by the value of a transmitting data tag name 3301. In this embodiment, it is assumed that a data record having the correct value is stored in advance in the process means information table 3103.

The transmitting data tag name 3301 is used to identify the various transmitting data that were explained for the transmitting data format in FIG. 13.

A method for starting the process means that should handle transmitting data identified by the transmitting data tag name 3301 is stored as a process means starting method 3302. If, for example, an application program is written in the RAM 1002 for execution, a starting method is employed whereby the program file name of that application program is stored and whereby the center transmitting/receiving control means 407, the local transmitting/receiving control means 603, or the local transmitting/receiving control means 703 reads the process means from the HDD 1009 or the HDD 2009 and writes it to the RAM 1002 for execution.

Transferring data information 3303 is the name of a data entry that the center transmitting/receiving control means 407, or the local transmitting/receiving control means 603 or 703, transmits from the RAM 1002 or 2002 to the process means after the pertinent process means has been started in accordance with the process means starting method 3302. The name of the data entry that is to be stored is, for example, the name of the transmitting data file 3105.

<Explanation of Operation>

The overall operation performed for this embodiment will now be described while referring to FIG. 1.

First, the image server 111 or the print server 121 provides a print original image for a management identifier (image ID) before registering the image with the server, and registers watermark management information in accordance with an instruction issued by the holder of the copyright for the pertinent image.

Then, the image server 111 or the print server 121 registers the print original image. The image server 111 registers images available to all the users, such as images that are provided primarily by the corporations that operate the servers. The print server 121 registers mainly personal images available only to the pertinent user, but can register the same print image as that registered in the image server 111 in order to reduce the load imposed by the transmission of the print image.

Following this, both servers 111 and 121 prepare a display/edit image at a low resolution in order to browse or edit an image. During the registration of a print original image or the preparation of a display/edit image, an electronic watermark is provided as needed, based on the watermark management information.

The image server 111 or the print server 121 transmits the display/edit image and the image registration information to the center server 102. The center server 102 stores the received display/edit image and the image registration information.

A user employs the client computer 101 to obtain an available edit image stored in the center server 102 and the information for the print servers 111 to 11N, and designates a desired image editing process. Then, the user selects one or more images and a desired print server 121, and dispatches a print order to the center server 102.

The center server 102 stores the information contained in the received print order, and employs the image registration information stored in the center server 102 to specify the storage location of a print image that is identified by the image ID included in the print order. The center server 102 then transmits, as needed, an image acquisition request to the image servers 111 to 11N or to the print servers 121 to 12N.

Upon receiving the image acquisition request, the image server or the print server employs the internally stored image registration information to specify the image that is to be transmitted, and transmits, to the center server 102, a print image to which an electronic watermark has been applied based on the watermark information.

The center server 102 receives the print image from the image server or the print server and stores it.

When all the print images required for the above print order are assembled at the center server 102 or at the destination print server 121, the center server 102 transmits the print order and the print original image to the print server 121.

Upon receiving the print order and the print image from the center server 102, and before performing the printing process in accordance with the print order, if a removable, visible electronic watermark has been applied to the print image, the print server 121 removes it. Thereafter, the print server 121 transmits the print end notification to the center server 102.

When the print end notification from the print server 121 is received, the center server 102 deletes the print images that were obtained via the print order, and updates the image registration information as needed.

<Image Registration in Print Server>

The processing performed by the print server 121 to register the print original image will now be described. The print server 121 is normally installed in a store such as a DPE shop, where generally image data brought in by a user are registered using the system of this embodiment.

The print server 121 employs the print image registration means 704 to register image data for the user and the watermark management information instructions that received from the holder of the copyright for the pertinent image. Then, the print server 121 employs the local transmitting/receiving control means 703 to transmit, to the center server 102, data representing the registration information. The registration of the transmitting data relative to the transmitting/receiving control means 703 is performed by storing a transmitting data file in the local transmitting box 713. During this registration process sequence, an electronic watermark that corresponds with the intended purpose is applied based on the watermark information used by the watermarking means 706.

The print image registration means 704 can not only register a new original image, it can also issue an instruction for the deletion of an original image that has been registered, and for moving or copying the original image to another print server 122 or to the image sever 112.

In this embodiment, the user is supposed to have obtained in advance a user ID which permits the employment of this embodiment.

Figure 15:
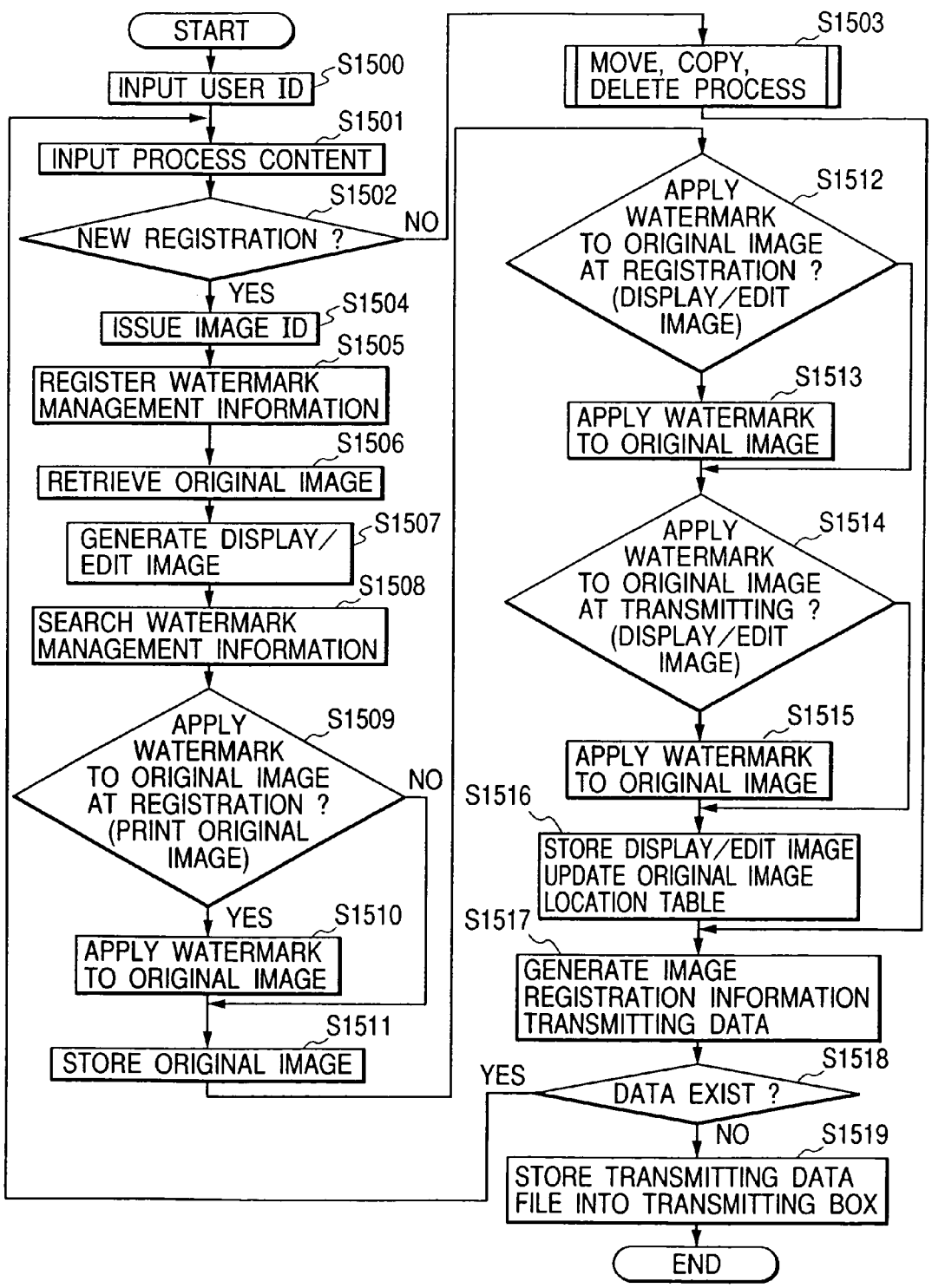
FIG. 15 is a flowchart showing the original image registration processing performed by the print server according to the embodiment of the present invention.

FIG. 15 is a flowchart showing the image registration processing performed by the print image registration means 704. The image registration processing performed by the print image registration means 704 will now be described while referring to FIG. 15.

At step S1500, a user has obtained a user ID for this embodiment, which is confirmed by his or her membership certificate. The user ID is entered at the KB 2008 and is stored in the RAM 2002.

At step S1501, the code used for identifying the contents of a process to be performed (hereinafter referred to as process code) is entered at the KB 2008, and is stored in the RAM 2002.

At step S1502, the process code stored at step S1501 is examined. If the process code represents a "new registration", program control moves to step S1504. If the process code is not for a "new registration", program control moves to step S1503.

At step S1503, an image that is registered in the print server 121 is moved, copied or deleted, and program control then goes to step S1517. A detailed explanation of this process this will not be given for this embodiment.

At step S1504, before the new image registration, the print server 121 generates a unique value based on the time, and prepares for the pertinent image an image ID as shown in FIG. 9 and stores it in the RAM 2002.

At step S1505, in accordance with instructions entered by the copyright holder at the KB 2008, the timing for the application of an electronic watermark, an electronic watermark type and electronic watermark applied data for a new image that is to be registered are registered in the watermark information management table 717. If an electronic watermark does not need be applied, an instruction to that effect is entered at the KB 2008, so that the registration of the information in the watermark information management table is not performed, and program control thereafter advances to the next step. Since the acceptance of an image is effected by the actions taken at the above described steps, the main process for the registration of the image is started at the next step.

At step S1506, an original image to be registered is read from a removable disk by the FDD 2010, and is written in the RAM 2002. Or, a printed image is read by the scanner 2014, and is written in the RAM 2002.

At step S1507, image conversion for reducing the resolution, the image size and the file size is performed for the original image that was written in the RAM 2002 at step S1506, and a display/edit image is prepared. This image is stored as a temporary file in the RAM 2002 or on the HDD 2009.

The display/edit image format prepared at step S1507 is changed into a format that can be processed by the data process means 501 and the expansion means 503 of the client computer 101. The image format at this time is, for example, JFIF (JPEG Interchange Format), which is one of the image data formats that use the JPEG compression algorithm, to which additional information, such as a comment, can be written. As the additional information, the image ID for the pertinent image that is prepared and stored in the RAM 2002 at step S1507 is written.

At step S1508, the watermark information management table 717 registered at step S1505 is examined to find watermark management information in which the application timing the registration time for the print original image, and the registration time or the transmission time is for the display/edit image prepared at step S1507. It should be noted that in this embodiment, since the timing at which the registration server transmits the image is defined as the transmission time, and the timing at which the image is registered or generated during the new registration process is defined as the registration time, data available for both the registration time and the transmission time can be found for the display/edit image. As a result of the search, information concerning the presence/absence of the above described three data types is stored in the RAM 2002.

At step S1509, a check is performed to determine whether the watermark registration information is present when the print original image stored in the RAM 2002 is registered. When the watermark management information is present, it is assumed that an electronic watermark is to be applied, and at step S1510, the electronic watermark is applied to the print original image when that image is registered. If it is determined that the copyright holder did not feel that the application of an electronic watermark was necessary for the print image when it is registered, program control goes to step S1511 because the registration of watermark management information was not performed at step S1505.

At step S1510, at the time of registration an electronic watermark is applied to the print original image. First, from among the data for the pertinent image ID, watermark management information for which the intended purpose is the application of a watermark to a "print original image", and the application timing, which is the "registration time", is read from the watermark information management table 717 and stored in the RAM 2002. The operation of the watermarking means 706 is then started. The request that the watermarking means 706 apply an electronic watermark is conveyed by providing it the location in the RAM 2002 of the image read at step S1506 and of the watermark management information stored therein, and the output destination of the image after the electronic watermark has been applied.

In this embodiment, the resultant image is output by transmitting its location to the RAM 2002. A request submitted to the watermarking means 706 for the above information may be issued using the standard method provided by an application program that implements this means, or by a notification method that is specifically designated. Furthermore, although in this embodiment the RAM 2002 is used as the image input/output area, the HDD 2009 or a removable disk in the FDD 2010 may be employed for storing the image file, or a combination of the RAM 2002 and such a disk may be employed.

The watermarking means 706 applies an electronic watermark to the received image based on the watermark management information, and outputs the resultant image to the RAM 2002, which is designated by the print image registration means 704. After the electronic watermark has been applied to the image, the watermarking means 706 transmits an end notification to the print image registration means 704. The processing is thereafter terminated.

If the watermark type used by the watermarking means 706 is a removable, visible watermark, the removal information for that watermark is also output. In this embodiment, the RAM 2002, the HDD 2009 or the FDD 2010 can be employed as an output destination for the removal information as well as for the image. If a format, such as the JFIF format, that includes a comment area is used for the image data, the removal information can be stored in the comment area.

In this embodiment, the method used for embedding image data in the comment area will now be described, while the simplicity of data distribution and an easy explanation of this embodiment are the prime object.

When the print image registration means 704 receives an electronic watermark application end notification from the watermarking means 706, the print image registration means 704 deletes the watermark management information from the output destination RAM 2002.

At step S1511, if an electronic watermark is applied to a print original image, the resultant print original image that is stored in the RAM 2002 is recorded on the HDD 2009 or on a removable disk on the FDD 2010. If an electronic watermark is not provided, the print original image read at the step S1506 is recorded. The storage location is designated by the manager of the print server 121 using the KB 2008, and is stored in the RAM 2002.

At step S1512, a check is performed to determine whether the watermark management information when the display/edit image stored in the RAM 2002 is registered is present or not. If the watermark management information is present, it is assumed that application of an electronic watermark is to be performed, and program control goes to step S1513. At step S1513, at the registration time, an electronic watermark is applied for the display/edit image. If a copyright holder determines that an electronic watermark is not necessary to be applied for the display/edit image at the time of registration, program control moves to step S1514 because registration of the watermark management information is not performed at step S1505.

At step S1513, at the registration time, the electronic watermark is applied for the display/edit image in the substantially same manner as at step S1510.

First, from among the data for the pertinent image ID, watermark management information for which the intended purpose is the application of a watermark to a "display/edit image", and the application timing, which is the "registration time", is read from the watermark information management table 717, and is stored in the RAM 2002. The operation of the watermarking means 706 is then started. The watermarking means 706 is requested to apply an electronic watermark by providing it the location in the RAM 2002 of the image generated at step S1507, or the name of the temporary file prepared on the HDD 2009, and of the watermark management information stored therein, and the output destination of the image after the electronic watermark has been applied.

The watermarking means 706 applies an electronic watermark to the received image based on the watermark management information, and outputs the resultant image to the RAM 2002 that is designated by the print image registration means 704. After the electronic watermark has been applied to the image, the watermarking means 706 transmits an end notification to the print image registration means 704. The processing is thereafter terminated.

Upon receiving the end notification from the watermarking 706, the print image registration means 704 deletes the watermark management information in the output destination RAM 2002.

At step S1514, a check is performed to determine whether the watermark management information when the display/edit image stored in the RAM 2002 is transmitted is present or not. If the watermark management information is present, it is assumed that application of an electronic watermark is to be performed, and program control goes to step S1515. At step S1515, at the transmission time, an electronic watermark is applied for the display/edit image. If a copyright holder determines that an electronic watermark is not necessary to be applied for the display/edit image at the time of transmission, program control moves to step S1516 because registration of the watermark management information is not performed at step S1506.

At step S1515, at the time of transmission, the electronic watermark is applied to the display/edit image in the substantially same manner as at step S1513. First, from among the data for the pertinent image ID, watermark management information for which the intended purpose is the application of a watermark to a "display/edit image", and the application timing, which is the "transmission time", is read from the watermark information management table 717 and is stored in the RAM 2002. The operation of the watermarking means 706 is then started. The watermarking means 706 is requested to apply an electronic watermark by providing it the location in the RAM 2002 of the image generated at step S1507 or of the image output if the process at step S1513 was performed, or the name of the temporary file prepared on the HDD 2009, and the location in the RAM 2002 of the watermark management information stored therein, in addition to the output destination of the image after the electronic watermark has been applied.

The watermarking means 706 applies an electronic watermark to the received image based on the watermark management information, and outputs the resultant image to the RAM 2002 that is designated by the print image registration means 704. After the electronic watermark has been applied to the image, the watermarking means 706 transmits an end notification to the print image registration means 704. The processing is thereafter terminated.

Upon receiving the end notification from the watermarking means 706, the print image registration means 704 deletes the watermark management information stored in the RAM 2002.

At step S1516, the image generated at step S1507 is stored as the display/edit image in the local transmitting box 713 if neither of the processes at steps S1513 and S1515 was performed. If only the process at step S1515 was not performed, the image to which an electronic watermark was applied at the time of the registration at step S1513 is stored in the local transmitting box 713. If the process at step S1515 was performed, however, the image to which an electronic watermark was applied at the transmission time is stored in the local transmitting box 713.

The user ID, the image ID and the storage location of the original image, which were stored in the RAM 2002 at steps S1500, S1504 and S1511, are entered in the original image location management table 715 in FIG. 12. The path name of the original image file stored at step S1511, or the volume name and the path name for a removable disk, is entered at the storage location 1202.

Figures 16, 17:
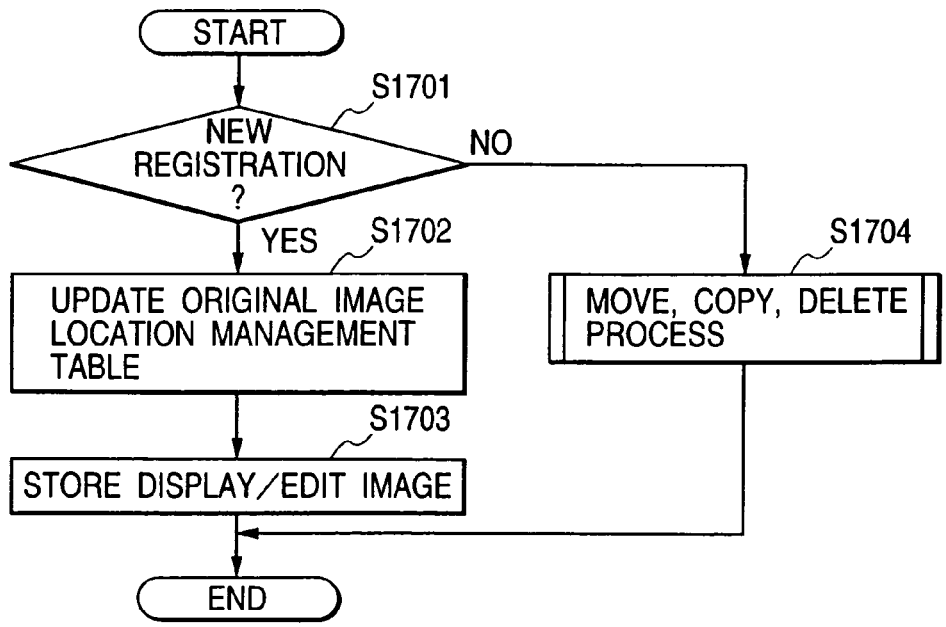
FIG. 16 is a diagram for explaining example image registration information transmission data according to the embodiment of the present invention.
FIG. 17 is a flowchart showing the original image registration processing performed by the center server according to the embodiment of the present invention.

At step S1517, the image registration information transmitting data shown in FIG. 16 are prepared by employing the user ID and the image ID, which were stored or prepared at the above steps, the path name of an image file that is stored in the local transmitting box 713, and the server ID of the print server 121 stored in advance on the HDD 2009. The obtained data are stored in the RAM 2002.

At step S1518, the number of original images to be processed for the pertinent user is examined. If there is one or more unprocessed original images remaining, program control returns to step S1501.

At step S1519, all the image registration information transmitting data, which were prepared and stored in the RAM 2002 at step S1517, are combined to form a transmitting data file. The transmitting data file is then stored in the local transmitting box 713, and together with the display/edit image is transmitted to the center server 102. As is shown in FIG. 13, the transmitting control information (TRANS tag) is additionally provided at the head of the transmitting data file.

If the image storage location in the print server 121 is to be moved or copied, only the data in the original image location management table 715 need be updated, and the preparation and the transmission of the image registration information transmitting data are not performed.

FIG. 16 is a diagram showing the example image registration information transmission data that are prepared at step S1517. The tag <REG> represents image registration information transmitting data, and "OPE" represents the process code (for a new registration, deleting, moving, or copying) for the transmitting of data. Parameters "ID", "CUST" and "SHOP" represent an image ID, a user ID and a server ID for the print server 121.

"./im012345.jpg" is the path name of an image file that is stored in the local transmitting box 713 at step S1519. It should be noted, that since the image file need not be transmitted when the process code is "delete", this entry is not prepared.

<Image Registration by Image Server>

The processing performed by image server 111 for registering a print original image will now be described. Generally, original images available to all the users, such as commercially available images for counter value or images provided for free, are registered in the image server 111. These images can be brought in by a copyright holder or his or her agent using a removable disk, such as a CD.

The image server 111 employs the print image registration means 601 to register the above image data, and employs the local transmitting/receiving control means 603 to transmit, to the center server 102, data representing the registration information. The data to be transmitted are registered in the transmitting/receiving control means by storing a transmitting data file in the local transmitting box 613.

Since the process performed by the print image registration means 601 is substantially the same as that performed by the print image registration means 704 at the print server 121, which was previously explained while referring to FIG. 15, only the differences between the two will be described by using the flowchart in FIG. 15 and the transmitting data in FIG. 16.

First, the print image registration means 601 does not perform the process at step S1500, because the process makes no distinction based on "user", and all the users can obtain a display/edit image from the client computer 101 to use.

In addition, in the process at step S1504 for numbering the image ID, the owner 1202 entered in the original image location management table 612 is not compared with the user ID, and no limitation is placed on the use of an image display.

Further, the "CUST" parameter in FIG. 16 is not prepared for the image registration information transmitting data that is prepared at step S1517.

The processes other than these are performed in the same manner as they are for the print image registration means 704 of the print server 121.

<Image Registration by Center Server>

The image registration process performed by the center server 102 will be described while referring to FIG. 4. In this process, by using the image registration information transmitting data and the display/edit image that are transmitted during the above described image registration processes performed by the print server 121 and the image server 111, the image information is registered in the center server 102. In the following explanation, a tag or a parameter enclosed by angle brackets (< >) is a value in the transmitting data shown in FIG. 13 or 16.

First, the center transmitting/receiving control means 407 receives the image registration information transmitting data and the display/edit image file from the image server 111 or the print server 121, and stores them in the center receiving box 419. The image file to be stored here may be a file to which an electronic watermark has been applied by the image server 111 or the print server 121.

Then, the center transmitting/receiving control means 407 sequentially analyses the data files that are stored in the center receiving box 419. If the image registration transmitting data (the tag <REG>) is included, the transmitting data are extracted from the data file and are stored in a temporary file in the HDD 1009.

Following this, the image registration means 404 in the center server 102 is read from the HDD 1009 and is written to the RAM 1002 for execution. The file name of the temporary file for the transmitting data that are stored in the HDD 1009, and the server ID of the transmission source that is written in the tag <TRANS> at the first of the data file, are transmitted to the image registration means 404.

FIG. 17 is a flowchart for explaining the image registration process performed by the image registration means 404 of the center server 102. The image registration means 404 reads the image registration information transmitting data from the image server 111 or the print server 121, and employs that information to update the original image location management table 412.

The image registration means 404 opens the transmitting file that corresponds to the file name of the temporary file that is transmitted by the center transmitting/receiving control means 407 at the time of activation. The image registration means 404 analyzes and stores the contents of the file, and performs the processing shown in FIG. 17. This processing will now be described while referring to FIG. 17.

At step S1701, the process code for the image registration information transmitting data in the RAM 2002 is examined. If the code specifies a new registration ("NEW"), program control advances to step S1702. If the process code does not specify a new registration, program control goes to step S1704.

At step S1702, the image ID (parameter <ID>) written in the image registration information transmitting data, and the server ID of the transmission source, which is transmitted by the center transmitting/receiving control means 407 at the time of activation, are additionally entered as new data in the original image location management table 412. At this time, if the user ID (parameter "CUST") is included in the image registration transmitting data, its value is entered in the owner column 1202 for the data added to the original image location management table 412.

At step S1703, image file tag <CAMLLINK> in the image registration information transmitting data is analyzed. The display/edit image file represented by the tag is extracted from the center receiving box 419, and is moved to the display/edit image storage device 411. At this time, if the user ID (parameter "CUST") is included in the image registration transmitting data, the extracted image file is stored in a directory, for which the number of accesses each user is permitted can be limited by the document service means 401. If the user ID is not written in the image registration transmitting data, the image file is stored in a directory that all the users can refer to.

At step S1703, the path name of the display/edit image file stored in the above process, and the corresponding image ID are stored as new data in the edit image location management table 417.

At step S1703, if the information for an image to be displayed and the information for an image to be edited are written as different image files in the image registration information transmitting data, these image files are processed separately. The information for the image to be displayed and the information for the image to be edited are stored in different directories.

At step S1704, processes for activities other than registration, the moving, the copying and the deleting processes, are performed. A detailed explanation for them will not be given.

<Transmitting File Registration Process>

Figure 34:
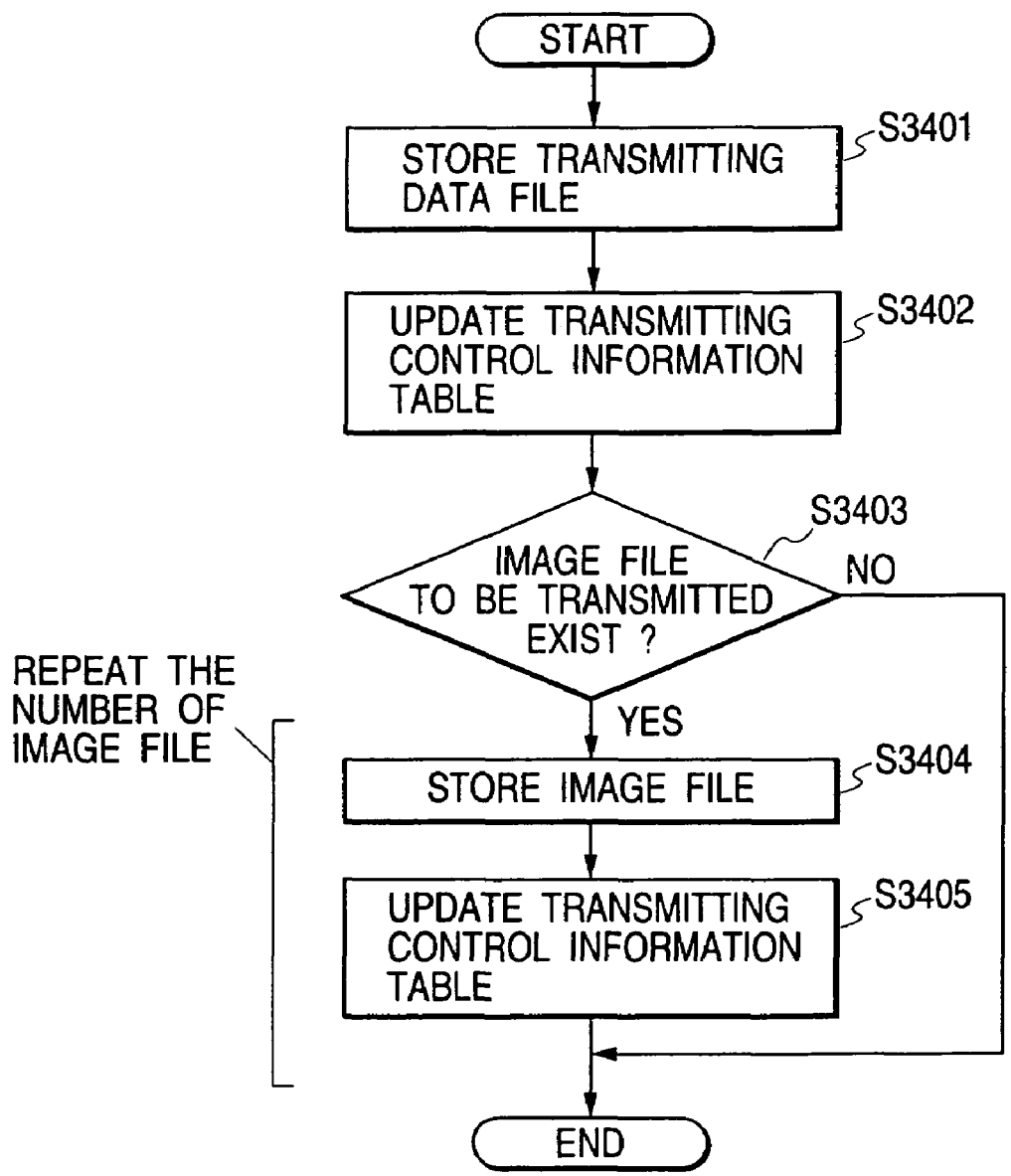
FIG. 34 is a flowchart showing the processing performed to register a transmission file in the transmitting box according to the embodiment of the present invention.

FIG. 34 is a flowchart showing the transmitting file registration processing performed by the center server 102, the image server 111, or the print server 121.

In the transmitting file registration process, a data file to be transmitted is registered in the transmitting box 3001. The individual means, such as the image collecting means 405, in the center server 102, the image server 111 or the print server 121 control this process. For these means, it is assumed that data to be transmitted have been prepared and can be stored as the transmitting data file 3004 having the format shown in FIG. 13, and that the server ID of the transmission destination server is stored in the RAM 1002 or the RAM 2002.

Further, the process time and a random number value are included in the file names of the transmitting data file 3004 and the image file 3005, so that these files are prevented from corresponding identically to files that have already been stored.

At step S3401, the data to be transmitted are stored, as the transmitting data file 3004, in the transmitting box 3002 for the transmission destination corresponding to the destination server ID that is stored in the RAM 1002 or 2002.

At step S3402, the transmitting/receiving control information shown in FIG. 32 is prepared by using the file name of the data file 3004 stored at step S3401, the file size and the current process time. The obtained control information data are written in the transmitting control information table 3003.

At step S3403, a check is performed to determine whether the tag <CAMLLINK> is present in the transmitting data. If the tag is present, program control goes to step S3404. If the tag is not present, the processing is thereafter terminated.

Until the processing for all the image files has been completed, the processes at steps S3404 and 3405 are repeated the number of times that is equivalent to the count of the image files that are represented by the tag <CAMLLINK> in the transmitting data.

At step S3405, the transmitting/receiving control information data in FIG. 32 are prepared by using the name of the image file 3005 stored at step S3404, the name of the transmitting data file 3004 stored at step S3401, the file size of the image file and the process time. The obtained data are written in the transmitting control information table 3003.

<Data Transmitting/Receiving Process in Print Server>

The center server 102 and the print server 121 can communicate with each other across the network 103 using a dial-up connection or a dedicated connection. An arbitrary network configuration can be employed for the network 103, and in this embodiment the popular Internet is employed. Further, an arbitrary protocol can be used for the transmission procedures (the protocol) for the network 103. In this embodiment, Hyper Text Transport Protocol (HTTP) and File Transfer Protocol (FTP), which are widely employed for the Internet, are used. The local transmitting/receiving control means 703 of the print server 121 and the center transmitting/receiving control means 407 of the center server 102 employ the above method to connect to each other, via the network 103, for the transmission and the reception of data. It should be noted that the method used to make the connection between the print server 121 and the center server 102 is established in advance in the print server 121.

Figure 35:
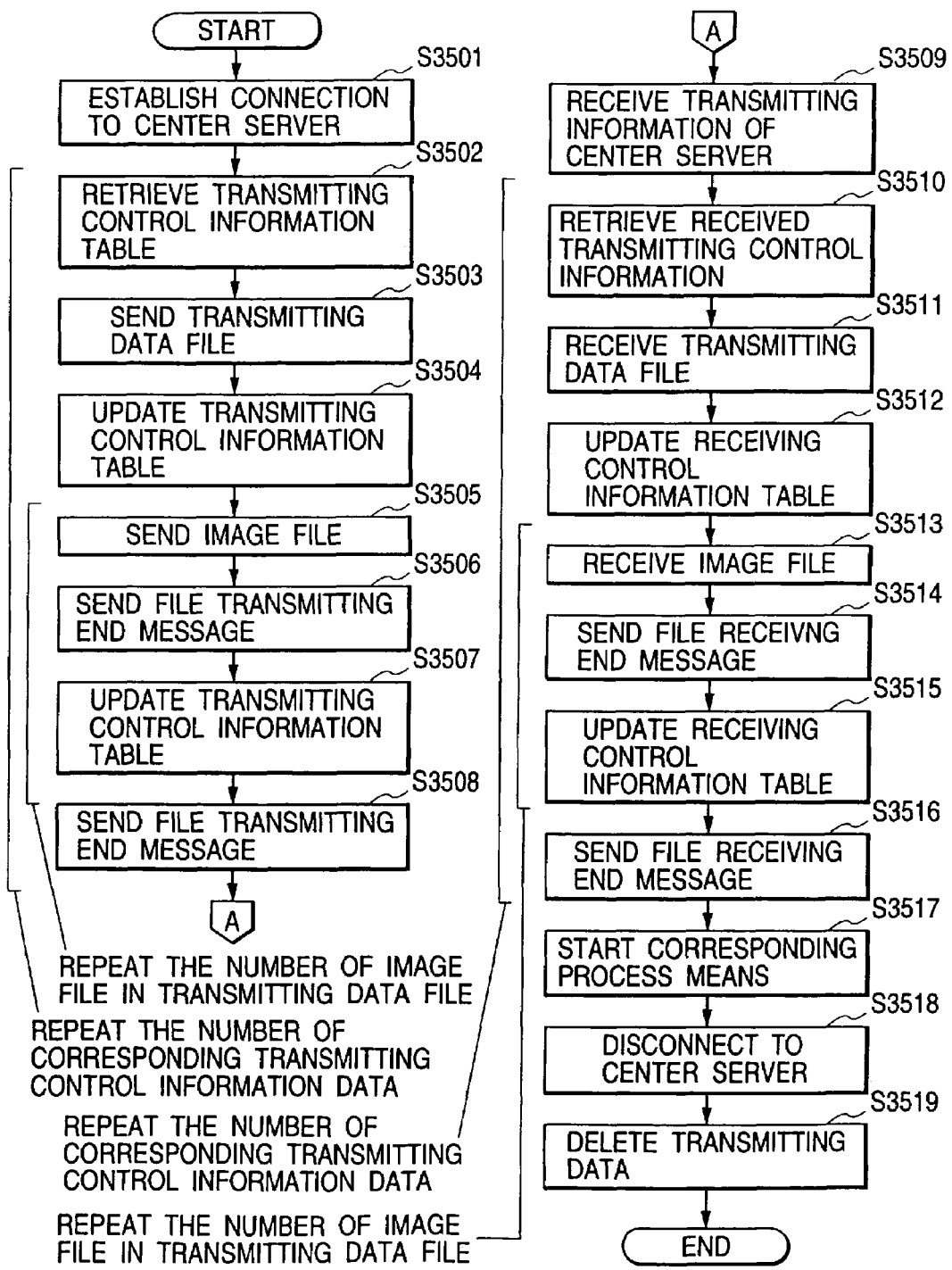
FIG. 35 is a flowchart showing the data transmission/reception processing performed by the print server according to the embodiment of the present invention.

FIG. 35 is a flowchart showing the data transmitting/receiving process performed by the local transmitting/receiving control means 603 of the image server 111, or the local transmitting/receiving control means 703 of the print server 121. Since the same process is performed by the local transmitting/receiving control means 603 and 703, the local transmitting/receiving control means 703 of the print server 121 is employed for the following explanation. The process performed by the center transmitting/receiving control means 407 of the center server 102, which corresponds to the above process, will be described later, while referring to FIG. 36.

"Message" in FIG. 35 and in the following explanation represents text data that includes the server ID of the print server 121 and a process request, and is transmitted or received using HTTP. FTP is employed for file transmission/ reception.

When an operator enters an instruction at the KB 2008, or in accordance with a time interval that is designated in advance, the local transmitting/receiving control means 703 of the print server 121 is read from the HDD 2009 and written to the RAM 2002 for execution.

At step S3501, in accordance with the method that is established in advance for use by the print server 121 when connecting with the center server 102, a connection request forwarded to the center server 102 using a dial-up connection, is issued to establish a connection with the center server 102. Then, a message is transmitted to the center server 102 to request the directory names of the receiving box 3102 and the transmitting box 3002 used for the print server 121. Following this, a message that includes the requested directory names is received from the center server 102, and is stored in the RAM 2002.

The processes at steps S3502 to S3508 are repetitively performed for data files that have not yet been transmitted, i.e., the transmitting control information data for which no values have been entered in the transmitting data file name 3202 and the transmitting end time 3205, for the data stored in the transmitting control information table 3003 of the transmitting box 3002 that is to be used for the center server 102. It should be noted that the transmitting control information data are to be processed in the ascending order in consonance with the values entered in the box stored time 3204, i.e., in the order in which the data were stored in the transmitting box.

At step S3502, transmitting control information data for one case, which concerns data files that have not yet been transmitted, are read from the transmitting control information table 3003 of the transmitting box 3002 used for the center server 102. The obtained transmitting control information is stored in the RAM 2002.

At step S3503, the transmitting data file 3004, which is represented by the file name 3201 in the data that is stored at step S3502, is read. The transmitting data file 3004 is then transmitted, so that it is stored in the directory of the receiving box 3102 for the center server 102 that is stored at step S3501.

At step S3504, the current time is entered as the transmitting end time 3205 for the transmitting control information data that is stored at step S3502. The transmitting control information data are employed to overwrite data in the transmitting control information table 3003 that have the same transmitting file name 3201 as have the pertinent transmitting control information data. As a result, the transmitting control information table 3003 is updated.

The processes at steps S3505 to S3507 are repetitively performed for the transmitting control information data, in the transmitting control information table 3003, for which the transmitting data file name 3202 is the same as that for the transmitting control information data stored at step S3502.

At step S3505, one set of transmitting control information data that satisfies the above condition is extracted from the transmitting control information table 3003 and is stored in the RAM 2002. Then, the image file 3005 that is represented by the transmitting file name 3201 is obtained. Thereafter, the image file is transmitted, so that it is stored in the directory of the receiving box 3102 of the center server 102 that is stored at step S3501.

At step S3506, a message is transmitted as notification that the file, including the transmitting control information data stored at step S3505, has been transmitted.

At step S3507, the current time is set in the transmitting end time 3205 of the transmitting control information data stored at step S3505. Then, the transmitting control information data are employed to overwrite data for which the transmitting file name 3201 in the transmitting control information table 3003 is the same as that for the pertinent transmitting control information data. As a result, the transmitting control information table 3003 is updated.

At step S3508, a message is transmitted as notification that the transmission of the file has been completed, to include the transmission of the transmitting control information data that is stored at step S3505 and that is currently being processed.

At step S3509, the transmitting control information table 3003, in the receiving box 3102 used for the print server 121, is received as a file from the center server 102 and is stored in a temporary area on the HDD 2009.

The processes at steps S3510 to S3517 are repetitively performed for data files that have not yet been received, i.e., the receiving control information data for which no values have been entered in the transmitting data file name 3202 and the transmitting end time 3205, of the data stored in the transmitting control information table that is received from the center server 102 and is stored on the HDD 2009 at step S3509. It should be noted that the transmitting control information data are to be processed in the ascending order of the values entered in the box stored time 3204, i.e., in the order in which the data were stored in the receiving box.

At step S3510, transmitting control information data for one case, which concerns data files that have not yet been received, are read from the transmitting control information table 3003 that is received from the center server 102. The obtained transmitting control information is stored in the RAM 2002.

At step S3511, the transmitting data file, which is represented by the file name 3201 in the data that is stored at step S3510, is received. The transmitting file is stored as the transmitting data file 3105 in the receiving box 3102 used for the center server 102.

At step S3512, the current time is entered as the transmitting end time 3205 for the transmitting control information data that is stored at step S3510. The transmitting control information data are added to the receiving control information table 3104 in the receiving box 3102 used for the center server 102.

The processes at steps S3513 to S3515 are repetitively performed for the transmitting control information data that are received from the center server 102 and that have the same transmitting data file name as have the transmitting control information data stored at step S3510.

At step S3513, one set of transmitting control information data that satisfies the above condition is read from the temporary area of the HDD 2009 used at step S3509, and is stored in the RAM 2002. Then, the image file that is represented by the transmitting file name 3201 is obtained, and is stored as the image file 3106 in the receiving box 3102 used for the center server 102.

At step S3514, a message is transmitted as notification that the reception of the file has been completed, to include the transmitting control information data that is stored at step S3505.

At step S3515, the current time is entered as the transmitting end time 3205 for the transmitting control information data that is stored at step S3513. The transmitting control information data are added to the receiving control information table 3104 in the receiving box 3102 used for the center server 102.

At step S3516, a message is transmitted as notification that the reception of the file has been completed, to include the transmitting control information data that is stored at step S3510.

At step S3517, the data file 3105 that is received and stored at step S3511 is read and written to the RAM 2002 to analyze the contents of the file, and all the transmitting data tags, such as the tag <ORDER> in FIG. 13, are extracted. Next, the process means information table 3103 is examined using the individual values of the data tags, and the process means information data are extracted for which the transmitting data tag name 3301, in the process means information table 3103, is the same as the value of the extracted transmitting data tag. Then, the pertinent process means is activated in accordance with the process means start method 3302 and the transferring data information 3303 in the extracted process means information data.

At step S3518, if the dial-up connection with the center server 102 has been established, the print server 121 is disconnected from the center server 102.

At step S3519, the transmitting control information table 3003, of the transmitting box 3002 used for the center server 102, is examined to delete the transmitting control information data for which the transmitting end time 3205 falls before a period that is set in advance and is based on the current time. Further, the transmitting data file 3004, or the image file 3005 that is represented by the transmitting file name 3201, is deleted from the table 3003. It should be noted that the transmitting control information data and the files are not deleted immediately after they have been transmitted, so that they can be re-transmitted if a transmission failure should occur.

When the process for the transmitting data file 3105 is completed, a process means, such as the order output management means 701, that was started at step S3517 deletes, from the receiving box 3101, the transmitting data file and the image file 3106 that occupies a lower position than does the data file. Further, the process means also deletes the data for which the transmitting file name 3201, in the receiving control information table 3104, is the same as that of the file that was deleted above.

In this embodiment, if the data transmission/reception process is halted due to a network malfunction, the pertinent process is performed again, from the beginning. In this case, the re-transmission or the reception of an image file that has been transmitted or received is not performed.

<Data Transmitting/Receiving Process in Center Server>

Figure 36:
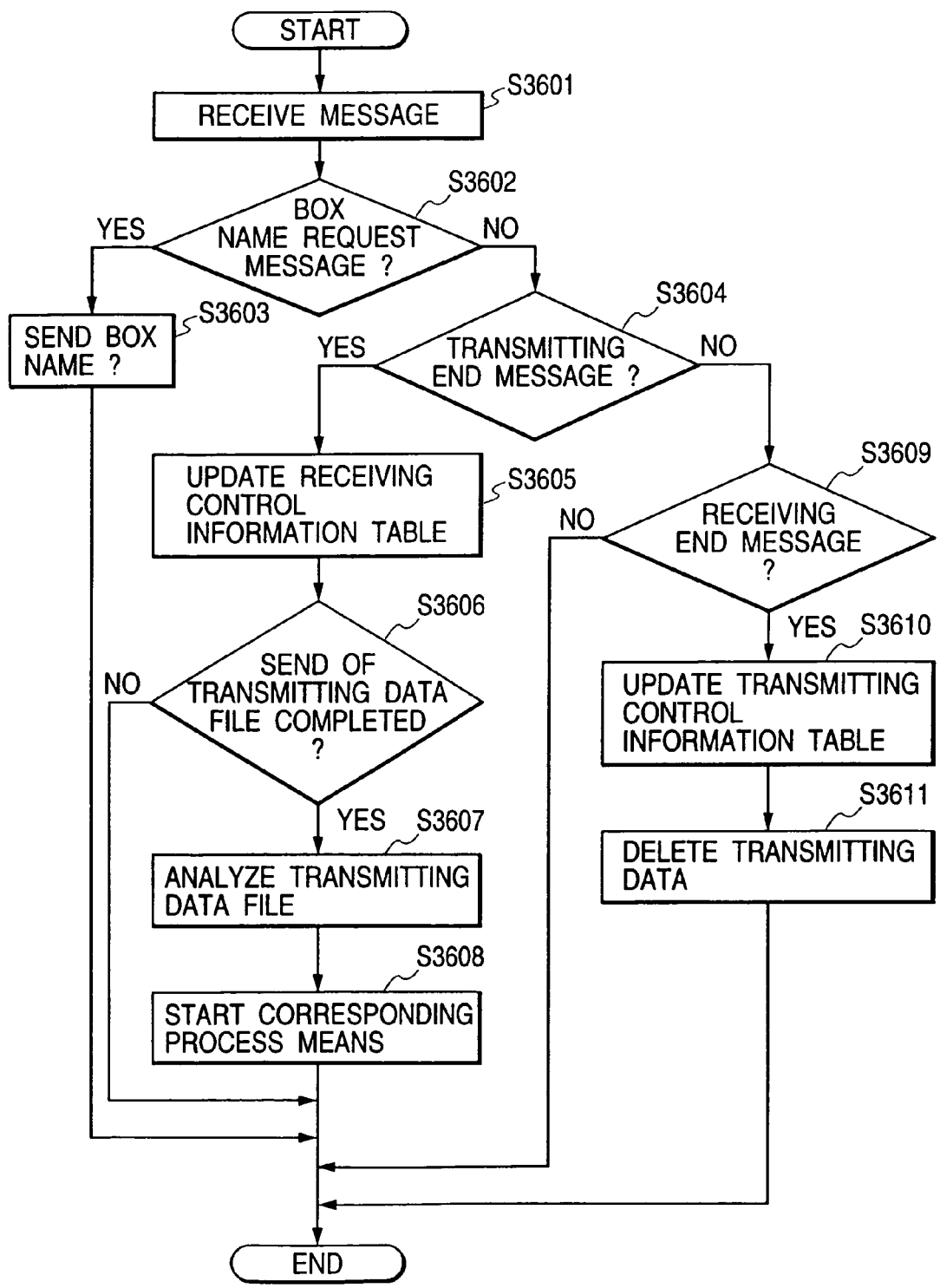
FIG. 36 is a flowchart showing the data transmission/reception processing performed by the center server according to the embodiment of the present invention.

FIG. 36 is a flowchart for explaining the data transmitting/receiving process performed by the center transmitting/receiving control means 407 of the center server 102.

To start the processing, the center transmitting/receiving control means 407 receives a message from the local transmitting/receiving control means 603 of the image server 111, or the local transmitting/receiving control means 703 of the print server 121. In this embodiment, a method, for which HTTP is used as the transmission protocol, is employed whereby the document service means 401 receives the message, and writes the center transmitting/receiving control means 407 in the RAM 1002 for the execution of the data transmitting/receiving process. The activation method is the same as that employed for the edit image service means 402, and the actual data transmission/reception is performed by the document service means 401. The data to be transmitted and received data are exchanged by the document service means 407 and the local transmitting/receiving control means 703 via the RAM 1002. The transmission/reception process is terminated when one message has been processed.

In FIG. 36, at step S3601, the message received from the document service means 401 via the RAM 1002 is analyzed to examine the contents.

At step S3602, a check is performed to determine whether the contents of the message obtained at step S3601 are the same as those of the message that is transmitted at step S3501 in FIG. 35 requesting the receiving box directory name. If the message is a request for the directory name, program control advances to step S3603. If the message is not such a request, program control goes to step S3604.

At step S3603, the server ID, which is included in the message analyzed at step S3601 for the image server 111 or the print server 121, which is the message transmission source, is employed to find the directory names of the transmitting box 3002 and the receiving box 3102 that correspond to the server ID. These directory names are then transmitted as a reply to the document server means 401 via the RAM 1002.

At step S3604, a check is performed to determine whether the contents of the message obtained at step S3601 are the same as those of a message that is transmitted at step S3505 or S3508 in FIG. 35 as notification that the transmission of a file has been completed. If the message is a notification that the transmission of a file has been completed, program control advances to step S3605. If the message is not such a notification, program control moves to step S3609.

At step S3605, the transmitting control information data that is included in the message analyzed at step S3501 is also entered in the receiving control information table 3104.

At step S3606, the transmitting data file name 3202 of the transmitting control information data, which is included in the message at step S3501, is examined. If a value is not entered as the data file name, program control goes to step S3607. If a value is entered as the data file name, the processing is thereafter terminated.

At step S3607, the data file 3105, which corresponds to the data file name 3201 included in the message at step S3501, is read and written to the RAM 1002. The contents of the data file 3105 are analyzed, and all the transmitting data tags, such as the tag <REG> in FIG. 13, are extracted.

At step S3608, the process means information table 3103 is examined by using the values of the transmitting data tags to extract the process means information data for which the transmitting data tag name 3301 has the same value as has the transmitting tag that is extracted in the above process. Then, the pertinent process means is activated in accordance with the process means start method 3302 and the transferring data information 3303 of the extracted process means information data.

At step S3609, a check is performed to determine whether the contents of the message examined at step S3601 are the same as those of a message that is transmitted at step S3512 or S3515 in FIG. 35 as notification of the completion of the reception of a file. If the message is a notification of the completion the reception of a file, program control advances to step S3610. If the message is not such a notification, the processing is thereafter terminated.

At step S3610, the receiving control information table 3104 is examined by using the transmitting file name 3201 of the transmitting/receiving control information data that is included in the message analyzed at step S3501. The current date and time are entered as the transmitting end time for the pertinent transmitting control information data.

At step S3611, the transmitting control information table 3003 for the transmitting box 3002, which is included in the message analyzed at step S3601 and which is for the message transmission source server, is examined. Then, the transmitting control information data is deleted for which the transmitting end time 3205 falls before a period that was set in advance and is based on the current time. Further, the transmitting data file 3004 or the image file 3005 that is represented by the transmitting data file name 3201 is deleted from the table 3003. It should be noted that the transmitting control information data and the file are not deleted immediately after they have been transmitted, so that the data or the file can be re-transmitted if a transmission malfunction should occur.

The center transmitting/receiving control means 407 may be continuously resident in the RAM 1002, so that it can communicate directly with the local transmitting/receiving control means 603 or 703, without the document service means 401 being required. In this case, the transmission of data is constantly awaited. And when data are received, the process is repeated whereby the processing in FIG. 36 is performed and the wait for the transmission of data begins again.

<Order Dispatching Process>

Figure 18:
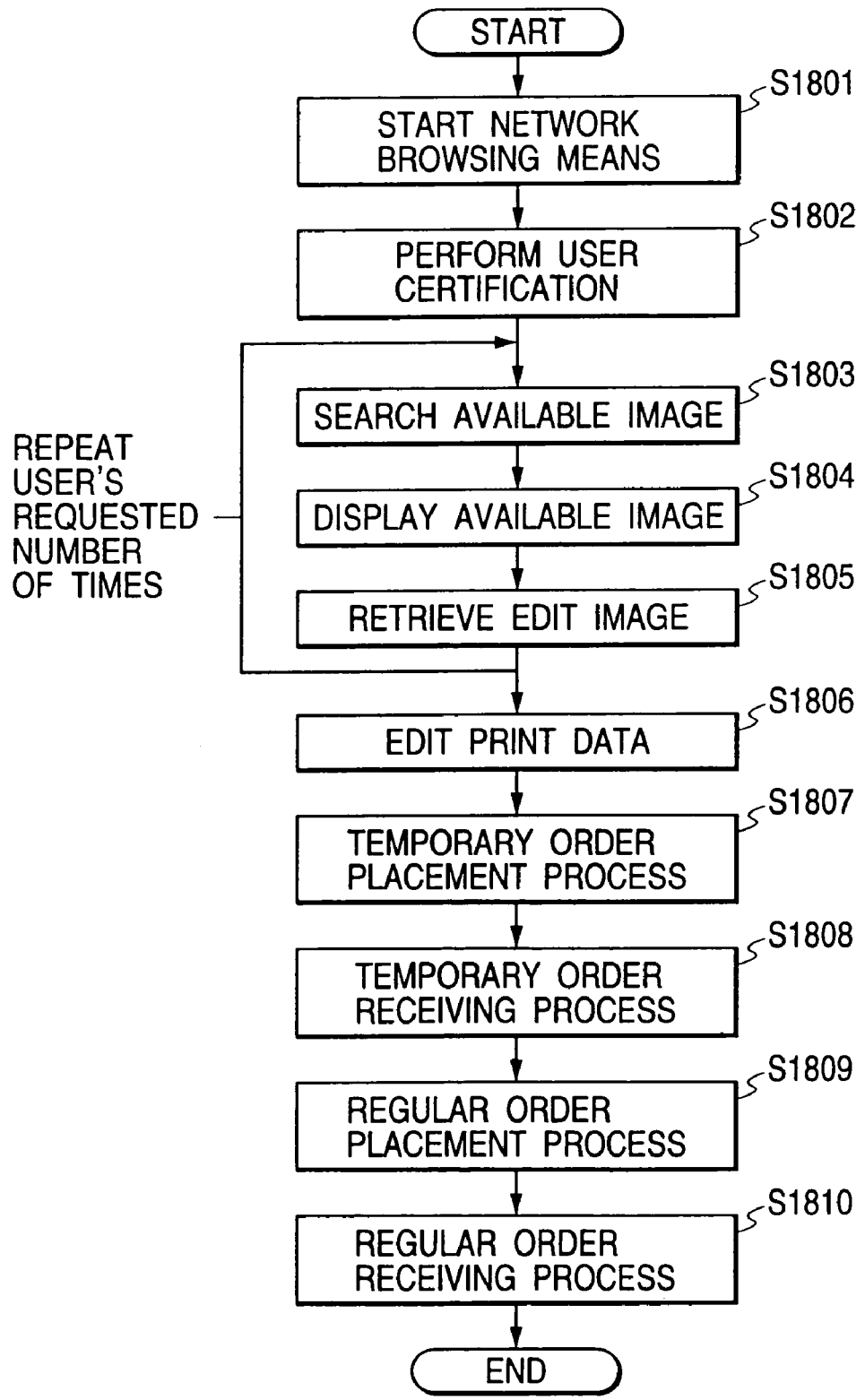
FIG. 18 is a flowchart showing the print order submission and reception processing performed for the embodiment of the present invention.

FIG. 18 is a flowchart for explaining the processing for the dispatching of a print order by the client computer 101, and the processing for receiving an order at the center server 102.

The network browsing means 502 of the client computer 101 and the document service means 401 of the center server 102 communicate with each other using Hyper Text Transfer Protocol (HTTP) and File Transfer Protocol (FTP), which are the transmission protocols that are generally employed on the Internet. The data processing means 501 and the expansion means 503 exchange data by using inter-process communication function.

At step S1801, the user employs the data process means 501 to read the network browsing means 502 from the HDD 1009, to write it to the RAM 1002 for execution, and to connect the means 502 to the center server 102. In addition, the network browsing means 502 reads the expansion means 503 from the HDD 1009 and writes it to the RAM 1002 for execution.

At step S1802, the user enters a user ID and a password for authentication by the document service means 401 of the center server 102. If the identity of the user is not verified, the document service means 401 assumes an entry error was made and does not perform the following process.

At step S1803, the document service means 401 reads the edit image service means 402 from the HDD 1009, and writes it in the RAM 1002 for use. The edit image service means 402 examines the edit image location management table 417 to find an available image for the pertinent user, and returns, to the expansion means 503, the image ID of the pertinent image and the URL (an addressing system that the network browsing means 502 and the expansion means 503 can refer to). The available image for the user is either an image that is owned by the pertinent user and has been registered by the print server 121, or an image that has been registered by the image server 111 and is available for all users. Since there are a plurality of images to be processed, the user may enter a display condition at the KB 1008, and the expansion means 503 may transmit the condition to the edit display service means 402, so that the number of image IDs and the number of URLs to be transmitted by the edit display service means 402 to the expansion means 503 can be reduced.

At step S1804, the expansion means 503 employs the URL obtained from the edit display service means 402 at step S1803 to request that the document service means 401 service the image. The document service means 401 extracts the display/edit image file that is designated by the display/edit image storage device 411, and transmits it to the expansion means 503. Thereafter, the expansion means 503 displays the received image file on the CRT 1006 via the network browsing means 502.

At step S1805, the user uses the KB 1008 to select a desired image from the images displayed on the CRT 1006 at step S1804. The expansion means 503 then transmits, to the data process means 501, a display/edit image file that corresponds to the selected image and image ID. The data process means 501 stores the display/edit image file in the temporary area of the HDD 1009, prepares a correlation table for the image ID and the stored image file name, and stores the table in the RAM 2002. It should be noted that this table may not be prepared. That is, if, for example, the JFIF format, to which additional information can be written, is used for the display edit image file, when the image server 111 or the print server 121 generates an image, or when an image is to be transmitted by the center server 102 to the client computer 101, the table can be replaced by writing the image ID in the display/edit image file.

The processes at steps S1803 to S1805 are repeated until all the images desired by the user have been fetched to the data process means 501.

At step S1806, the user enters an instruction at the KB 1008 for the data process means 501, and uses the edit images fetched at step S1805 to prepare document data for a print image. The document data is a document 1401 shown in FIG. 14, and the edit images obtained at step S1805 are displayed as image data 1403 and 1404 on the CRT 1006. For the edited document data, the data process means 501 prepares the script data 1402, shown in FIG. 14, wherein the editing contents are written. The data process means 501 examines the table that is stored at step S1805 for the edit image files and the image IDs, or reads the image data from the edit image file, and writes, in the script data 1402, the image ID that corresponds to the image data that are used in the document 1401. When the editing process is completed, the script data 1402 are stored in the temporary area of the HDD 1009 or in the RAM 1002.

The user prepares document data by repeating step S1806 as many times as desired. If the display/edit image is stored in the center server 102 while an electronic watermark is applied, the image may be processed at steps S1804 to S1806 while the electronic watermark is maintained in the image, as in the image data 1403 in FIG. 14.

At steps S1807 and S1808, the temporary order dispatching process and the receiving process are performed. For these processes, the sub-order 802 and the order item 803 that constitute the print order are transmitted by the client computer 101 to the center server 102, and are stored there.

At step S1807, the user employs the KB 1008 to select one or more sets of document data to be printed, adds information, such as the number of print copies, and instructs the data process means 501 to dispatch an order. The data process means 501 reads, from the HDD 1009 or the RAM 1002, the script that corresponds to the document data designated by the user, and transmits the script to the expansion means 503. The expansion means 503 transmits an instruction to the document service means 401 of the center server 102 to start the order receiving means 403. Upon receiving this instruction, the document service mens 401 reads the order receiving means 403 from the HDD 1009 and writes it to the RAM 1002 for execution, and then transmits to the order receiving means 403 the script received from the expansion means 503.

At step S1808, the order receiving means 403 analyzes the script that is received from the document service means 401 at step S1807, extracts the information, such as edit information or an image ID, that constitutes the sub-order 802 in FIG. 8, and enters the extracted information in the order management table 416. At this time, the order ID 902 is provided by using the user ID of the user, and is stored in the RAM 1002. In addition, the order receiving means 403 confirms that each image ID extracted in the above process is present in the original image location management table 412. This process is performed to prevent the occurrence of a print disabled state because an image has already been deleted. If the image ID is not present, an error message is transmitted to the expansion means 503. The expansion means 503 then displays the contents of the error on the CRT 1006 to notify the user.

At steps S1809 and S1810, to prepare the complete order, necessary information is added to the temporary order that is received at step S1807 or S1808.

At step S1809, the order receiving means 403 examines the server management table 413 to obtain the server ID of the print server, and transmits, to the expansion means 503, the server ID with the order ID that is stored at step S1808. The expansion means 503 then displays the list of server IDs on the CRT 1006, and the user employs the KB 1008 to select a desired print server as a print output destination. Thereafter, the expansion means 503 transmits, to the order receiving means 403, the server ID of the selected print server.

At step S1810, the order receiving means 403 calculates an output cost and performs the accounting process, stores, in the order management table 416, the received server ID and the number of print copies, and completes the print order.

By means of the above described processing, the print order is dispatched by the client computer 101 to the center server 102.

When the data process means 501 and the expansion means 503 are not employed, the order dispatching process can be performed in the following manner. The document service means 401 of the center server 102 displays the display image and its image ID directly on the network browsing means 502. Then, the user employs the KB 1008 to enter, directly to the network browsing means 502, print order data such as the image ID and the server ID of the output destination print server 121. The network browsing means 502 then transmits the received data to the order receiving means 4032 of the center server 102.

<Image Collection Destination Determining Process>

After the print order is dispatched in the print order dispatching process, the center server 102 issues a print request to the output destination print server 121. At this time, the center server 102 specifies the image server 111 and the print server 121 in which is stored the print original image that is identified by the image ID included in the print order. If the print original image is present in a plurality of servers, a server is selected that requires the lowest cost for transmitting the image via the center server 102 to the destination print server 121.

The image collection means 405 controls the above described process. When the order dispatching process is completed, the image collection means 405 is read from the HDD 1009 by the order receiving means 403 and is written to the RAM 1002 for execution. At this time, the order ID of the print order that the order receiving means 403 received in the order dispatching process is transmitted to the image collection means 405.

Figure 19:
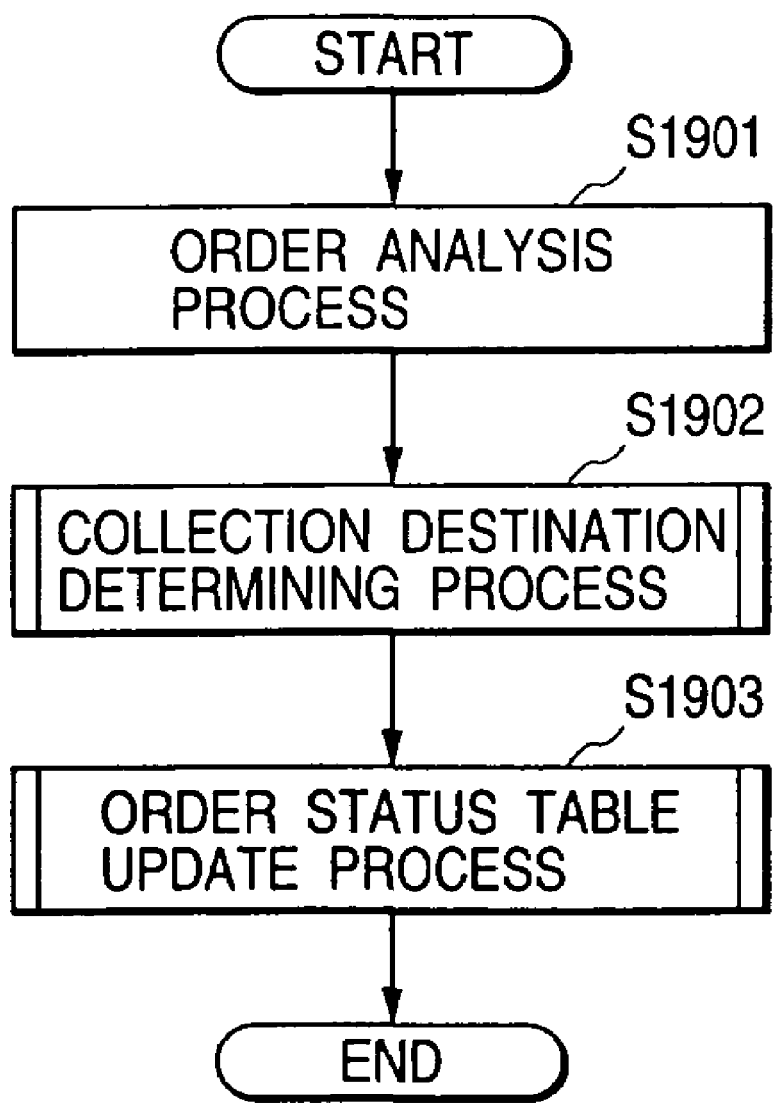
FIG. 19 is a diagram showing the image collection destination determining processing performed by the center server according to the embodiment of the present invention.

FIG. 19 is a flowchart for explaining the image collection destination determining processing performed by the image collection means 405.

At step S1901, the image collection means 405 examines the order management table 406 by using the order ID received from the order receiving means 403, obtains the data for the print order, stores the data contents in the RAM 1002, and enters them in the order status table 415. Among the data entered in the order status table 415, the status 204 of the data for which a value is entered as the image ID is set as "before image collection." The status 204 of the data for which no value is entered as the image ID is set as "image collection ON". This setting process corresponds to the preparation for the processing that will be described below to precisely collect all the images required for printing.

At step S1902, the data entered in the order status table 415 at step S1901 are sequentially read, and the storage location of the print original image is examined, then the image server or the print server 121 is selected to transmit the original image therefrom. A detailed explanation for this process will be given later while referring to the flowchart in FIG. 20.

At step S1903, the data processed at step S1901 are again examined. If image collection is no longer required, the order process management means 406 is started to transmit the order to the print server 121. A detailed explanation for this process will be given later while referring to the flowchart in FIG. 21.

Through the above processing, the process for, upon receiving the print server, transmitting the original image transmission request to the image server 111 or to the print server 121, which is the storage destination of the image ID included in the print order, and the process for setting the order status data are terminated.

Figure 20:
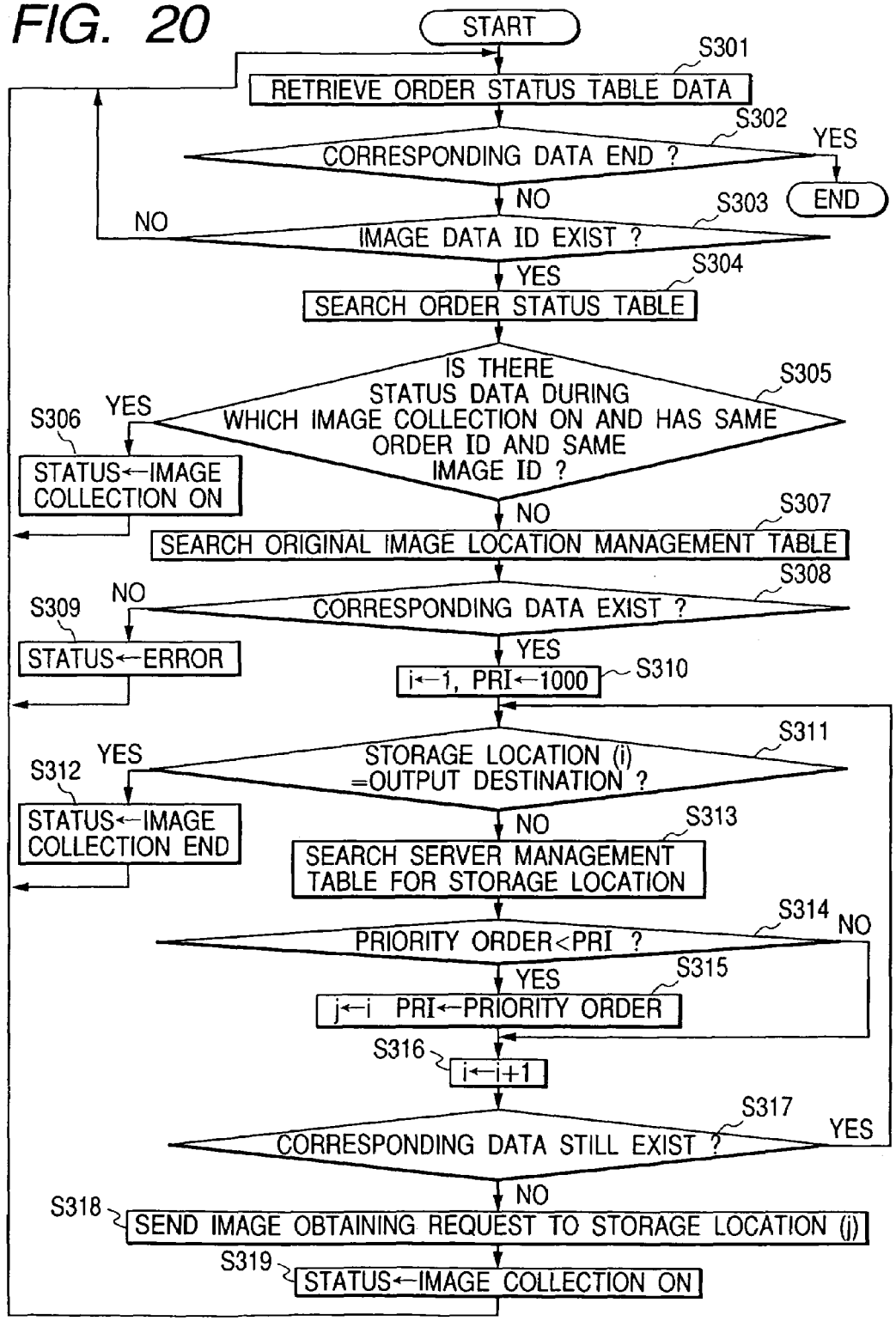
FIG. 20 is a flowchart for a process, in the image collection destination determining processing performed for the embodiment of the present invention, for determining a collection destination for an original image that is to be printed.

FIG. 20 is a flowchart for explaining the collection destination determining process performed at step S1902 in the image collection destination determining processing in FIG. 19.

At step S301, the data for one print order, stored at step S1901 in FIG. 19, is read from the order status table 415 and is written to the RAM 1002.

At step S302, a check is performed to determine whether data for all the print orders stored at step S1901 in FIG. 19 have been read. If no unprocessed data is found, the processing is thereafter terminated.

At step S303, a check is performed to determine whether a value has been entered for the image ID 203 in the order status table 415 stored at step S301. If a value has been entered for the image ID 203, program control advances to step S304. If no value has been entered, program control returns to step S301 to obtain data of the next print order.

At step S304, the order status table 415 is examined to determine whether there are data, other than the current data, for which the same order ID 201 has been is entered, whether the value for the image ID 203 is the same as that stored at step S301, and whether the status 204 is "image collection ON".

When it is ascertained at step S305 that, as the result obtained at step S304, the data that match the search condition at step S305 are found in the order status table 415, program control advances to step S306. If data that match the search condition are not found, program control moves to step S307.

At step S306, since the image collection for the pertinent image ID is currently being performed in the current print order, "image collection ON" is set as the status 204 for the order status data stored at step S301. Program control then returns to step S301.

At step S307, the original image location management table 412 is examined by using the image ID of the order status data stored at step S301. One or more sets of data having the pertinent image ID are extracted and are stored in the RAM 1002 as an array.

When it is ascertained at step S308 that, as the results obtained at step S307, one or more sets of corresponding data are found in the original image location management table 412, program control advances to step S310. If no corresponding data are found, program control goes to step S309.

At step S309, since an original image that corresponds to the image ID is not present, "error" is entered as the status 204 for the order status data stored at step S301, and that data is written to the order status table 415. Program control then returns to step S301.

At step S310, one or more data sets that have been written as arrays in the original image location management table at step S307 are compared in order to prepare the process for determining which server is requested for printing.

An index value i is used for the data array in the original image location management table stored at step S307. At step S310, a value of "1", which represents the first of the arrays, is loaded into the index value i. In the following explanation, the i-th data is represented as "storage location (i)".

PRI is a value that represents the lowest image obtaining priority order (i) in the server management table 413. At step S310, "1000" is loaded into PRI as a value that is larger than the maximum value for the image obtaining priority order 1102 that has already been determined in this embodiment. The index value i and the PRI are stored in the RAM 1002.

At step S311, the value of the storage location (i) of the original image location management table data is compared with the server ID of the print server that is the output destination of the print order stored in the RAM 1002. When the two values match, it is assumed that the original image is present at the output destination and that transmission of the original image is not required. Thus, the original image is determined to have been used for printing in the print server, and program control goes to step S312.

At step S312, since the original image need not be collected, "image collection end" is set as the status 204 for the stored order status data. The process for the pertinent order status data is then terminated, and program control returns to step S301.

At step S313, the server management table 413 is examined to find data having the server ID 1101 that corresponds to the storage location (i). The image obtaining priority order 1102 for the obtained data is stored in the RAM 1002.

At step S314, the image obtaining priority order stored at step S312 is compared with the PRI value. If the value of the image obtaining priority order is smaller, the server indicated by the data is selected as the proposed image obtaining destination. Program control then goes to step S316.

At step S315, the index value i is stored in a value j in the RAM 1002 and the value of the image obtaining priority order of the pertinent data is stored in the PRI, so that the server represented by the data found at step S314 is determined to be the proposed image obtaining destination.

At step S316, the index value i is increased by one to prepare the process for the next original image location management data stored in the RAM 1002. If the next data are found at step S317, program control returns to step S311. But if all the original image location management data have been processed, program control moves to step S318.

At step S318, the image ID and the storage location (j) written in the RAM 1002 are employed to prepare a transmitting data file that is constituted by the original image transmission request data, which are represented by the tag <FTPREQ> in FIG. 13, the print order data, which are represented by the tag <ORDER> in FIG. 13, a variety of data, which are required for the generation of a print image and the process performed following the reception of data by the center server 102, and common data for the head, which is represented by the tag <TRANS> in FIG. 13. Thereafter, the transmitting data file is stored in the center transmitting box 418 for transmission.

At step S319, the status 204 is changed to "image collection ON" because image collection has been requested. Program control then returns to step S301.

<Order Status Table Updating Process>

Figure 21:
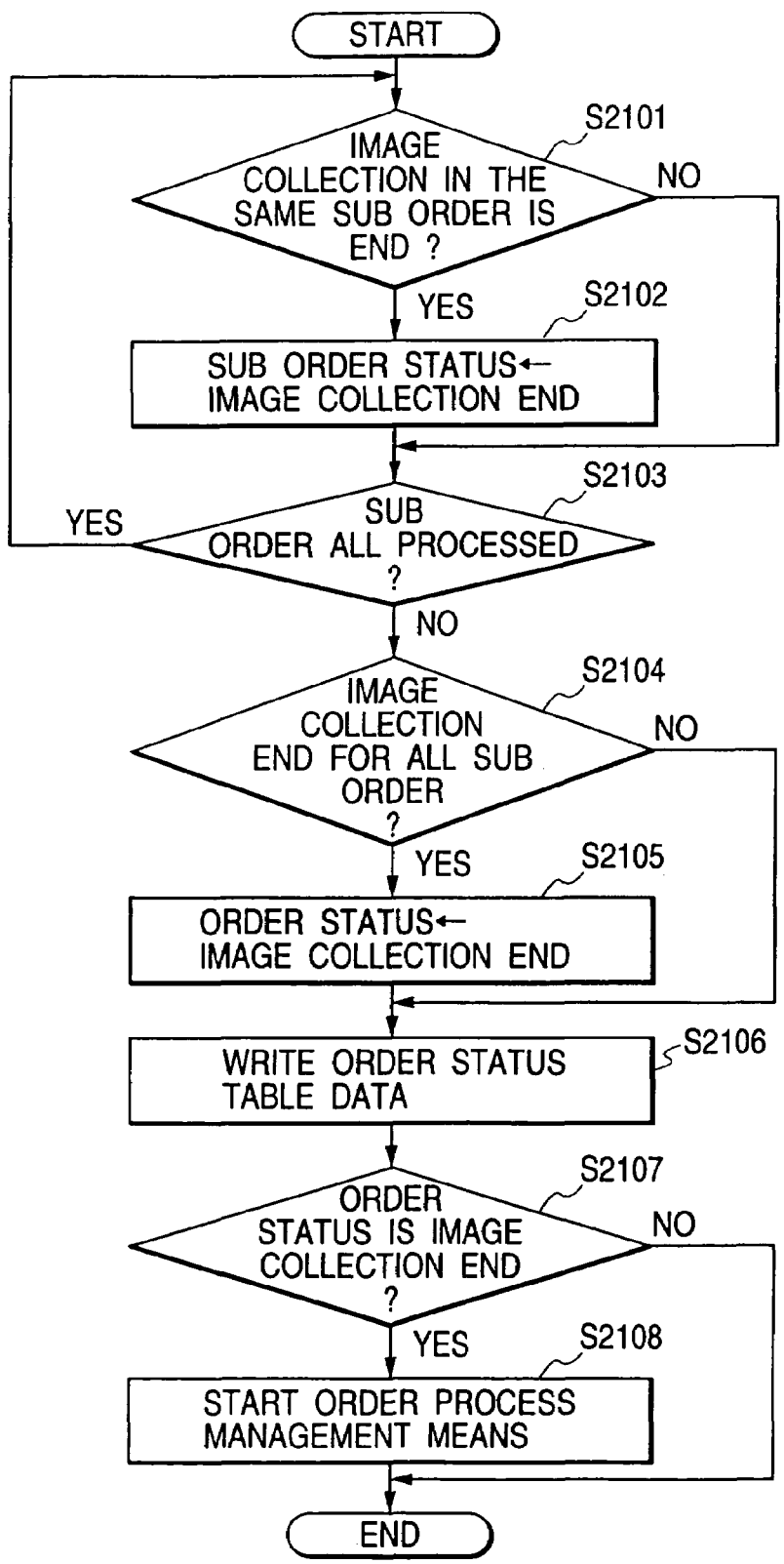
FIG. 21 is a flowchart showing the order status table updating process in the image collection destination determining processing performed according to the embodiment of the present invention.

FIG. 21 is a flowchart for explaining the order status table updating process performed at step S1903 during the image collection destination determining processing.

At step S2101 and S2102, the order status data in the RAM 1002 are processed for each sub-order. In the following explanation, sub-order ID(k) is used to represent the sub-order ID of the sub-order that is being processed.

At step S2101, the statuses of the order status data for which the sub-order ID is the same as the sub-order ID(k) are examined. If "image collection end" is indicated for all the statuses, program control moves to step S2102. If there are data having statuses other than "image collection end", program control moves to step S2103.

At step S2102, "image collection end" is entered as the status 204 for the order status data for which the sub-order ID is sub-order ID(k), and no value is entered for the image ID.

At step S2103, the index value k is added to the sub-order ID(k) to process the next sub-order. When all the sub-order IDs have been processed, program control advances to step S2104. But if another sub-order ID(k+1) is present, program control returns to step S2101.

At step S2104, all the order status data for which a value has been entered for the sub-order ID 202 and no value has been entered in the image ID 203 are examined to determine whether the statuses 204 for all the data are "image collection end". If all the statuses are "image collection end", program control advances to step S2105. If there are data whose status is not "image collection end", program control goes to step S2106.

At step S2105, "image collection end" is entered as the status 204 for the order status data when no value has been entered for the sub-order ID 202 and the image ID 203.

At step S2106, the order status data stored in the RAM 1002 is written in the order status table 415.

At step S2107, the order status data for which no value has been entered as the sub-order ID 202 and the image ID 203 is examined. If "image collection end" is entered as the status 204 for the pertinent data, program control advances to step S2108. If there are data for which a status other than "image collection end" is entered as the status 204, this processing is terminated.

<Print Image Transmission Process>

In the image collection destination determining processing, the image server 111 or the print server 121 is selected as the print image collection destination and receives the image transmission request data. This selected server transmits, to the center server 102, the print image that is identified by the image ID designated in the original image transmitting request data. This transmission process is performed by the print image transmitting means 602 of the image server 111, or by the print image transmitting means 705 of the print server 121. Since the print image transmitting means 602 and 705 have the same functions, the processing performed by the print image transmitting means 602 of the image server 111 will now be described.

Figure 22:
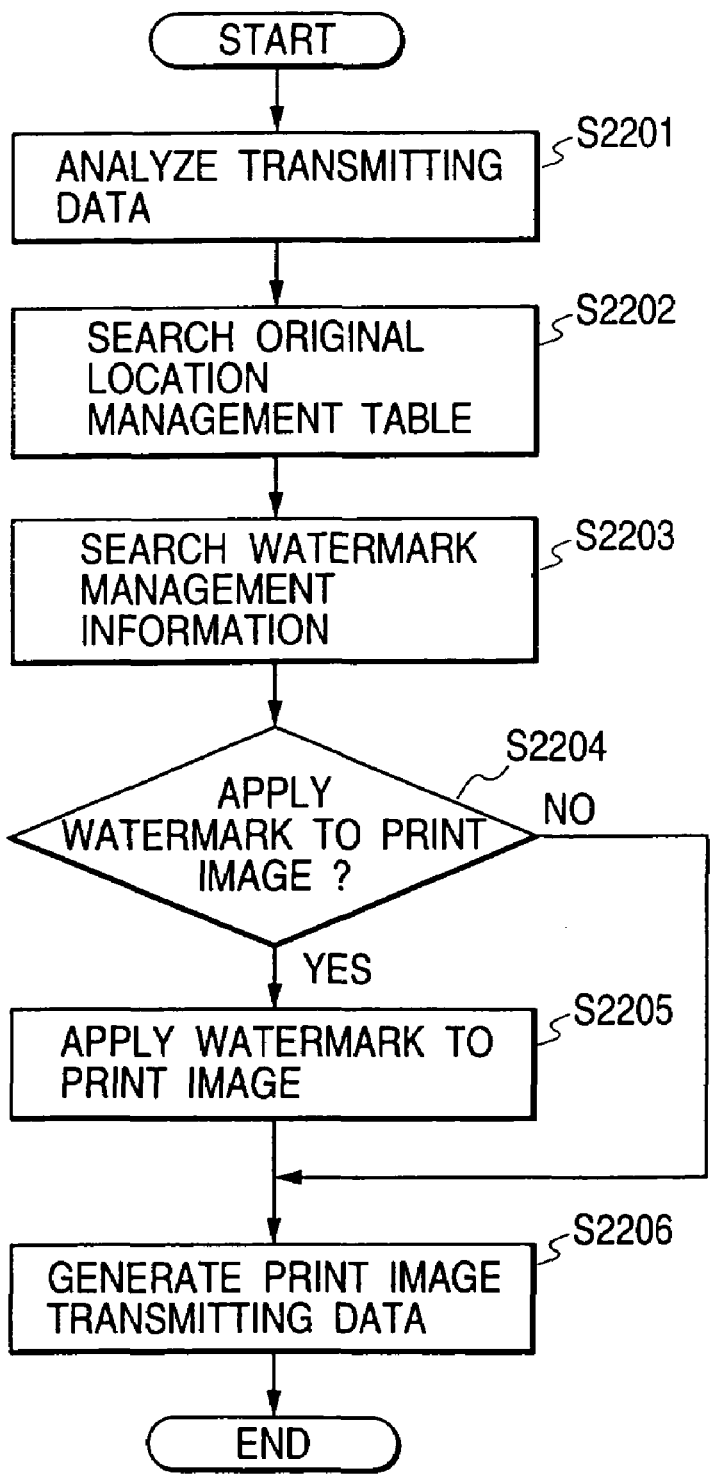
FIG. 22 is a flowchart showing the original image transmission processing performed by the image server or the print server according to the embodiment of the present invention.

FIG. 22 is a flowchart for explaining the processing performed by the print image transmitting means 602. When the local transmitting/receiving control means 603 receives an image transmission request data file, the print image transmitting means 602 is read from the HDD 1009 by the local transmitting/receiving control means 603 and is written to the RAM 1002 for execution. At this time, the local transmitting/receiving control means 603 transmits the name of the received image transmission request data file to the print image transmitting means 602 via the RAM 1002.

At step S2201, the image transmission request data file is read based on its file name, which is received via the RAM 1002 when the print image transmitting means 602 is started. The image ID and the order information are extracted from the file and are stored in the RAM 1002.

At step S2202, the original image location management table 612 is examined to obtain data whose image ID 1201 matches the image ID stored at step S2201. The pertinent data are stored in the RAM 1002.

At step S2203, the watermark information management table 615 is examined to find watermark management information having an image ID corresponding to that of the requested image, "print image" is entered as the intended purpose, and "transmission time" is entered as the watermark applying timing. The search results are stored in the RAM 1002.

At step S2204, a check is performed to determine whether there is watermark management information for an electronic watermark that is to be applied at the time the print image stored at step S2202 is transmitted. If such watermark management information is present, it is ascertained that an electronic watermark is to be applied. Program control then advances to step S2205, whereat the electronic watermark is applied to the print image at the time it is transmitted. That is, if an electronic watermark was applied to an image when it is registered, the application of an electronic watermark is performed twice, at the time of "registration" and at the time of "transmission". When the copyright holder decides that the application of an electronic watermark is not required at the time of transmission of the print image, program control advances to step S2206 because the watermark management information is not registered in the registration process.

At step S2205, an electronic watermark is applied to the print original image before it is transmitted. First, at step S2203, the watermark management information found at step S2203 is read and is written to the RAM 2002. Then, the watermarking means 604 is started and receives the location of a file, which is represented by the path name of the print original image file at the storage location 1203 in the original image location management table data that are stored at step S2202, the watermark management information stored in the RAM 1002, and the output destination of the image with the watermark. Therefore, the watermarking means 604 is requested to apply an electronic watermark. If the applied data in the watermark management information is, for example, external reference data, such as an order ID, the external reference data are also transmitted to the watermarking means 604 to request the application of an electronic watermark.

The watermarking means 604 applies, to the received image, an electronic watermark that corresponds to the received watermark management information, and transmits the resultant image to the RAM 2002 that is designated by the print image transmitting means 602. When the watermarking process is completed, the watermarking means 604 transmits an end notification to the print image transmitting means 602. The processing is thereafter terminated.

If the watermark applied by the watermarking means 604 is a removable, visible watermark, the removal information for the watermark is output at the same time. It should be noted, that if the application of the watermark is performed twice at the time of "registration" and the time of "transmission", and if removable, visible electronic watermarks are employed both times, the respective removal information is output. In this embodiment, the watermark is embedded in the command area of the image data, as was previously described.

Upon receiving the end notification, the print image registration means 601 deletes the watermark management information in the RAM 2002.

If an electronic watermark is not applied at step S2205, at step S2206 the print original image file, which is indicated by the path name at the storage location 1203 for the original image location management table data stored at step S2202, is copied to the local transmitting box 613. Whereas when an electronic watermark is applied at step S2205, the resultant image output by the watermarking means 604 is copied as a print image to the local transmitting box 613. After the print image file has been copied or stored in the local transmitting box 613, the name of the print image file, and the image ID and the order information that are stored at step S2201 are employed to prepare a print image transmitting data file shown in FIG. 23. This file is stored in the local transmitting box 613.

FIG. 23 is a diagram showing the contents of the print image transmitting data file that is prepared by the print image transmitting means 602 during the above original image transmission process. The print image transmitting data are identified by the tag <FTP> in FIG. 23, and the print image employment destination is specified by the tag <ORDER>.

<Print Image Receiving Process>

In the above described print image transmission process, the print image transmitting data are prepared by the print image transmitting means 602 of the image server 111, or by the print image transmitting means 705 of the print server 121. The obtained data are transmitted via the local transmitting/receiving control means 603 or 703 to the center server 102, and are accepted by the center transmitting/receiving control means 407 at the center server 102.

Upon receiving the print image transmitting data, the center transmitting/receiving control means 407 stores the received data as a print image transmitting data file in the center receiving box 419. Thereafter, the image collection means 405 is read from the HDD 1009 and is written to the RAM 1002 for execution. Then, the name of the print image transmitting data file in the center receiving box 419 is transmitted to the image collection means 405. Following that, the image collection means 405 analyzes the original image transmitting data file, stores the received image file, and updates the order status table.

Figure 24:
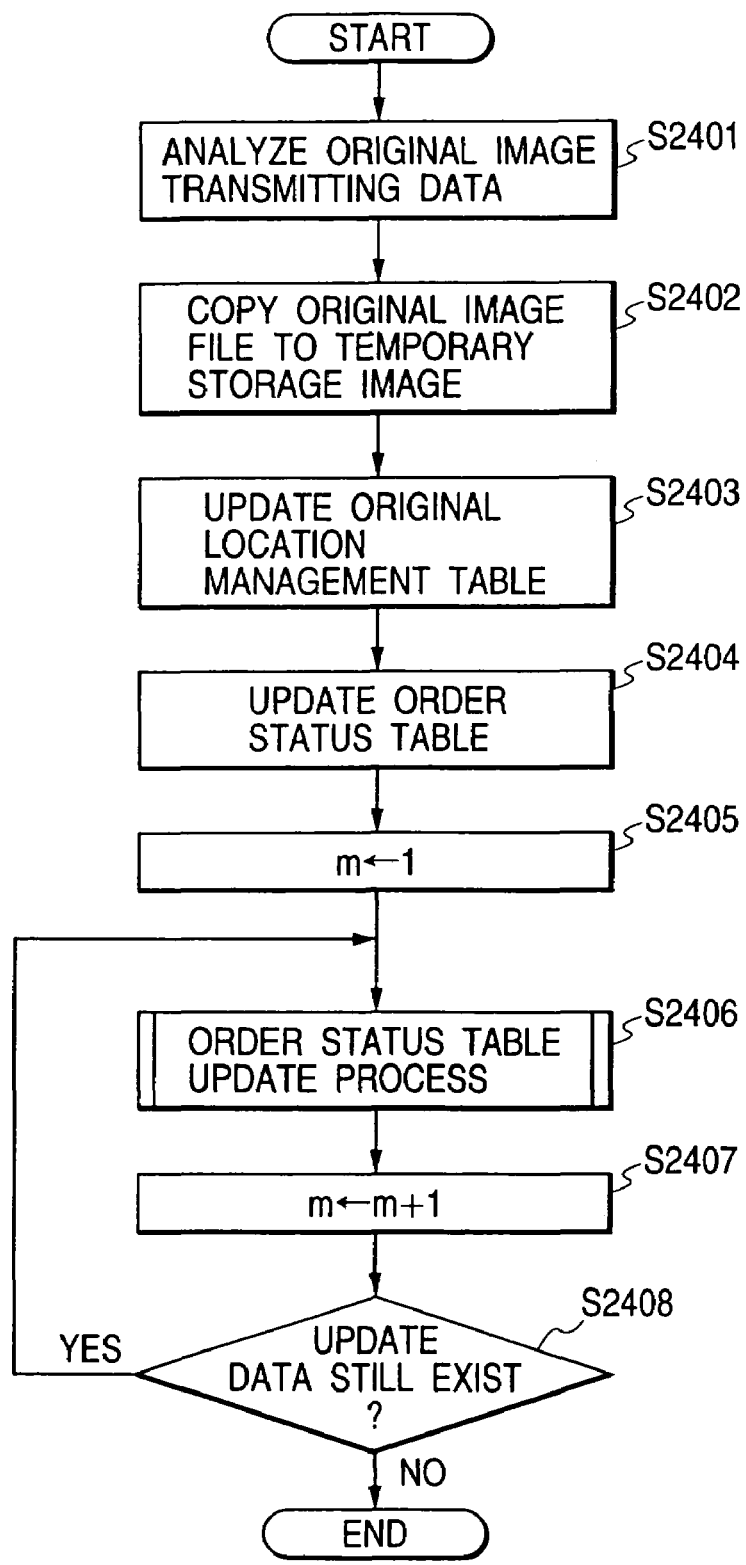
FIG. 24 is a flowchart showing the image reception processing performed by the center server according to the embodiment of the present invention.

FIG. 24 is a flowchart for explaining the above described process performed by the image collection means 405. The above process will now be explained while referring to FIG. 24.

At step S2401, the image collection means 405 employs the print image transmitting data file, which is received from the center transmitting/receiving control means 407 when the means 405 is activated, and writes the contents of the file to the RAM 1002. The image collection means 405 analyzes the contents of the file and stores, in the RAM 1002, the image ID in the file, the order ID of the order information, and the name of the received print image file.

At step S2402, based on the name of the image file stored at step S2401, the pertinent file is copied to the temporary image storage device 414, and the path name of the copied file is stored in the RAM 1002. In this embodiment, the print image is stored in the temporary image storage device 414 so as to be able to cope with a data re-transmission request when the transmission of the print image from the center server 102 to the print server 121 fails. However, in this case, when a re-transmission request is received the print image may be obtained from the source server, so that here the print image need not be stored in the temporary image storage device 414.

At step S2403, original image location management table data are prepared using the image ID and the order ID stored at step S2401, and the path name of the file stored at step S2402. The obtained table data are entered in the original image location management table 412.

At step S2404, the order status table 415 is examined to extract all the data having order IDs 201 and image IDs 203 that match those stored at step S2401, and the extracted order status data are stored in the RAM 1002. Then, "image collection end" is entered as the statuses 204 for the extracted data, and the order status table 415 is updated.

The processes at steps S2405 to S2408 are performed for the individual order status data that are stored in the RAM 1002 at step S2404. In the following explanation, the data to be processed is represented as order status data (m), which means data that have the m-th index.

At step S2405, index m is initialized at a value of "1" for the sequential processing of the order status data.

At step S2406, a check is performed to determine whether "image collection end" is entered for the statuses 204 for the data represented by the order status data (m). If "image collection end" is entered for all the statuses 204, the order process management means 406 is started to transmit the order to the print server 121. The process at step S2406 is the same as the order status table updating process performed during the original image collection determining processing in FIG. 21, which is performed by the image collection means 405.

At step S2407, index m is increased by one to prepare for the process for the next order status data.

At step S2408, a check is performed to determine whether order status data (m) is present in the RAM 1002. If the order status data (m) is present, program control returns to step S2406. If no order status data (m) is found, however, the processing is thereafter terminated.

<Print Order Transmission Process>

When the print image that is required for printing the current print order has been prepared by the image collection process or the image receiving process, the image collection means 405 of the center server 102 activates the order process management means 406, and transmits the order ID of the print order to the order process management means 406 via the RAM 1002.

The order process management means 406 prepares order transmitting data based on the received order ID, and stores the data in the center transmitting box 418 for transmission of the data to the print server 121.

Figure 25:
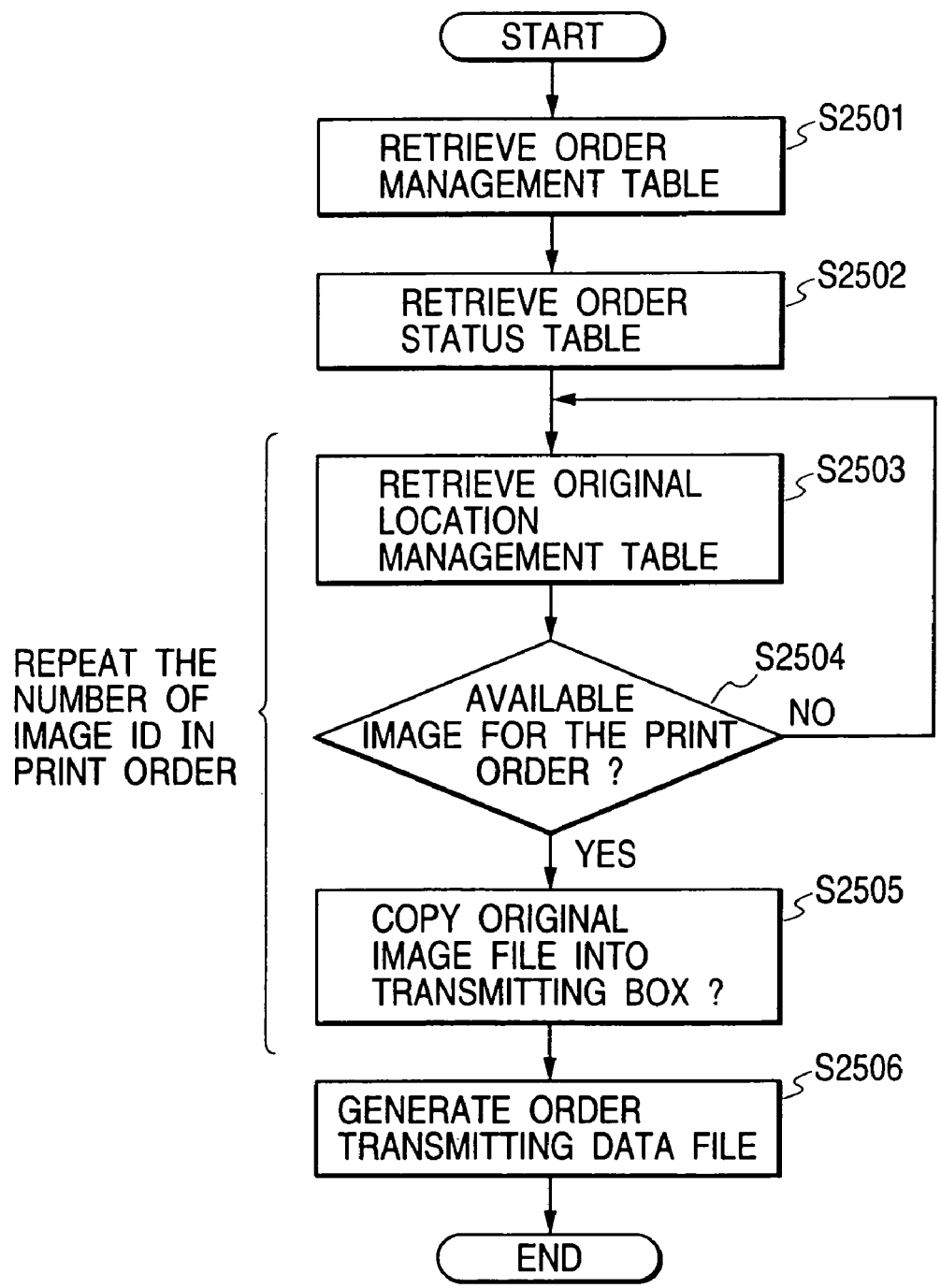
FIG. 25 is a flowchart showing the print order transmission processing performed by the center server according to the embodiment of the present invention.

FIG. 25 is a flowchart for explaining the print order transmission process performed by the order process management means 406.

At step S2501, the received order ID is used to examine the order management table 416, and the print order 801, identified with the order ID, and the lower data 802, 803 and 804 are extracted and are stored in the RAM 1002.

At step S2503, the order ID is used to examine the order status table 415, and all the order status data for which the order ID 201 matches the order ID are extracted and stored in the RAM 1002.

The processes at steps S2503 to S2505 are performed for the order status data stored at step S2502, for which a value is entered as the image ID 203. In the following explanation for steps S2503 to S2505, the data value of the order status data that is currently being processed is represented by "image ID(q)".

At step S2503, the image ID(q) is used to examine the original image location management table 412. One set of original image location management data whose image ID 1201 matches the image ID(q) is read and stored in the RAM 1002.

At step S2504, in the original image location for management data stored in the RAM 1002 at step S2503, the storage location 1203 is examined to determine whether it is the path name of the temporary image storage device 411 and whether the order ID included in the additional information 412 matches the order ID that is currently being processed, or whether the storage location 1203 matches the server ID for the print destination print server 121, which is included in the print order data stored at step S2501. If the above condition is satisfied, program control advances to step S2505. But if the above condition is not satisfied, program control returns to step S2503. The next set of original image location management data for which the image ID 1201 matches the image ID(q) is read from the original image location management table 412.

At step S2505, the path name of the print image file, which is entered at the storage location 1203 of the original image location management data stored at step S2503, is employed to copy the print image file to the center transmitting box 418. After the file name is copied, it is stored with the image ID(q) in the RAM 1002.

At step S2506, the order transmitting data 1312 in FIG. 13 is prepared using the print order data stored at step S2501, and a plurality of image IDs and the file name stored at step S2505. Further, the transmitting/receiving header 1311 is added to complete the order transmitting data file, which is then stored in the center transmitting box 418. At this time, the tags and parameters in the order transmitting data 1312 are edited based on the print order data stored at step S2501.

If the image ID 805 is found in the print order data, and if that image ID 805 is included in the image IDs and the file name that are stored at step S2505, the name of the print image file that is copied to the center transmitting box 418 at step S2505 and that corresponds to the image ID 805 is edited as the tag <CAMLLINK> 1322, shown in FIG. 13, so that the relationship between the file name and the print image file that is copied to the center transmitting box 418 at step S2505 can be identified.

If the script 140 is present as the edit data 804 in the print order data, the edit data 804 is converted into the internal code 1321.

In the actual processing, in order to identify, on the print server 121 side, the user who dispatched the print order, the user ID, which is additional information included in the print order 801, is employed to find user information on the HDD 1009 of the center server 102, and the name and the address of the user are also added to the order data transmitting file.

<Print Order Receiving Process>

The order transmitting data are prepared by the order process management means 406 of the center server 102 during the above print order transmitting process. The order transmitting data are transmitted to the print server 121 via the center transmitting/receiving control means 407, and are accepted by the local transmitting/receiving control means 703 of the print server 121.

The local transmitting/receiving control means 703 of the print server 121 stores the received order transmitting data in the local receiving box 714 as an order transmitting data file. The print original image file that is received at the same time is also stored in the local receiving box 714. Then, the order output management means 701 is read from the HDD 2009 and is written to the RAM 2002 for execution, and the name of the order transmitting data file is extracted from the local receiving box 714 and transmitted to the order output management means 701. The order output management means 701 analyzes the order transmitting data file, and enters the received print order data in the order management table 711.

Figure 26:
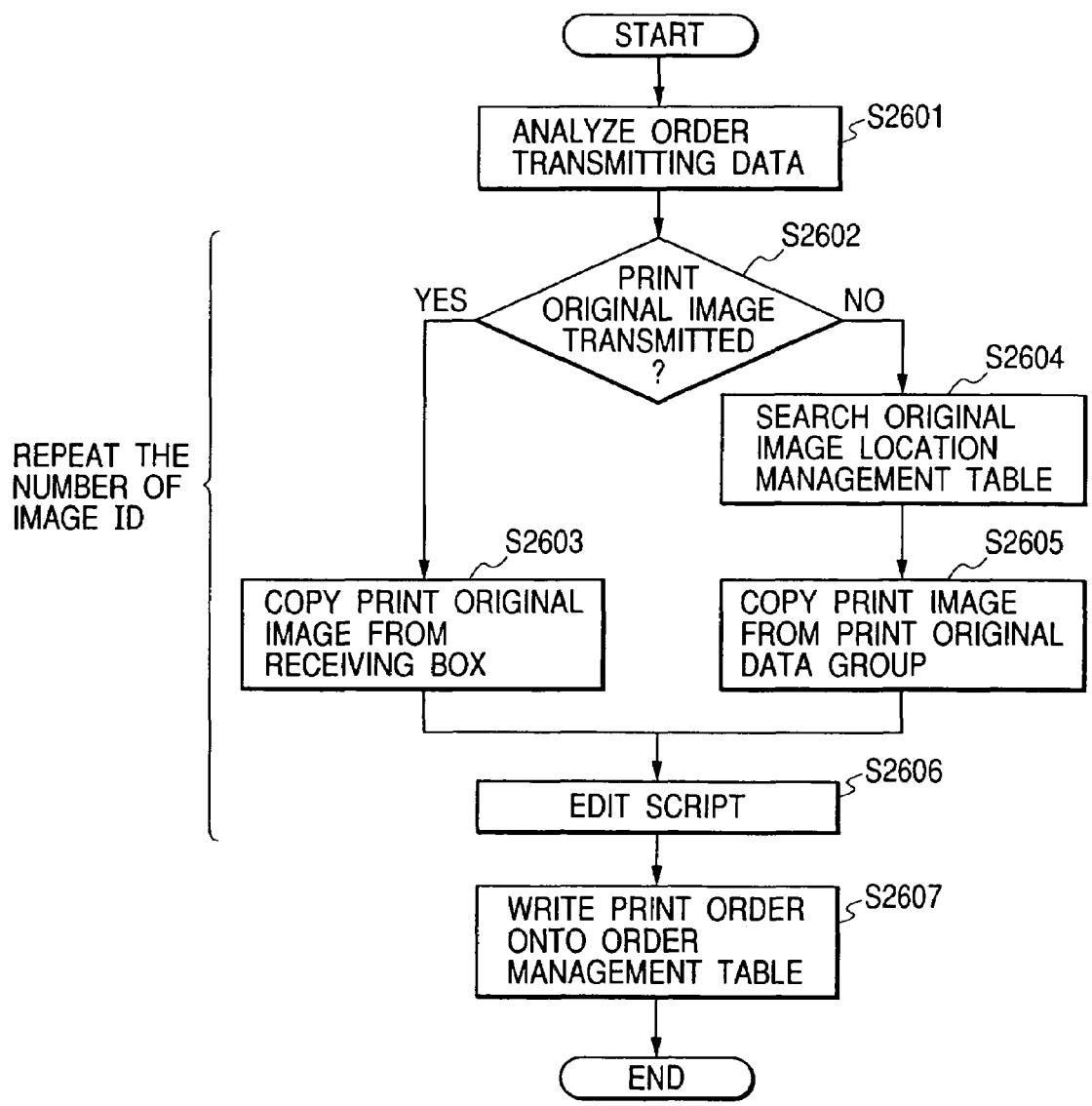
FIG. 26 is a flowchart showing the print order reception processing performed by the print server according to the embodiment of the present invention.

FIG. 26 is a flowchart for explaining the print order receiving process performed by the order output management means 701.

At step S2601, the name of the order transmitting data file received from the local transmitting/receiving control means 703 is employed to read the data file from the local receiving box 714. The contents of the obtained data file are analyzed, and the results are stored in the RAM 2002 using the same data structure as that used for the print order data shown in FIG. 8. In addition, the tag 1322 of the print image written in the order transmitting data file is extracted, and the print image file name in that tag is stored in the RAM 2002 as additional information, for the image ID 805, that corresponds to the print order data. In addition, before the center server 102 changes the print order data into the internal code during the print order transmission process, the internal code of the script 1402 that is written in the order transmitting data file is interpreted and is returned to its original form. The obtained data are then stored in the RAM 2002.

The processes at steps S2602 to S2606 are performed for the individual image IDs in the print order data stored at step S2601. The image ID that is being processed is represented by "image ID(p)", and the print image file name corresponding to the image ID(p) is represented by "print image file name(p)".

At step S2602, a check is performed to determine whether a value has been entered as the print image file name (p), i.e., whether the print image file has been received from the center server 102. If a value is entered, program control advances to step S2603. If no value has been entered, program control moves to step S2604.

At step S2603, the print image file that is identified using the print image file name (p) is extracted from the local receiving box 714, and is copied to the print spool 712. After the copying the file name is stored in the RAM 2002.

At step S2604, the original image location management table 75 is examined to obtain data for which the image ID 1201 matches the image ID(p). Thereafter, the obtained data are stored in the RAM 2002.

At step S2605, the print original file that is identified using the file name that is stored at the storage location 1203 at step S2604 is extracted from the print original image storage device 716. The print original file is then copied as a print original image to the print spool 712, and the order ID is stored as additional information for the image file that is copied to the print spool 712. After the copying the file name is stored in the RAM 2002.

At step S2606, the data (represented by "imagetab( )" in FIG. 14) in which the file name of the image ID(p) is written is extracted from the script stored at step S2601. The file name in the data is replaced by the name of the print image file that is stored in the print spool 712 at either step S2603 or S2604.

At step S2607, the print order data stored at step S2601 is entered in the order management table 711. The print order data includes the script data that are edited as the edit data 804 at step S2606.

<Printing Process>

Figure 27:
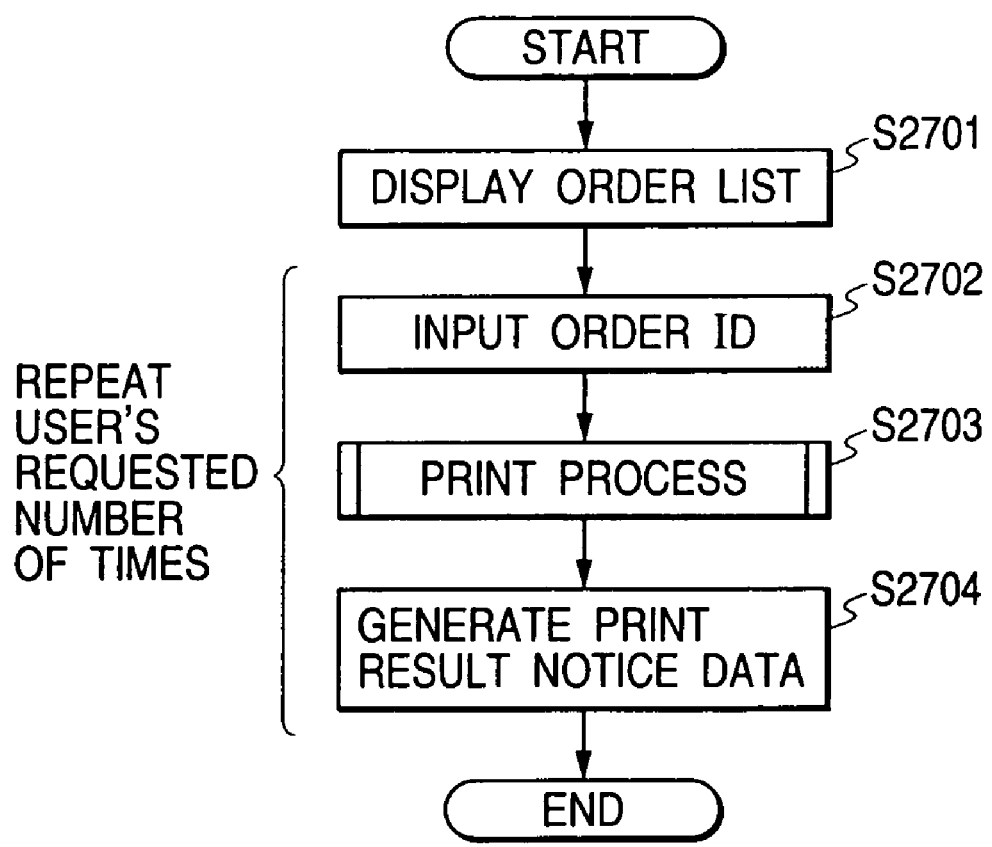
FIG. 27 is a flowchart showing the printing processing performed by the print server according to the embodiment of the present invention.

FIG. 27 is a flowchart for the print order printing process performed by the order output management means 701 of the print server 121. In the printing process, when an operator enters an instruction using the KB 2008, the order output management means 701 is read from the HDD 2009 and is written in the RAM 2002 for execution.

At step S2701, the order output management means 701 reads the order management table 711, and displays, on the CRT 2006, the order IDs of all the print orders 801 in the order management table 711.

At step S2702, the operator uses the KB 2008 to select the order ID of a desired print order. Thereafter, the selected order ID is stored in the RAM 2002.

At step S2703, the printing for the order is performed, and result data that indicates a printing success or a failure are returned to the order output management means 701. During this process, both the print image is generated, and a removable, visible watermark is removed. A detailed explanation of this process this will be given later.

At step S2704, the order ID stored at step S2702 and an end notification received from the print control means 702 at step S2703 are used to edit the print result notification data 1318. And the transmitting/receiving header 1311 is added to the notification data 1318 to form the printing result notification data file, which is stored in the local transmitting box 713. Furthermore, the print order data that corresponds to the pertinent order ID is deleted from the order management table 711, and the script used for printing and the image file for which the order ID is provided as additional information are deleted from the print spool 712.

The process from step S2702 to S2704 is repeated as many times as the operator desires.

The process at step S2703 in the printing process will now be described while referring to the detailed flowchart in FIG. 29.

At step S2901, the order management table 711 is read, based on the order ID stored at step S2702. The script, which is the edit data 804 for the print order that corresponds to the order ID, is read and is stored as a file in the print spool 712.

At step S2902, the print control means 702 is read from the HDD 2009 and written in the RAM 2002 for execution, and the script file name is transmitted to the print control means 702.

At step S2903, the print control means 702 reads the script file from the print spool 712 and analyzes it. Then, all the print image file names written in the script that is required for printing are extracted and stored in the RAM 2002.

The processes at steps S2904 to S2906 are performed for all the file names that are extracted and stored in the RAM 2002.

At step S2904, a print image file that corresponds to one of the file names that were extracted at step S2903 is obtained from the print spool 712 and stored in the RAM 2002.

At step S2905, a check is performed to determine whether a removable, visible watermark that must be removed for printing has been applied to the print image stored at step S2904. If the watermark must be removed, program control advances to step S2906. If the watermark need not be removed, program control goes to step S2907. In this embodiment, in the print image transmitting process, a removable, visible watermark is applied when a request for the distribution of the print image is issued, and the watermark removal information is stored in the image file. Therefore, the need to remove the watermark is determined depending on whether the removable, visible watermark removal information has been stored in the image file.

At step S2906, the removable, visible watermark that was applied at the time of transmission is removed from the print image. First, the removal information is obtained from the image file in the RAM 2002 and is newly stored in the RAM 2002. Then the watermarking means 706 is started, and receives the image file and the removal information in the RAM 2002, and the location of the RAM 2002 that is used as the output destination for the image from which the watermark has been removed. In this manner, the watermark means 706 is requested to remove the electronic watermark.

The watermarking means 706 employs the received removal information to remove the visible watermark from the received image, and the resultant image is transmitted to the RAM 2002 that is designated as the output destination. Following this, the watermarking means 706 transmits an end notification to the print control means 702, and the process is thereafter terminated. Upon receiving the end notification, the print control means 702 deletes the removal information from the RAM 2002, and the image file that is stored at step S2904 and to which the visible watermark was applied.

At step S2907, a check is performed to determine whether the process at steps S2904 to S2906 has been completed for all the image files that are extracted for printing at step S2903. When all the image files have ben processed, program control advances to step S2908. When there are unprocessed image files, program control returns to step S2904 to process the next image file.

At step S2908, print data are prepared by using the script file and the print image obtained at step S2907. When the removal of the visible watermark is performed for the print image, the image in the RAM 2002, which is the output results obtained by the watermarking means 706 at step S2906, is employed. If the removal of the watermark is not performed for the print image, the image written in the RAM 2002 at step S2904 is employed.

At step S2909, the print data prepared at step S2908 are transmitted to the PRTC 2011, which then outputs the data to the PRT 2012.

At step S2910, when the printing has been completed, the print control means 702 deletes the print data and the image from which the watermark has been removed, and transmits a print end notification to the order output management means 701.

Figure 29:
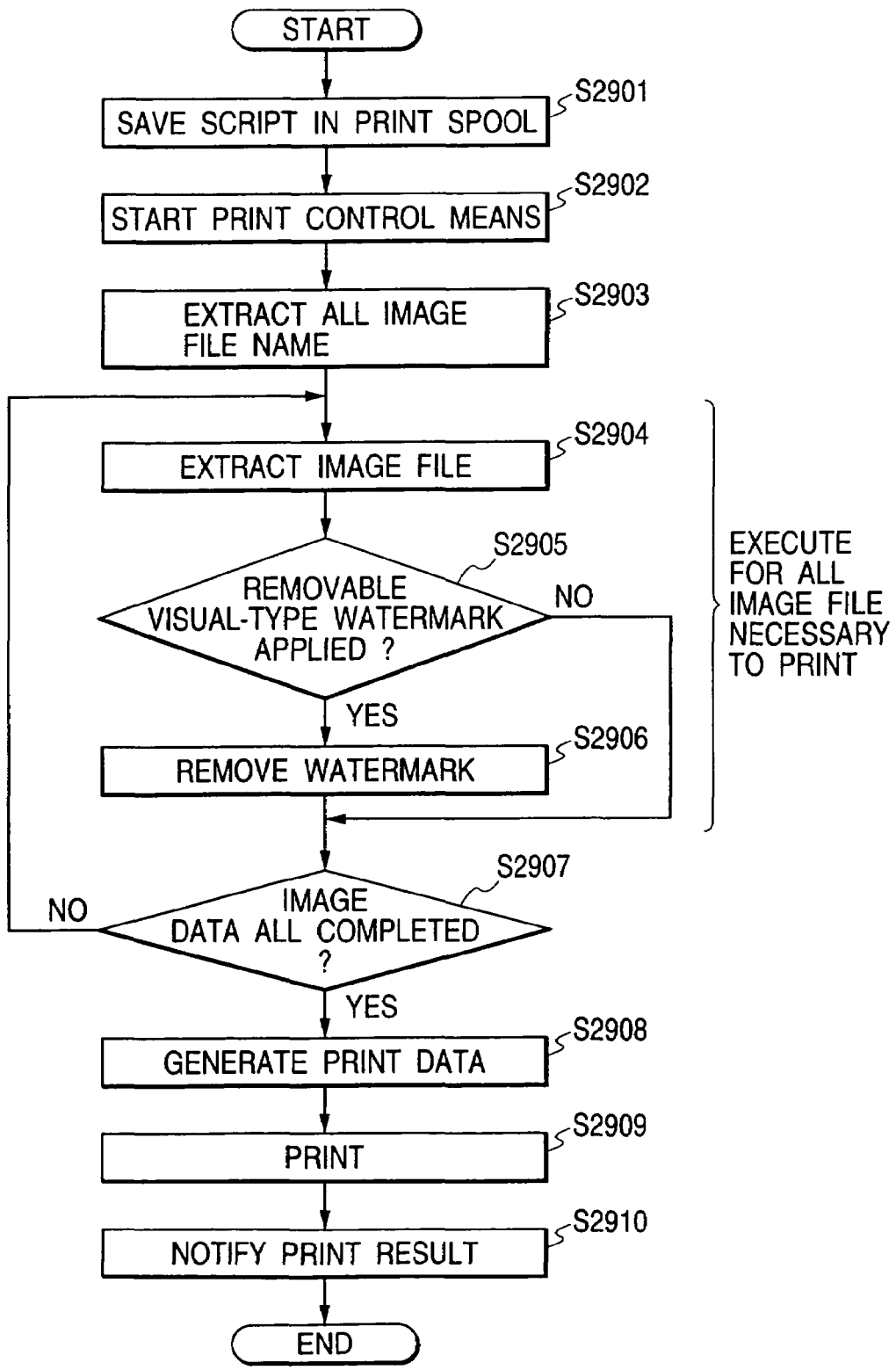
FIG. 29 is a detailed flowchart showing the printing processing performed by the print server according to the embodiment of the present invention.

The printing requested using the print order is performed in the above described manner while referring to FIGS. 27 and 29.

The processing in FIG. 29 can not be halted unless the operator performs the error recovery process for the printer. Furthermore, during the error recovery process, the operator can not access the print data and print images stored in the print server 121.

In addition, the process beginning at the print start at step S2702 and continuing up to the print end at step S2704 may be protected from being halted by the operator, so that it is possible to provide further protection for images.

So long as the print original image is stored in the print original image storage device 716 by the image registration means 704, and the image data is stored in the original image location management table 715, the print order data can be prepared by the print image registration means 704, or the order output management means 701, and can be entered in the order management table 711. In addition, the print order data stored in the table 711 can be employed for printing upon the order of the output management means 701 and the print control means 702.

In this case, the data exchange with the center server 102 and the order dispatching process performed by the client computer 101 are not always required.

The printing process is completed in the above described manner; however, if, before the printing process at step S2909, a preview image that conforms to the print image is to be displayed on the CRT 2006, the file having the file name extracted at step S2903, i.e., the image file to which the watermark has been applied, is employed to generate the preview image. As a result, the illegal employment of copyrighted data when a hard copy of an image is employed for a display on the CRT 2006 can be prevented.

<Print End Process in Center Server>

When the printing is successful, the center transmitting/receiving control means 407 of the center server 102 receives, from the print server 121, a print end notification data file that is prepared at step S2704. The received print end notification data file is stored in the center receiving box 419, and the order process management means 406 is read from the HDD 1009 and written to the RAM 1002 for execution. The name of the print end notification data file is stored in the RAM 1002, and is transmitted via the RAM 1002 to the order process management means 406. In this manner, the print end process in the center server is performed.

Figure 28:
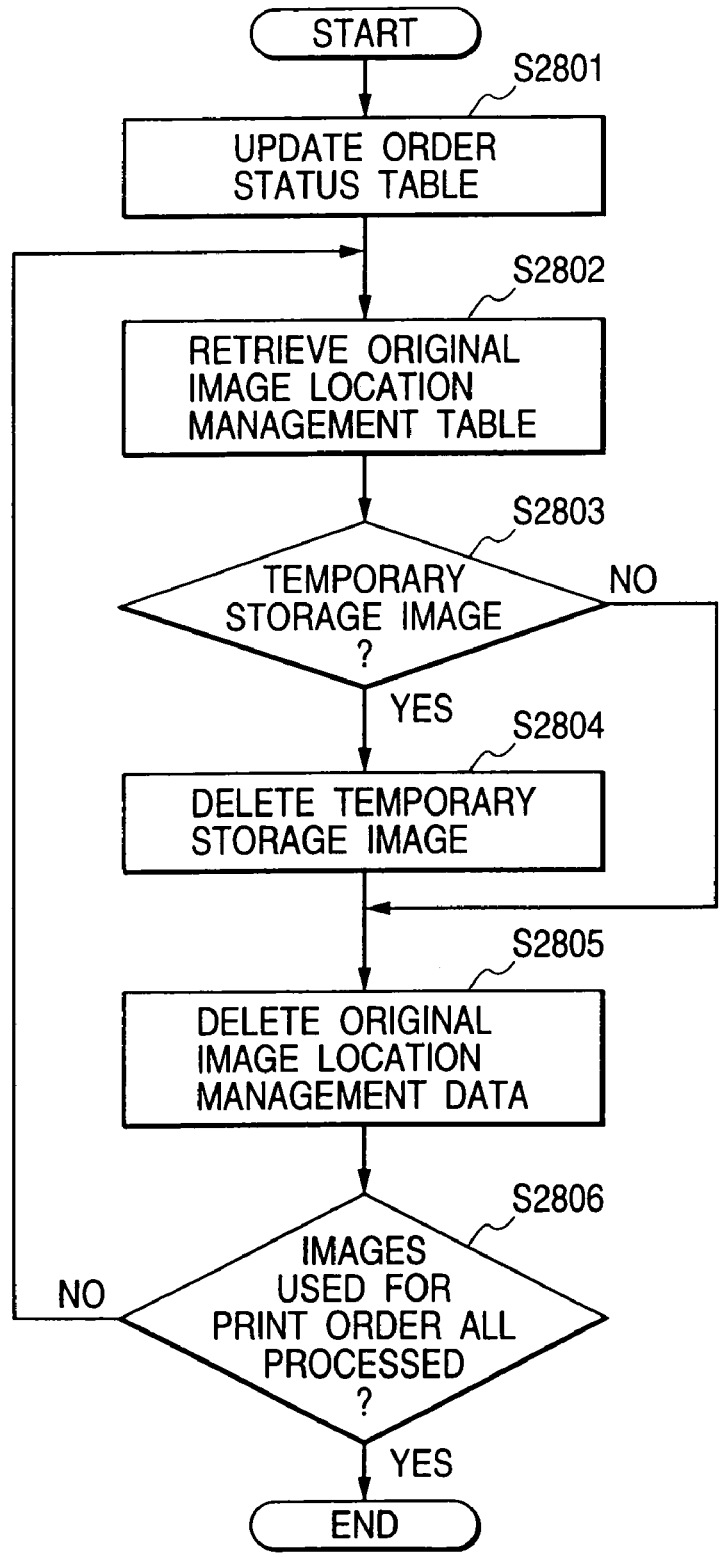
FIG. 28 is a flowchart showing the printing end processing performed by the center server according to the embodiment of the present invention.

FIG. 28 is a flowchart showing the print end process performed by the order process management means 406 of the center server 102.

At step S2801, the print end notification data file is read, based on its file name that is received from the center transmitting/receiving control means 407, and the order ID is extracted from the file and is stored in the RAM 1002.

The order status table 415 is examined using the order ID, and "print end" is set as the statuses 204 for all the order status data for which the order ID 201 matches the order ID stored in the RAM 1002. The order status table is then updated, and the image ID 203 of the order status data is stored in the RAM 1002.

The process at steps S2802 to S2805 is performed for the individual image IDs stored at step S2801. Among the image IDs stored in the RAM 1002, an image ID that is currently being processed is represented by "image ID(s)".

At step S2802, the original image location management table 412 is examined, based on the image ID(s) and the order ID, to obtain the original image location management data for which the image ID 1201 matches the image ID(s), and the order ID included in the additional information 1204 matches the order ID stored in the RAM 1002. The original image location management data are stored in the RAM 1002.

At step S2803, a check is performed to determine whether storage location (j) is the path name that represents the image file in the temporary image storage device 414. If the storage location (j) is the path name, program control advances to step S2804. If the storage location (j) is not the path name, program control goes to step S2805. The image file in this case the one for which the print image is not transmitted because the print original image is stored in the print server 121.

At step S2804, the image file that is represented by the path name at the storage location (j) is deleted from the temporary image storage device 414.

At step S2805, the pertinent original image location management data in the original image location management table 412 are deleted.

At step S2806, a check is performed to determine whether all the image IDs stored at step 2801 have been processed. If all the image IDs have been processed, the print end process is terminated. If there are unprocessed image IDs, program control returns to step S2802 to process the next image.

As is described above, according to the present invention, the intent of the copyright holder is precisely reflected in the protection provided for the copyright of the data.

In addition, the copyright can be protected in accordance with the intended purpose of data.

Furthermore, during the printing or the displaying process, the copyright can be protected at the output device.

What is claimed is:

1. An information processing apparatus comprising:
   discrimination means for discriminating a process, in which an electronic watermark is to be applied to data that is to be registered, from among a plurality of different processes that are executed for the data to be registered; and
   registration means for registering a plurality of purposes of use for the same data and registering a plurality of processes for executing the purposes of use, as a timing of applying the electronic watermark for each of the registered purposes of use, so that the electronic watermark is applied to the data to be registered during the process discriminated by said discrimination means based on the registration.

2. An information processing apparatus according to claim 1, wherein said discrimination means discriminates between a process of registering the data and a process to be executed after registering the data.

3. An information processing apparatus according to claim 1, wherein said discrimination means discriminates among one of a process of registering the data, a process of sending the registered data, and a process of printing the registered data.

4. An information processing apparatus according to claim 3, wherein the process of printing the registered data is for sending the data to a printer.

5. An information processing apparatus according to claim 4, wherein the electronic watermark is removed from the data when the data is sent to the printer.

6. An information processing apparatus according to claim 4, wherein the printer deletes data received from said information processing apparatus when print of the data is completed.

7. An information processing apparatus according to claim 4, wherein during printing of the data by the printer, the printer does not halt printing of the data even upon receiving a halting instruction.

8. An information processing apparatus according to claim 1, further comprising output means for outputting the data after the electronic watermark has been removed from the data.

9. An information processing apparatus according to claim 1, further comprising:
   print means for printing the data after the electronic watermark has been removed from the data; and
   display means for displaying data which the electronic watermark is applied to.

10. An information processing apparatus according to claim 1, wherein said discrimination means further discriminates a method of applying an electronic watermarking method among plurality of electronic watermarking methods.

11. An information processing apparatus according to claim 10, wherein said plurality of electronic watermarking methods include at the least a first method for employing an electronic watermark as visible information, and a second method for employing an electronic watermark as invisible information.

12. An information processing apparatus according to claim 10, wherein said plurality of electronic watermarking methods include at the least a third method for employing an electronic watermark as removable information, and a fourth method for employing an electronic watermark as unremovable information.

13. An information processing apparatus according to claim 1, wherein said discrimination means further discriminates electronic watermark information to be applied to the data.

14. An information processing apparatus according to claim 1, further comprising management means for managing the process discriminated by said discrimination means for each registered data.

15. An information processing system that executes a plurality of different processes for data to be provided by a user, comprising:
   discrimination means for discriminating a process, in which an electronic watermark is to be applied to data that is to be registered, from among the plurality of different processes;
   registration means for registering a plurality of purposes of use for the same data and registering a plurality of processes for executing the purposes of use, as a timing of applying the electronic watermark for each of the registered purposes of use; and
   applying means for applying an electronic watermark to the data provided by a user during the process discriminated by said discrimination means based on the registration by said registration means.

16. A control method for an information processing apparatus comprising:

a discrimination step of discriminating a process, in which an electronic watermark is to be applied to data that is to be registered, from among a plurality of different processes that are executed for the data to be registered; and a registration step of registering a plurality of purposes of use for the same data and registering a plurality of processes for executing the purposes of use, as a timing of applying the electronic watermark for each of the registered purposes of use, so that the electronic watermark is applied to the data to be registered during the process discriminated in said discrimination step based on the registration.

17. A control method for a system that executes a plurality of different processes for data to be provided by a user, comprising:

a discrimination step of discriminating a process, in which an electronic watermark is to be applied to data that is to be registered, from among the plurality of different processes;

a registration step of registering a plurality of purposes of use for the same data and registering a plurality of processes for executing the purposes of use, as a timing of applying the electronic watermark for each of the registered purposes of use; and an applying step of applying an electronic watermark to the data provided by a user during the process discriminated by said discrimination step based on the registration in said registration step.

* * * * *

UNITED STATES PATENT AND TRADEMARK OFFICE
CERTIFICATE OF CORRECTION

PATENT NO. : 6,980,668 B1
APPLICATION NO. : 09/409347
DATED : December 27, 2005
INVENTOR(S) : Kikuo Naito et al.

It is certified that error appears in the above-identified patent and that said Letters Patent is hereby corrected as shown below:

Drawings,
Sheet 29, Figure 35, "RECEIVNG" should read -- RECEIVING --.
Sheet 31, Figure 37, "INVISUAL" should read -- INVISIBLE -- (all occurrences).
Sheet 31, Figure 37, "VISUAL" should read -- VISIBLE -- (all occurrences).
Sheet 31, Figure 37, "TRANSMITTING" should read -- TRANSMISSION -- (all occurrences).
Sheet 31, Figure 37, "CRIBBING" should read -- CROPPING --.

Column 1,
Line 64, "if" should read -- is --.

Column 12,
Line 36, "meas 704." should read -- means 601. --.

Column 13,
Line 18, "is" should read -- is to --.

Column 17,
Line 27, "is" should be deleted.
Line 66, "211, 212 213" and should read -- 211, 212, 213 --.

Column 18,
Line 2, "entry" should read -- entry is --.

Column 19,
Line 64, "E:¥spop1¥image1.jpg" should read -- E:¥spop1¥image1.jpg --.

Column 20,
Line 44, "the tag name is" should read -- the tag name and is --.

Column 25,
Line 27, "that" should read -- that were --.
Line 43, "sever 112." should read -- server 112 --.

Column 26,
Line 2, "process this" should read -- process --.
Line 13, "need" should read -- need to --.

Column 32,
Line 29, "3405" should read -- S3405 --.

UNITED STATES PATENT AND TRADEMARK OFFICE
CERTIFICATE OF CORRECTION

PATENT NO. : 6,980,668 B1
APPLICATION NO. : 09/409347
DATED : December 27, 2005
INVENTOR(S) : Kikuo Naito et al.

It is certified that error appears in the above-identified patent and that said Letters Patent is hereby corrected as shown below:

Column 39,
Line 4, "mens" should read -- means --.
Line 58, "means 4032" should read -- means 403 --.

Signed and Sealed this

Fourth Day of July, 2006

JON W. DUDAS
*Director of the United States Patent and Trademark Office*